US012289424B2

(12) United States Patent
Kim et al.

(10) Patent No.: US 12,289,424 B2
(45) Date of Patent: Apr. 29, 2025

(54) ELECTRONIC DEVICE AND METHOD FOR REDUCING CURRENT CONSUMPTION IN ELECTRONIC DEVICE CONNECTED WITH COMMUNICATION NETWORK

(71) Applicant: SAMSUNG ELECTRONICS CO., LTD., Suwon-si (KR)

(72) Inventors: Songkyu Kim, Suwon-si (KR); Sanghyun Lee, Suwon-si (KR); Suhan Kim, Suwon-si (KR); Dongchul Ma, Suwon-si (KR); Jungmin Oh, Suwon-si (KR); Hyoungkwon Kim, Suwon-si (KR); Eunsoo Bae, Suwon-si (KR); Kyungwon Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 330 days.

(21) Appl. No.: 17/987,479

(22) Filed: Nov. 15, 2022

(65) Prior Publication Data

US 2023/0156115 A1 May 18, 2023

Related U.S. Application Data

(63) Continuation of application No. PCT/KR2022/017778, filed on Nov. 11, 2022.

(30) Foreign Application Priority Data

Nov. 12, 2021 (KR) .................. 10-2021-0155948

(51) Int. Cl.
*H04M 1/72* (2021.01)
*H04M 1/72454* (2021.01)
*H04W 72/542* (2023.01)

(52) U.S. Cl.
CPC ..... *H04M 1/72454* (2021.01); *H04W 72/542* (2023.01)

(58) Field of Classification Search
CPC .................. H04M 1/72454; H04W 72/542
See application file for complete search history.

(56) References Cited

U.S. PATENT DOCUMENTS

| 8,682,256 B2 | 3/2014 | Zimmermann et al. |
| 2014/0140424 A1 | 5/2014 | Clevorn |

(Continued)

FOREIGN PATENT DOCUMENTS

| CN | 112867068 | 5/2021 |
| EP | 3 855 636 | 7/2021 |

(Continued)

OTHER PUBLICATIONS

Search Report dated Feb. 16, 2023 in International Patent Application No. PCT/KR2022/017778.

(Continued)

*Primary Examiner* — Curtis B Odom
(74) *Attorney, Agent, or Firm* — Nixon & Vanderhye, P.C.

(57) ABSTRACT

An example electronic device may include a plurality of antennas; and at least one communication processor communicating with a first communication network or a second communication network through the plurality of antennas. The at least one communication processor may be configured to set up a call with an external electronic device through the first communication network, identify information related to call quality in a call connected state with the external electronic device, and perform an operation for reducing a number of antennas for reception among the plurality of antennas based on identifying that the information related to the call quality meets a designated condition.

20 Claims, 30 Drawing Sheets

(56) References Cited

U.S. PATENT DOCUMENTS

| | | |
|---|---|---|
| 2017/0366235 A1 | 12/2017 | Kim et al. |
| 2019/0208569 A1 | 7/2019 | Lee et al. |
| 2019/0222280 A1 | 7/2019 | Shu et al. |
| 2019/0380053 A1 | 12/2019 | Bai et al. |
| 2020/0281006 A1 | 9/2020 | Kumar et al. |
| 2020/0412425 A1 | 12/2020 | Laghate et al. |
| 2021/0105691 A1 | 4/2021 | Zhu et al. |
| 2021/0136645 A1 | 5/2021 | Zhao et al. |
| 2021/0211972 A1 | 7/2021 | Zhang et al. |
| 2021/0314369 A1 | 10/2021 | Lee |

FOREIGN PATENT DOCUMENTS

| | | |
|---|---|---|
| KR | 10-2017-0142401 | 12/2017 |
| KR | 10-2019-0050818 | 5/2019 |
| KR | 10-2021-0123141 | 10/2021 |

OTHER PUBLICATIONS

Written Opinion dated Feb. 16, 2023 in International Patent Application No. PCT/KR2022/017778.
Office Action dated Aug. 10, 2023 in Korean Patent Application No. 10-2021-0155948 and English-language translation.
Partial Supplementary European Search Report dated Oct. 21, 2024 in European Patent Application No. 22893276.0.
Extended Search Report dated Jan. 13, 2025 in European Patent Application No. 22893276.0.

ELECTRONIC DEVICE AND METHOD FOR REDUCING CURRENT CONSUMPTION IN ELECTRONIC DEVICE CONNECTED WITH COMMUNICATION NETWORK

CROSS-REFERENCE TO RELATED APPLICATIONS

This application is a continuation of International Application No. PCT/KR2022/017778 designating the United States, filed on Nov. 11, 2022, in the Korean Intellectual Property Receiving Office and claiming priority to Korean Patent Application No. 10-2021-0155948, filed on Nov. 12, 2021, in the Korean Intellectual Property Office, the disclosures of all of which are incorporated by reference herein in their entireties.

BACKGROUND

Field

The disclosure relates to an electronic device and a method for reducing current consumption in an electronic device connected with a communication network.

Description of Related Art

As mobile communication technology evolves, multi-functional portable terminals are commonplace and, to meet increasing demand for radio traffic, vigorous efforts are underway to develop 5G communication systems. To achieve a higher data transmission rate, 5G communication systems are being implemented on higher frequency bands (e.g., a band of 25 GHz to 60 GHz), as well as those used for 3G communication systems and long-term evolution (LTE) communication systems.

To mitigate pathloss on the mmWave band and increase the reach of radio waves, the following techniques are taken into account for the 5G communication system: beamforming, massive multi-input multi-output (MIMO), full dimensional MIMO (FD-MIMO), array antenna, analog beamforming, and large scale antenna.

To implement 5G communication, stand-alone (SA) and non-stand alone (NSA) schemes are taken into consideration. The SA scheme may refer, for example, to a scheme that uses only the new radio (NR) system (or 5G system), and the NSA scheme may refer, for example, to a scheme that uses the NR system together with the legacy LTE system. In the NSA scheme, user equipment (UE) may use not only eNBs of the LTE system but also gNBs of the NR system. Technology allowing UEs to use heterogeneous communication systems may be referred to, for example, as dual connectivity.

SUMMARY

Embodiments of the disclosure provide that, when an electronic device is connected through dual-connectivity of EN-DC, a call may be connected through voice over LTE (VoLTE) on an LTE network because a master cell group (MCG) is an LTE system. When the electronic device is connected to the 5G system with the SA scheme, a call may be connected through voice over NR (VoNR) on the 5G network. Even if the electronic device is connected to the 5G network, if the electronic device or the 5G network does not support VoNR, the call may be connected by switching to VoLTE by evolved packet system (EPS) fallback technology.

For example, even when the electronic device is connected to the NR network through the SA scheme, if switching to VoLTE by EPS fallback technology upon call connection, call connection may take a relatively long time. As the electronic device and the NR network support VoNR, if the electronic device connects through VoNR upon call connection, the electronic device may consume relatively high current (or power) as compared with VoLTE, due to the technical features of high processing or broad bandwidth of the 5G communication system and may increase in temperature. If EPS fallback is performed to provide a service although the electronic device is capable of VoNR connection considering current consumption and heat generation, call connection may take a long time, and the electronic device may fail to receive the high-quality service of VoNR or specified functions of VoNR.

Embodiments of the disclosure may provide an electronic device and a method for reducing current consumption in an electronic device connected with a communication network, which may reduce current consumption while a VoNR call is connected.

Embodiments of the disclosure may provide an electronic device and a method for reducing current consumption in an electronic device connected with a communication network, which may ensure call quality by controlling not to perform an operation corresponding to an overheat state although the electronic device is in the overheat state in a VoNR call-connected state.

Embodiments of the disclosure may provide an electronic device and a method for reducing current consumption in an electronic device connected with a communication network, which may disable VoNR considering the bandwidth part (BWP) or bandwidth while the electronic device accesses a 5G network and registers VoNR.

According to various embodiments, an electronic device may comprise a plurality of antennas and at least one communication processor may be configured to communicate with a first communication network or a second communication network through the plurality of antennas. The at least one communication processor may be configured to set up a call with an external electronic device through the first communication network, identify information related to call quality in a call connected state with the external electronic device, and perform an operation for reducing a number of antennas for reception among the plurality of antennas based on identifying that the information related to the call quality meets a designated condition.

According to various embodiments, a method for reducing current consumption in an electronic device communicating with a first communication network or a second communication network through a plurality of antennas may comprise allowing the electronic device to set up a call with an external electronic device through the first communication network, allowing the electronic device to identify information related to call quality in a call connected state with the external electronic device, and reducing a number of antennas for reception among the plurality of antennas based on identifying that the information related to the call quality meets a designated condition.

According to various embodiments, an electronic device may comprise a plurality of antennas and at least one communication processor communicating with a first communication network or a second communication network through the plurality of antennas. The at least one communication processor may be configured to register voice over new radio (VoNR) through the first communication network, identify information related to a set bandwidth or bandwidth part (BWP) from the first communication network, and perform at least one operation for disabling the VoNR based on identifying that the information related to the bandwidth or the bandwidth part meets a designated condition.

According to various embodiments, current consumption can be reduced by reducing the number of antennas for reception when call quality is ensured in a VoNR call-connected state of the electronic device.

According to various embodiments, in the overheat state of the electronic device, current consumption may be reduced by performing an operation corresponding to the overheat state and, in the VoNR call-connected state, the operation corresponding to the overheat state is controlled not to be performed despite the overheat state. Thus, call quality may be ensured.

According to various embodiments, it is possible to disable VoNR considering the bandwidth or bandwidth part (BWP) in the state in which the electronic device accesses the 5G network and registers VoNR, thereby connecting to VoLTE by EPS fallback upon call connection and thus reducing current consumption.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
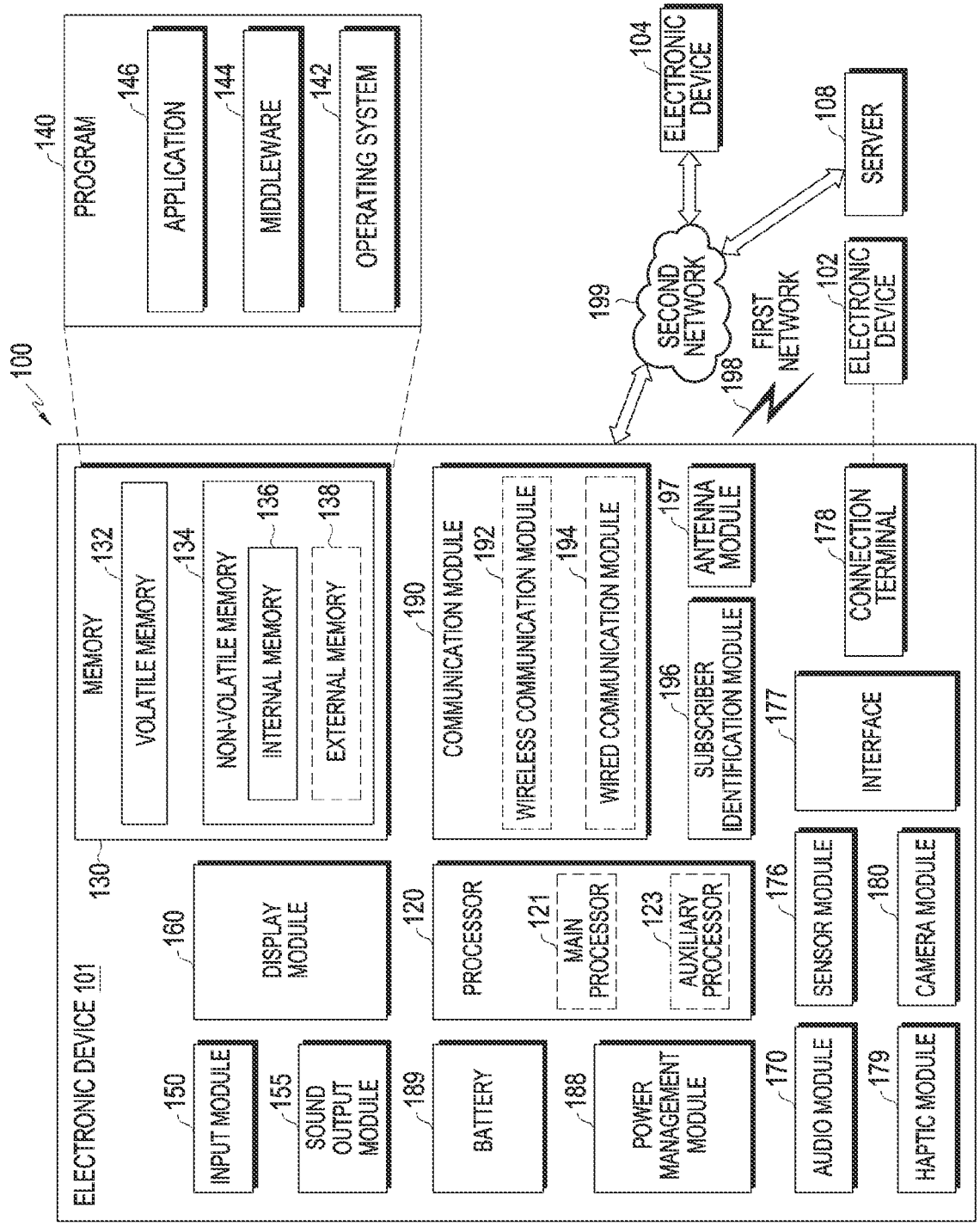
FIG. 1 is a block diagram illustrating an example electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connection terminal 178, a haptic module 179, a camera module 180, a power management module 188, a battery 189, a communication module 190, a subscriber identification module (SIM) 196, or an antenna module 197. In various embodiments, at least one (e.g., the connection terminal 178) of the components may be omitted from the electronic device 101, or one or more other components may be added in the electronic device 101. According to an embodiment, some (e.g., the sensor module 176, the camera module 180, or the antenna module 197) of the components may be integrated into a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display 160 may include, for example, a display, a hologram device, or a projector and control circuitry to control a corresponding one of the display, hologram device, and projector. According to an embodiment, the display 160 may include a touch sensor configured to detect a touch, or a pressure sensor configured to measure the intensity of a force generated by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connection terminal 178 may include a connector via which the electronic device 101 may be physically connected with the external electronic device (e.g., the electronic device 102). According to an embodiment, the connection terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via a first network 198 (e.g., a short-range communication network, such as Bluetooth™, wireless-fidelity (Wi-Fi) direct, or infrared data association (IrDA)) or a second network 199 (e.g., a long-range communication network, such as a legacy cellular network, a 5G network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device). According to an embodiment, the antenna module 197 may include one antenna including a radiator formed of a conductor or conductive pattern formed on a substrate (e.g., a printed circuit board (PCB)). According to an embodiment, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The external electronic devices 102 or 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or health-care) based on 5G communication technology or IoT-related technology.

Figure 2A:
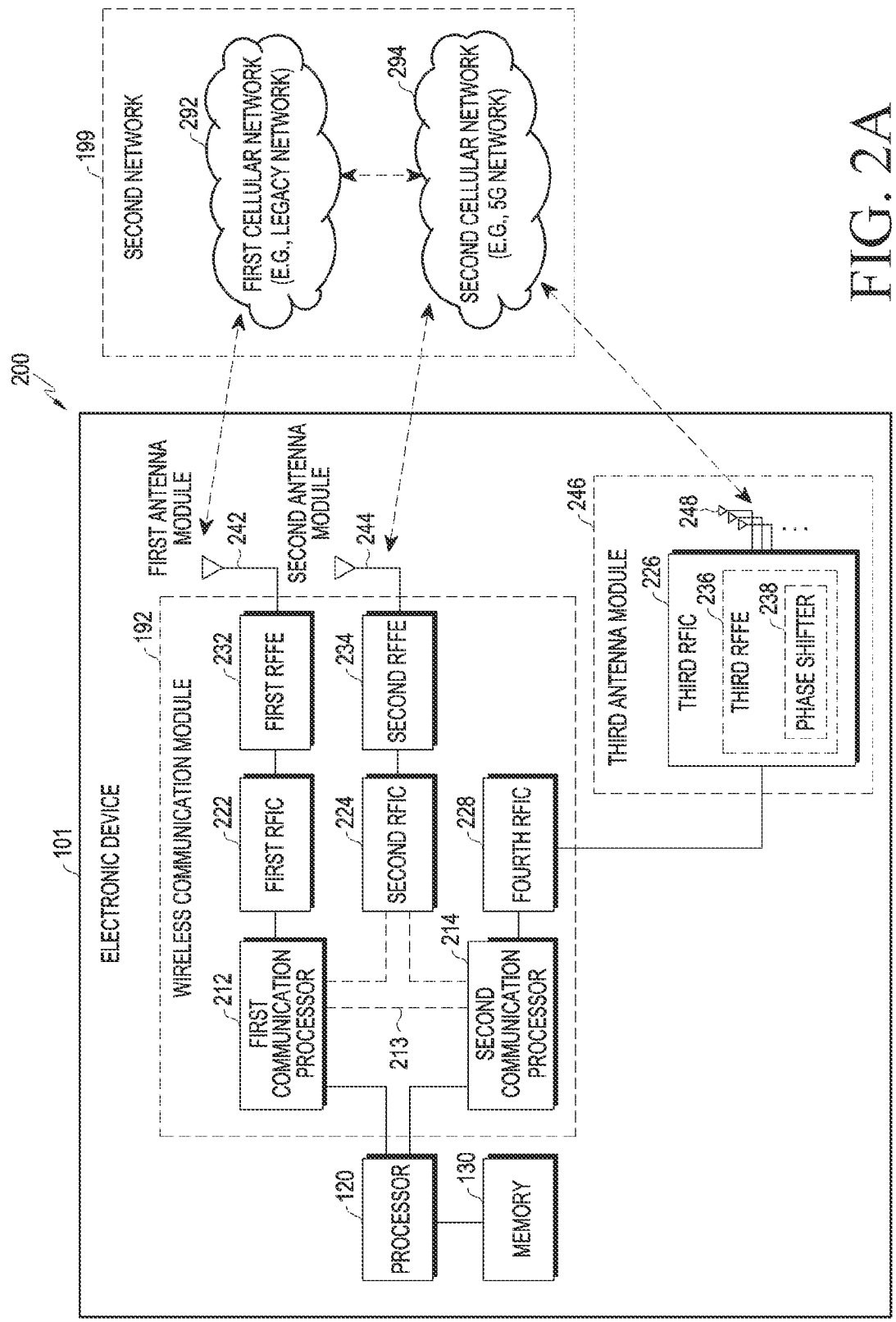
FIG. 2A is a block diagram illustrating an example electronic device for supporting legacy network communication and 5G network communication according to various embodiments.

FIG. 2A is a block diagram 200 illustrating an example electronic device 101 for supporting legacy network communication and 5G network communication according to various embodiments. Referring to FIG. 2A, the electronic device 101 may include a first communication processor 212, a second communication processor 214, a first radio frequency integrated circuit (RFIC) 222, a second RFIC 224, a third RFIC 226, a fourth RFIC 228, a first radio frequency front end (RFFE) 232, a second RFFE 234, a first antenna module 242, a second antenna module 244, a third antenna module 246, and antennas 248. The electronic device 101 may further include a processor 120 and a memory 130. The second network 199 may include a first cellular network 292 and a second cellular network 294. According to an embodiment, the electronic device 101 may further include at least one component among the components of FIG. 1, and the second network 199 may further include at least one other network. According to an embodiment, the first communication processor 212, the second communication processor 214, the first RFIC 222, the second RFIC 224, the fourth RFIC 228, the first RFFE 232, and the second RFFE 234 may form at least part of the wireless communication module 192. According to an embodiment, the fourth RFIC 228 may be omitted or be included as part of the third RFIC 226.

The first communication processor 212 may establish a communication channel of a band that is to be used for wireless communication with the first cellular network 292 or may support legacy network communication via the established communication channel. According to various embodiments, the first cellular network may be a legacy network that includes second generation (2G), third generation (3G), fourth generation (4G), or long-term evolution (LTE) networks. The second CP 214 may establish a communication channel corresponding to a designated band (e.g., from about 6 GHz to about 60 GHz) among bands that are to be used for wireless communication with the second cellular network 294 or may support fifth generation (5G) network communication via the established communication channel. According to an embodiment, the second cellular network 294 may be a 5G network defined by the 3rd generation partnership project (3GPP). Additionally, according to an embodiment, the first CP 212 or the second CP 214 may establish a communication channel corresponding to another designated band (e.g., about 6 GHz or less) among the bands that are to be used for wireless communication with the second cellular network 294 or may support fifth generation (5G) network communication via the established communication channel.

The first communication processor 212 may perform data transmission/reception with the second communication processor 214. For example, data classified as transmitted via the second cellular network 294 may be changed to be transmitted via the first cellular network 292. In this case, the first communication processor 212 may receive transmission data from the second communication processor 214. For example, the first communication processor 212 may transmit/receive data to/from the second communication processor 214 via an inter-processor interface 213. The inter-processor interface 213 may be implemented as, e.g., universal asynchronous receiver/transmitter (UART) (e.g., high speed-UART (HS-UART)) or peripheral component interconnect bus express (PCIe) interface, but is not limited to a specific kind of interface. The first communication processor 212 and the second communication processor 214 may exchange packet data information and control information using, e.g., a shared memory. The first communication processor 212 may transmit/receive various pieces of information, such as sensing information, output strength information, or resource block (RB) allocation information, to/from the second communication processor 214.

According to an embodiment, the first communication processor 212 may not be directly connected with the second communication processor 214. In this case, the first communication processor 212 may transmit/receive data to/from the second communication processor 214 via a processor 120 (e.g., an application processor). For example, the first communication processor 212 and the second communication processor 214 may transmit/receive data to/from the processor 120 (e.g., an application processor) via an HS-UART interface or PCIe interface, but the kind of the interface is not limited thereto. The first communication processor 212 and the second communication processor 214 may exchange control information and packet data information with the processor 120 (e.g., an application processor) using a shared memory.

Figure 2B:
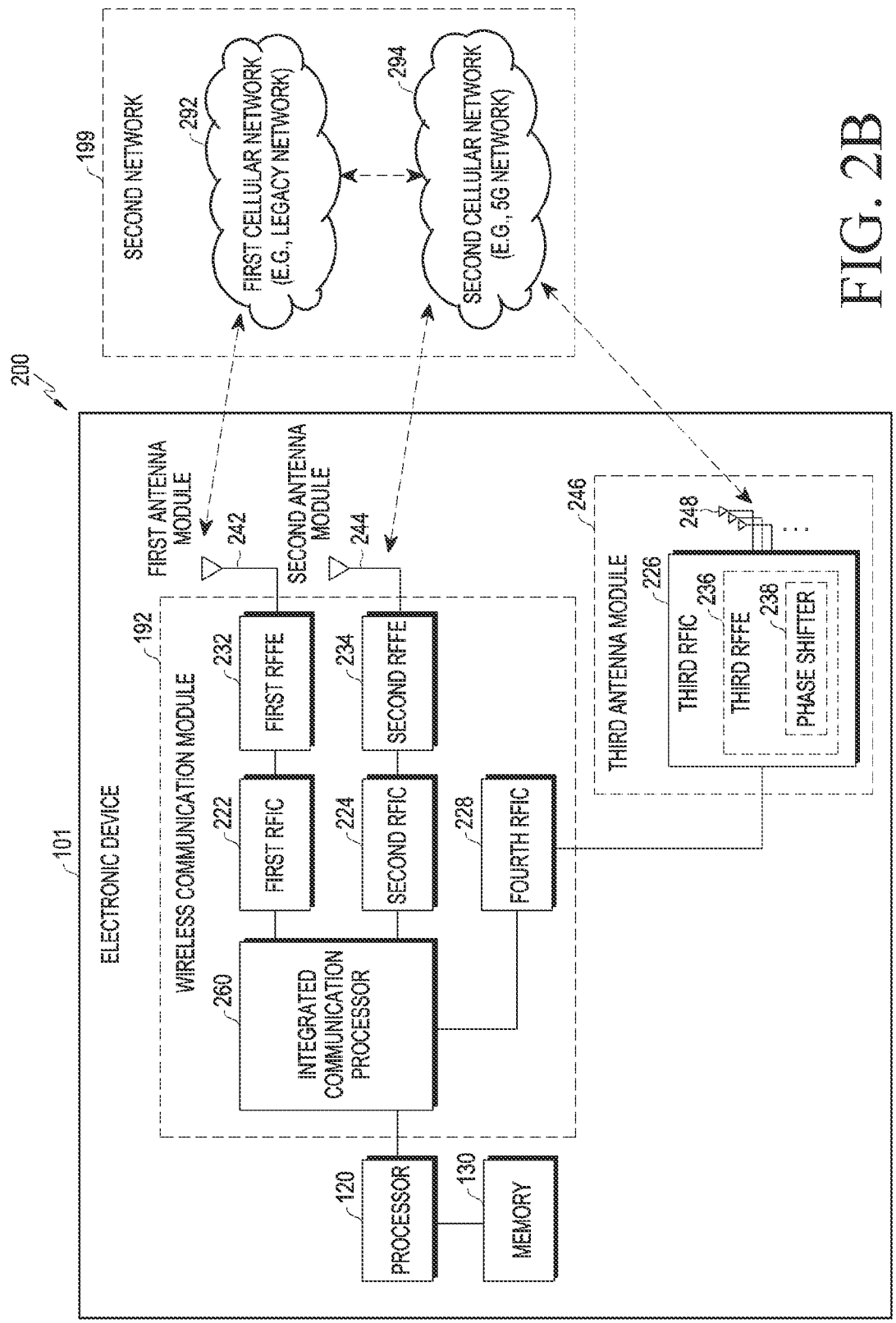
FIG. 2B is a block diagram illustrating an example electronic device for supporting legacy network communication and 5G network communication according to various embodiments.

According to an embodiment, the first communication processor 212 and the second communication processor 214 may be implemented in a single chip or a single package. According to an embodiment, the first communication processor 212 or the second communication processor 214, along with the processor 120, an auxiliary processor 123, or communication module 190, may be formed in a single chip or single package. For example, as shown in FIG. 2B, an integrated communication processor 260 may support all of the functions for communication with the first cellular network 292 and the second cellular network 294.

Upon transmission, the first RFIC 222 may convert a baseband signal generated by the first communication processor 212 into a radio frequency (RF) signal with a frequency ranging from about 700 MHz to about 3 GHz which is used by the first cellular network 292 (e.g., a legacy network). Upon receipt, an RF signal may be obtained from the first network 292 (e.g., a legacy network) through an antenna (e.g., the first antenna module 242) and be pre-processed via an RFFE (e.g., the first RFFE 232). The first RFIC 222 may convert the pre-processed RF signal into a baseband signal that may be processed by the first communication processor 212.

Upon transmission, the second RFIC 224 may convert a baseband signal generated by the first communication processor 212 or the second communication processor 214 into a Sub6-band (e.g., about 6 GHz or less) RF signal (hereinafter, "5G Sub6 RF signal") that is used by the second cellular network 294 (e.g., a 5G network). Upon receipt, a 5G Sub6 RF signal may be obtained from the second cellular network 294 (e.g., a 5G network) through an antenna (e.g., the second antenna module 244) and be pre-processed via an RFFE (e.g., the second RFFE 234). The second RFIC 224 may convert the pre-processed 5G Sub6 RF signal into a baseband signal that may be processed by a corresponding processor of the first communication processor 212 and the second communication processor 214.

The third RFIC 226 may convert a baseband signal generated by the second communication processor 214 into a 5G Above6 band (e.g., about 6 GHz to about 60 GHz) RF signal (hereinafter, "5G Above6 RF signal") that is to be used by the second cellular network 294 (e.g., a 5G network). Upon receipt, a 5G Above6 RF signal may be obtained from the second cellular network 294 (e.g., a 5G network) through an antenna (e.g., the antenna 248) and be pre-processed via the third RFFE 236. The third RFIC 226 may convert the pre-processed 5G Above6 RF signal into a baseband signal that may be processed by the second communication processor 214. According to an embodiment, the third RFFE 236 may be formed as part of the third RFIC 226.

According to an embodiment, the electronic device 101 may include the fourth RFIC 228 separately from, or as at least part of, the third RFIC 226. In this case, the fourth RFIC 228 may convert the baseband signal generated by the second communication processor 214 into an intermediate frequency band (e.g., from about 9 GHz to about 11 GHz) RF signal (hereinafter, "IF signal") and transfer the IF signal to the third RFIC 226. The third RFIC 226 may convert the IF signal into a 5G Above6 RF signal. Upon receipt, the 5G Above6 RF signal may be received from the second cellular network 294 (e.g., a 5G network) through an antenna (e.g., the antenna 248) and be converted into an IF signal by the third RFIC 226. The fourth RFIC 228 may convert the IF signal into a baseband signal that may be processed by the second communication processor 214.

According to an embodiment, the first RFIC 222 and the second RFIC 224 may be implemented as at least part of a single chip or single package. According to various embodiments, when the first RFIC 222 and the second RFIC 224 in FIG. 2A or 2B are implemented as a single chip or a single package, they may be implemented as an integrated RFIC. In this case, the integrated RFIC may be connected to the first RFFE 232 and the second RFFE 234, and the integrated RFIC may convert a baseband signal into a signal of a band supported by the first RFFE 232 and/or the second RFFE 234 and may transmit the converted signal to one of the first RFFE 232 and the second RFFE 234. According to an embodiment, the first RFFE 232 and the second RFFE 234 may be implemented as at least part of a single chip or single package. According to an embodiment, at least one of the first antenna module 242 or the second antenna module 244 may be omitted or be combined with another antenna module to process multi-band RF signals.

According to an embodiment, the third RFIC 226 and the antenna 248 may be disposed on the same substrate to form the third antenna module 246. For example, the wireless communication module 192 or the processor 120 may be disposed on a first substrate (e.g., a main painted circuit board (PCB)). In this case, the third RFIC 226 and the antenna 248, respectively, may be disposed on one area (e.g., the bottom) and another (e.g., the top) of a second substrate (e.g., a sub PCB) which is provided separately from the first substrate, forming the third antenna module 246. Placing the third RFIC 226 and the antenna 248 on the same substrate may shorten the length of the transmission line therebetween. This may reduce a loss (e.g., attenuation) of high-frequency band (e.g., from about 6 GHz to about 60 GHz) signal used for 5G network communication due to the transmission line. Thus, the electronic device 101 may enhance the communication quality with the second network 294 (e.g., a 5G network).

According to an embodiment, the antenna 248 may be formed as an antenna array which includes a plurality of antenna elements available for beamforming. In this case, the third RFIC 226 may include a plurality of phase shifters 238 corresponding to the plurality of antenna elements, as part of the third RFFE 236. Upon transmission, the plurality of phase shifters 238 may change the phase of the 5G Above6 RF signal which is to be transmitted to the outside (e.g., a 5G network base station) of the electronic device 101 via their respective corresponding antenna elements. Upon receipt, the plurality of phase shifters 238 may change the phase of the 5G Above6 RF signal received from the outside to the same or substantially the same phase via their respective corresponding antenna elements. This enables transmission or reception via beamforming between the electronic device 101 and the outside.

The second cellular network 294 (e.g., a 5G network) may be operated independently (e.g., as standalone (SA)) from, or in connection (e.g., as non-standalone (NSA)) with the first cellular network 292 (e.g., a legacy network). For example, the 5G network may include access networks (e.g., 5G access networks (RANs)) but lack any core network (e.g., a next-generation core (NGC)). In this case, the electronic device 101, after accessing a 5G network access network, may access an external network (e.g., the Internet) under the control of the core network (e.g., the evolved packet core (EPC)) of the legacy network. Protocol information (e.g., LTE protocol information) for communication with the legacy network or protocol information (e.g., New Radio (NR) protocol information) for communication with the 5G network may be stored in the memory 130 and be accessed by other components (e.g., the processor 120, the first communication processor 212, or the second communication processor 214).

According to various embodiments, at least one communication processor (e.g., the first communication processor 212, the second communication processor 214, or the integrated communication processor 260) may be implemented as a chip, circuit, or device for communication included in the electronic device 101. For example, the at least one communication processor may include a controller and a memory (or register) in one chip. In various embodiments described below, the operations performed by the electronic device 101 or at least one communication processor (e.g., the first communication processor 212, the second communication processor 214, or the integrated communication processor 260) of the electronic device 101 may be performed by the controller included in the at least one communication processor, and the controller may perform the operations described below, by executing at least one command stored in the memory or register included in the at least one communication processor.

Figure 3A:
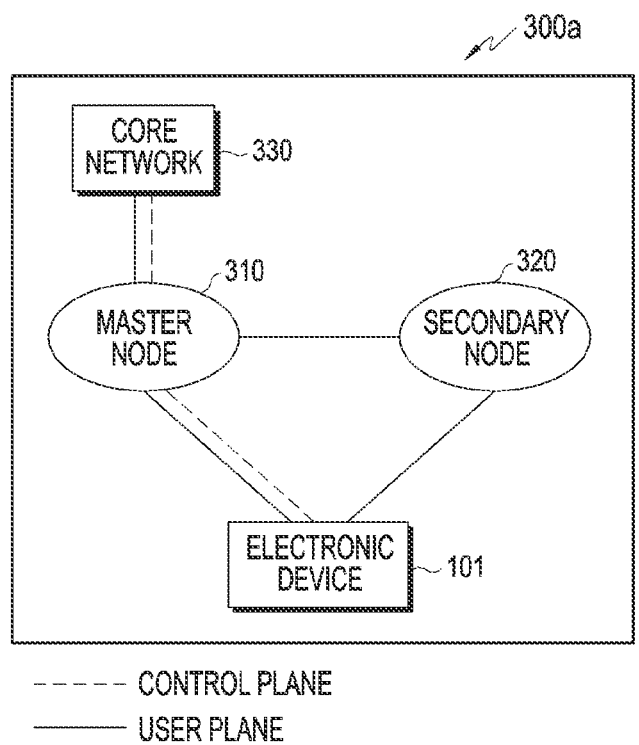
FIG. 3A illustrates example wireless communication systems providing a legacy communication network and/or a 5G communication network according to various embodiments.
Figure 3B:
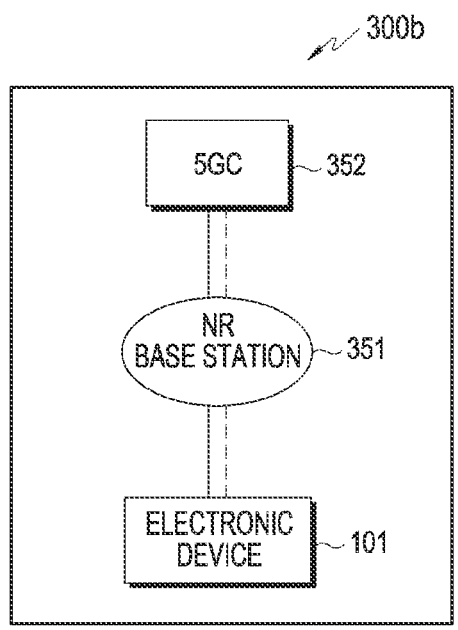
FIG. 3B illustrates example wireless communication systems providing a legacy communication network and/or a 5G communication network according to various embodiments.
Figure 3C:
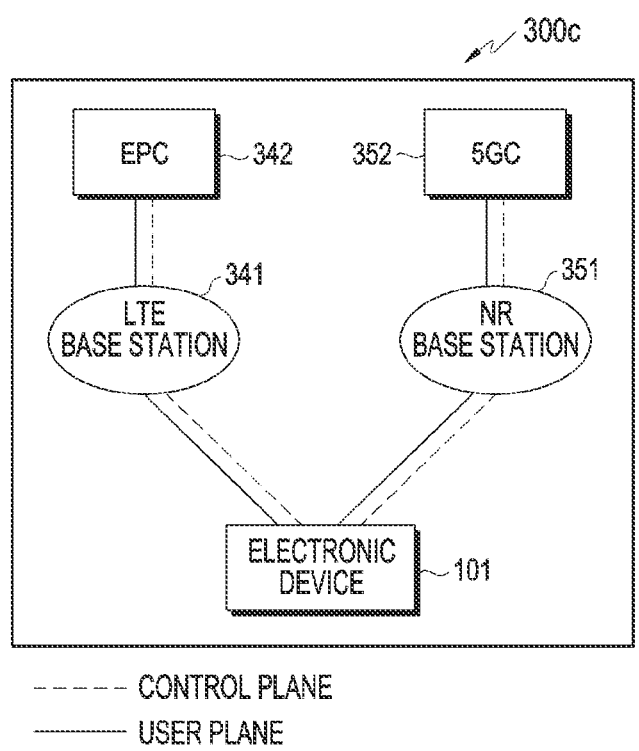
FIG. 3C illustrates example wireless communication systems providing a legacy communication network and/or a 5G communication network according to various embodiments.

FIGS. 3A, 3B, and 3C are views illustrating example wireless communication systems providing legacy communication and/or 5G communication networks according to various embodiments. Referring to FIGS. 3A, 3B, and 3C, the network environment 300a, 300b, and 300c may include at least one of a legacy network and a 5G network. The legacy network may include, e.g., a 3GPP-standard 4G or LTE base station 340 (e.g., an eNodeB (eNB)) that supports radio access with the electronic device 101 and an evolved packet core (EPC) 342 that manages 4G communication. The 5G network may include, e.g., a new radio (NR) base station 350 (e.g., a gNodeB (gNB)) that supports radio access with the electronic device 101 and a 5th generation core (5GC) 352 that manages 5G communication for the electronic device 101.

According to an embodiment, the electronic device 101 may transmit or receive control messages and user data via legacy communication and/or 5G communication. The control messages may include, e.g., messages related to at least one of security control, bearer setup, authentication, registration, or mobility management for the electronic device 101. The user data may include, e.g., user data except for control messages transmitted or received between the electronic device 101 and the core network 330 (e.g., the EPC 342).

Referring to FIG. 3A, according to an embodiment, the electronic device 101 may transmit or receive at least one of a control message or user data to/from at least part (e.g., the NR base station 351 or 5GC 352) of the 5G network via at least part (e.g., the LTE base station 341 or EPC 342) of the legacy network.

According to various embodiments, the network environment 300a may include a network environment that provides wireless communication dual connectivity (DC) to the LTE base station 341 and the NR base station 351 and transmits or receives control messages to/from the electronic device 101 via one core network 330 of the EPC 342 or the 5GC 352.

According to various embodiments, in the DC environment, one of the LTE base station 341 or the NR base station 351 may operate as a master node (MN) 310, and the other as a secondary node (SN) 320. The MN 310 may be connected with the core network 330 to transmit or receive control messages. The MN 310 and the SN 320 may be connected with each other via a network interface to transmit or receive messages related to radio resource (e.g., communication channel) management therebetween.

According to an embodiment, the MN 310 may include the LTE base station 341, the SN 320 may include the NR base station 351, and the core network 330 may include the EPC 342. For example, control messages may be transmitted/received via the LTE base station 341 and the EPC 342, and user data may be transmitted/received via at least one of the LTE base station 341 or the NR base station 351.

According to an embodiment, the MN 310 may include the NR base station 351, and the SN 320 may include the LTE base station 341, and the core network 330 may include the 5GC 352. For example, control messages may be transmitted/received via the NR base station 351 and the 5GC 352, and user data may be transmitted/received via at least one of the LTE base station 341 or the NR base station 351.

Referring to FIG. 3B, according to an embodiment, the 5G network may include the NR base station 351 and the 5GC 352 and transmit or receive control messages and user data independently from the electronic device 101.

Referring to FIG. 3C, according to an embodiment, the legacy network and the 5G network each may provide data transmission/reception independently. For example, the electronic device 101 and the EPC 342 may transmit or receive control messages and user data via the LTE base station 341. As another example, the electronic device 101 and the 5GC 352 may transmit or receive control messages and user data via the NR base station 351.

According to various embodiments, the electronic device 101 may be registered in at least one of the EPC 342 or the 5GC 352 to transmit or receive control messages.

According to various embodiments, the EPC 342 or the 5GC 352 may interwork with each other to manage communication for the electronic device 101. For example, mobility information for the electronic device 101 may be transmitted or received via an interface between the EPC 342 and the 5GC 352.

As set forth above, dual connectivity via the LTE base station 341 and the NR base station 351 may be referred to as E-UTRA new radio dual connectivity (EN-DC). Although EN-DC is described as an example in various embodiments described below, the same or similar description may be applied to various types of multi-radio dual-connectivity (MR-DC), including NR-E UTRA dual-connectivity (NE-DC).

Figure 4:
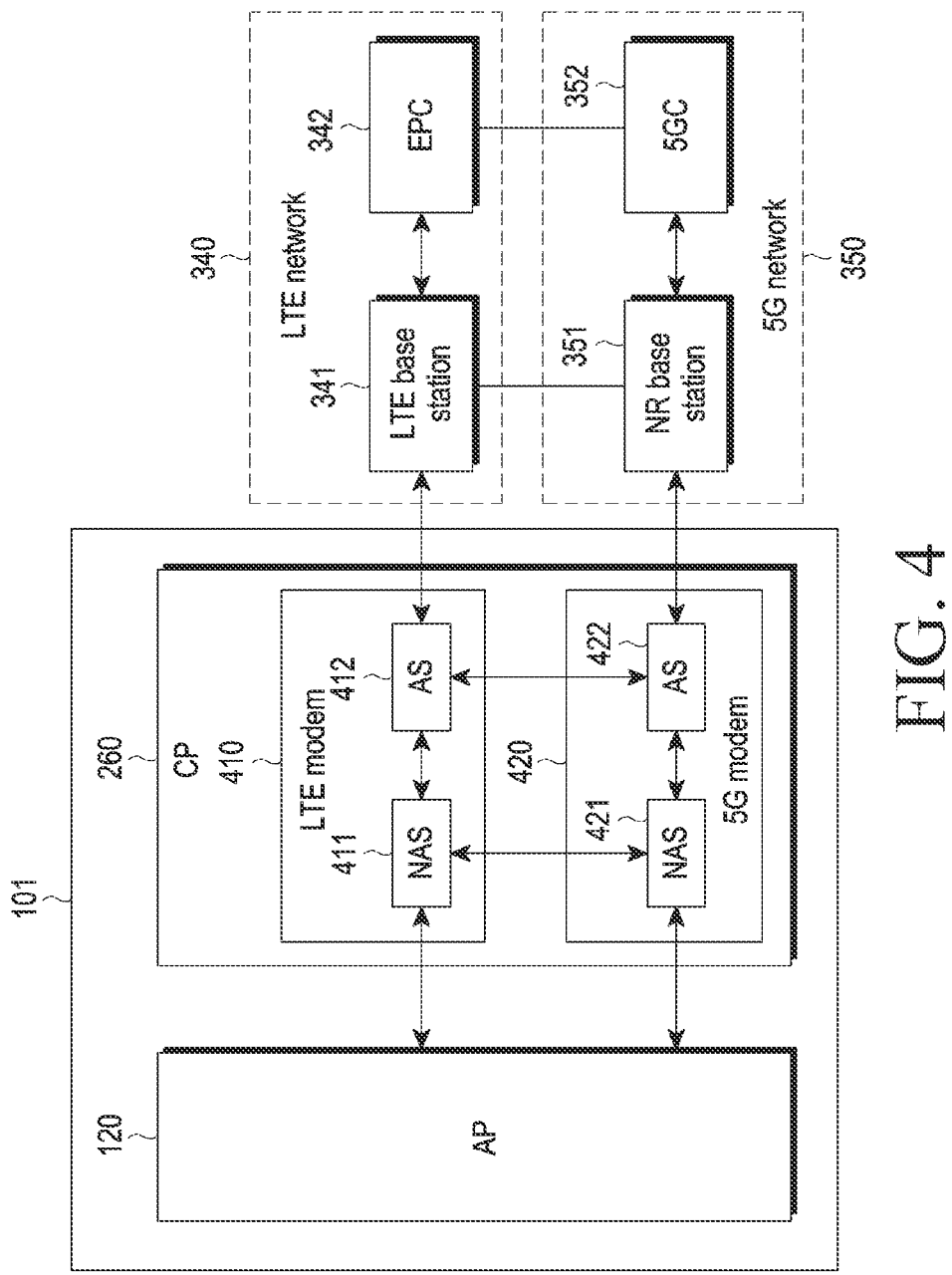
FIG. 4 is a block diagram illustrating an example electronic device according to various embodiments.

FIG. 4 is a block diagram illustrating an example electronic device according to various embodiments. Referring to FIG. 4, the electronic device 101 may include a processor (e.g., the application processor (AP) 120 and a communication processor (CP) (e.g., the integrated communication processor 260)). The communication processor 260 may include an LTE modem 410 and a 5G modem 420. FIG. 4 illustrates that the LTE modem 410 and the 5G modem 420 are included in one integrated communication processor 260, but as shown in FIG. 2A, they may be included in the plurality of communication processors 212 and 214, respectively. For example, the LTE modem 410 may correspond to the first communication processor 212 or be included in the first communication processor 212, and the 5G modem 420 may correspond to the second communication processor 214 or be included in the second communication processor 214.

According to various embodiments, the LTE modem 410 may include an LTE communication protocol stack. For example, the LTE modem 410 may include a non access stratum (NAS) 411 and an access stratum (AS) 412. At least one operation performed by the NAS 411 and/or the AS 412 may be understood as being performed, e.g., by at least one of the first communication processor 212 or the integrated communication processor 260 of the electronic device 101. The 5G modem 420 may include a 5G communication protocol stack. For example, the 5G modem 420 may include a NAS 421 and an AS 422. At least one operation performed by the NAS 421 and/or the AS 422 may be understood as being performed, e.g., by at least one of the second communication processor 214 or the integrated communication processor 260 of the electronic device 101.

According to various embodiments, the NAS 411 and 421 may correspond to the layer that transmits/receives traffic messages or signaling with the 5GC 352 of the 5G network 350 or the EPC 342 of the LTE network 340 with the electronic device 101 in the LTE protocol stack or 5G protocol stack. The NAS 411 and 421 may transfer related information or data to the processor 120 based on the message received through the AS 412 and 422. The AS 412 and 422 may correspond to the layer related to the connection with the LTE base station 341 of the LTE network 340 or the NR base station 351 of the 5G network 350. For example, the AS 412 and 422 may include layers of radio resource control (RRC), packet data convergence protocol (PDCP), radio link control (RLC), medium access control (MAC) and physical (PHY). According to an embodiment, the PDCP may be in charge of IP header compression/restoration. The RLC may perform an ARQ operation by reconfiguring a PDCP packet data unit (PDU) to an appropriate size. The MAC may perform an operation for multiplexing RLC PDUs into a MAC PDU and demultiplexing RLC PDUs from a MAC PDU. The PHY channel-codes and modulates higher layer data into orthogonal frequency division multiplexing (OFDM) symbols, transmits the OFDM symbols through a wireless channel or demodulates OFDM symbols received through a wireless channel, channel-decodes and transfers the same to a higher layer.

According to various embodiments, an electronic device 101 (e.g., at least one of the processor 120, the first communication processor 212, the second communication processor 214, the integrated communication processor 260, or the integrated SoC (not shown)) may receive an RRC connection reconfiguration (or RRC reconfiguration) message from the LTE network 340 or 5G network 350. The electronic device 101 may reconfigure the RRC connection based on the RRC connection reconfiguration message. The RRC connection reconfiguration message may include any one of an RRC connection reconfiguration message or an RRC reconfiguration message. The electronic device 101 may form an RRC connection with, e.g., the LTE network 340 or 5G network 350 and may then receive an RRC connection reconfiguration message. The electronic device 101 may transmit an RRC connection reconfiguration complete message, which indicates that the reconfiguration is complete, to the LTE network 340 or 5G network 350. The LTE network 340 or 5G network 350 may be a base station (e.g., at least one of an eNB 341, a gNB 351, an ng-eNB, or an en-gNB) corresponding to the communication for configuring the RRC connection reconfiguration message but, if some of the functions of the base station are virtualized, the network 400 may be implemented as at least part of a server for performing the virtualized functions and hardware for radio control. The LTE network 340 or 5G network 350 may be referred to as a serving cell. In an embodiment described below, for convenience, the 5G network 350 may be referred to as a first communication network, and the LTE network 340 may be referred to as a second communication network, but the disclosure is not limited thereby.

According to an embodiment, the process of the RRC connection reconfiguration may be one for reconfiguring the RRC connection (e.g., configuring, adjusting, and/or releasing a resource block (RB)) and synchronization and reconfiguration, setting up, adjusting, and/or releasing measurement, and adding, adjusting, and/or releasing an SCell. As part of the RRC connection reconfiguration process, NAS dedicated information may be transmitted from the LTE network 340 or 5G network 350 to the electronic device 101. When the electronic device 101 is in, e.g., an RRC connected state (RRC_CONNECTED state), the LTE network 340 or 5G network 350 may perform an RRC connection reconfiguration procedure. For example, if the RRC connection reconfiguration message includes a measurement configuration (e.g., measConfig of 3GPP TS 38.331 or 36.331), the electronic device 101 may perform a measurement configuration procedure (e.g., the measurement configuration procedure set forth in 3GPP TS 38.331 or 36.331).

As described above, according to an embodiment, the LTE network 340 or 5G network 350 may be configured to allow the electronic device 101 in the RRC connected state to perform measurement and reporting according to the measurement configuration. The measurement configuration may be provided via UE dedicated RRC signaling, e.g., an RRC connection reconfiguration message. For example, if the electronic device 101 performs 3GPP LTE communication with the LTE network 340 or communication for control of dual connectivity is set to 3GPP LTE communication, the electronic device 101 may be requested to perform the following types of communication:

intra-frequency measurement: measurement at downlink carrier frequency(ies) of serving cell(s)
inter-frequency measurement: measurement at frequencies different from any frequency among downlink carrier frequency(ies) of serving cell(s)
measurement in the frequency of inter-RAT (e.g., NR, UTRA, GERAN, CDMA 2000 HRPD or CDMA 2000 1×RTT)

For example, if the electronic device 101 performs 5G communication with the 5G network 350 or communication for control of dual connectivity is set to 5G communication, the following types of measurement may be performed.

As NR measurement, e.g., intra-frequency measurement and/or inter-frequency measurement in NR
Inter-RAT measurement of E-UTRA frequency The measurement configuration may include information about the measurement object (MO). The measurement object may include, e.g., the subcarrier spacing and frequency/time positions of the reference signal to be measured. The electronic device 101 may identify the frequency for measurement based on the measurement object in the measurement configuration. The measurement object may include a measurement object identity (e.g., ARFCN-ValueEUTRA and/or ARFCN-ValueNR), which is information indicating the frequency to be measured, or a cell blacklist and/or a cell whitelist.

According to an embodiment, the measurement configuration of the RRC connection reconfiguration message may include a reporting configuration. For example, the reporting configuration may include at least one of a reporting criterion, a reporting format, or an RS type, but is not limited thereto. The reporting criterion is a condition to trigger the UE to transmit a measurement report and may be a periodic or single event description. For, e.g., LTE communication, the reporting format may be information about quantity and relevant information (e.g., the number of cells to be reported) that the UE includes in the measurement report. For, e.g., 5G communication, the reporting format may be per-cell and per-beam quantity and other related information (e.g., the maximum per-cell number and the maximum number of cells to be reported) that is to be included in the measurement report. The RS type may denote, e.g., the RS of the beam to be used by the UE and the measurement result.

According to an embodiment, the measurement configuration of the RRC connection reconfiguration message may include at least one of measurement identity, quantity configuration, or measurement gap. The measurement identity may be a list of measurement identities associated with the measurement object. The quantity configuration may define a measurement filtering configuration and periodic reporting of measurement used in all event evaluation and related reporting. The measurement gap may be the period when the UE performs measurement, e.g., an interval during which uplink or downlink transmission is not scheduled.

According to various embodiments, the RRC-connected electronic device 101 may perform measurement on the measurement object. For example, the electronic device 101 may perform measurement on at least one of the RSRP, RSRQ, RSSI, or SINR corresponding to at least one of inter-frequency, intra-frequency, or inter-RAT based on the measurement configuration corresponding to each serving cell. "Electronic device 101 performs measurement on a communication signal" may refer, for example, to the electronic device 101 performing measurement on at least one of the RSRP, RSRQ, RSSI, or SINR at a reference point by a communication signal from the outside.

According to an embodiment, the electronic device 101 may determine whether the measurement result meets the reporting criteria. The reporting criteria may include, but are not limited to, the following:

Event A1: Serving becomes better than threshold
Event A2: Serving becomes worse than threshold
Event A3: Neighbour becomes offset better than PCell/PSCell (or SpCell of NR)
Event A4: Neighbour becomes worse than threshold
Event A5: PCell/PSCell (or, SpCell of NR) becomes worse than threshold1 and neighbor (or neighbour/SCell of NR) becomes better than threshold2
Event A6: Neighbour becomes offset better than SCell (or SCell of NR)
Event B1: Inter RAT neighbour becomes better than threshold
Event B2: PCell becomes worse than threshold1 and inter RAT neighbour becomes better than threshold2

The above-enumerated reporting criteria may follow, e.g., 3GPP TS 36.331 or 3GPP TS 38.331 but are not limited to a specific kind.

According to an embodiment, the electronic device 101 may perform the measurement, which needs to be performed by the measurement configuration, not constantly but at measurement periods. According to an embodiment, based on meeting the reporting criteria, the electronic device 101 may transmit a measurement report message to the LTE network 340 or 5G network 350 (e.g., the serving cell). For example, if the met reporting criterion among the above-described reporting criteria is maintained while the timer corresponding to the time-to-trigger value operates (e.g., before the timer expires), the electronic device 101 may transmit a measurement report message to the LTE network 340 or 5G network 350. For the measurement reporting process-triggered measurement identity, the electronic device 101 may configure the measurement result (e.g., measResults of 3GPP TS 38.331 or 3GPP TS 36.331) in the measurement report message. The information element (IE) of the measurement result may include the measurement result (e.g., at least one of RSRP, RSRQ, or SINR) for intra-frequency, inter-frequency, and inter-RAT mobility. For example, the measurement report message may include the measurement identity and the measurement result.

Hereinafter, a situation in which VoLTE is performed by performing EPS fallback according to a call request during 5G network connection is described with reference to FIGS. 5 and 6. According to various embodiments, the EPS fallback or RAT fallback may be performed in the form of a handover as shown in FIG. 5 or redirection as shown in FIG. 6 according to network implementation and operator policy.

Figure 5:
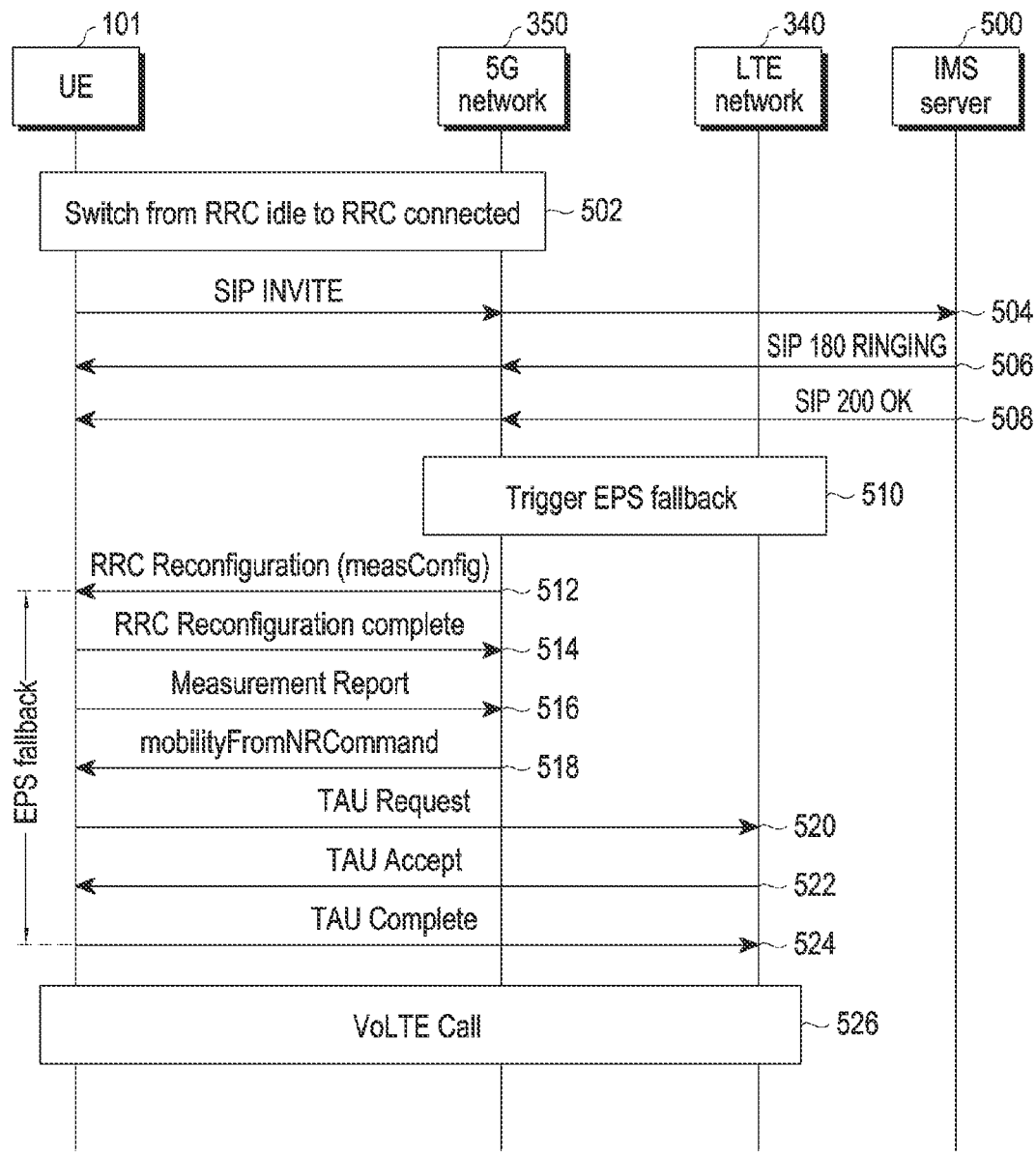
FIG. 5 is a flowchart illustrating an example operation for connecting to a communication network by an electronic device according to various embodiments.
Figure 6:
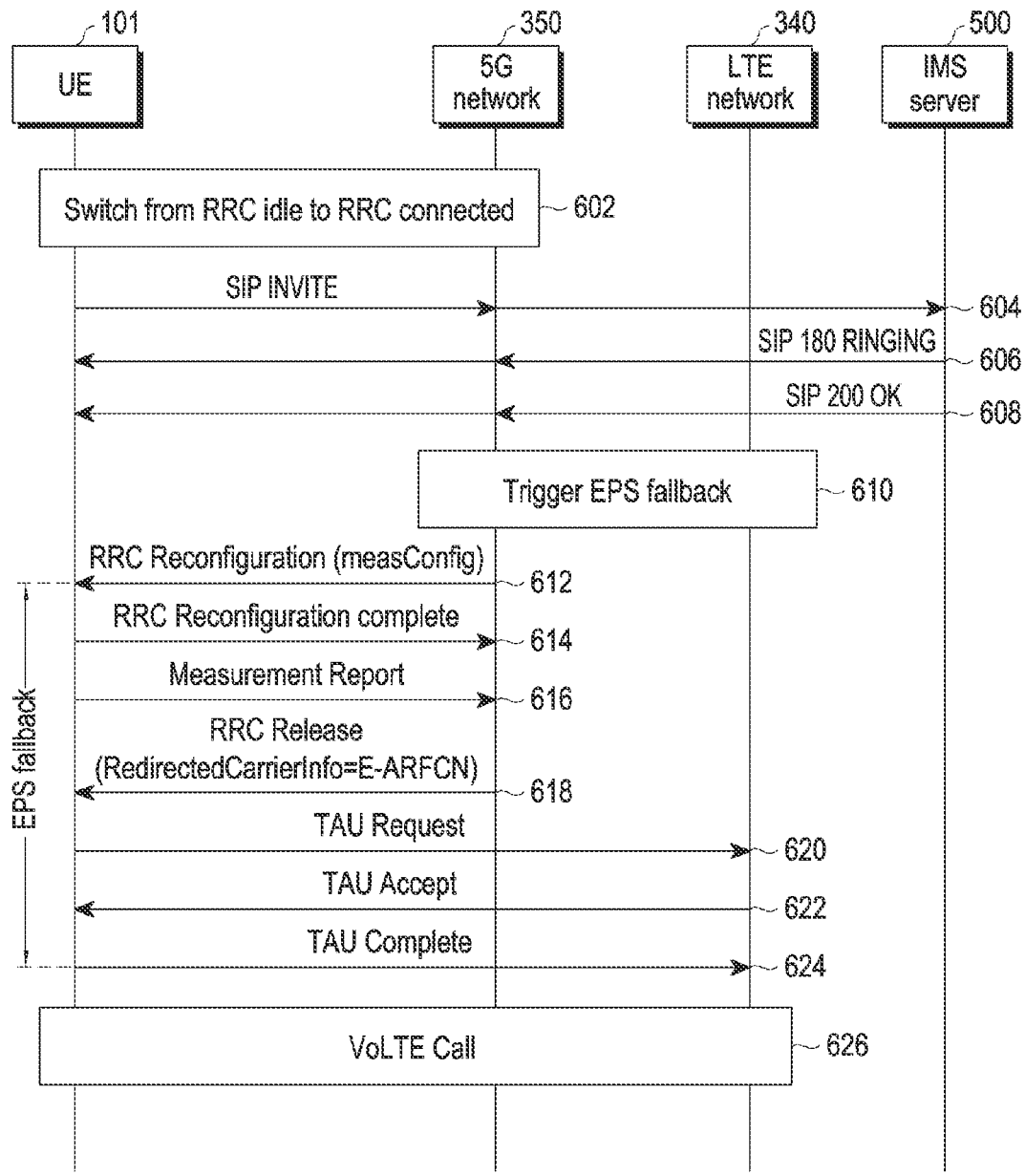
FIG. 6 is a flowchart illustrating an example operation for connecting to a communication network by an electronic device according to various embodiments.

FIG. 5 is a signal flowchart illustrating example handover-based EPS fallback operations according to various embodiments. Referring to FIG. 5, according to the user's call request, the electronic device 101 (e.g., the transmitting terminal (MO terminal)) and the 5G network 350 may be switched from the RRC idle state to the RRC connected state in operation 502. According to various embodiments, the electronic device 101 may transmit a SIP INVITE message to the IMS server 500 through the 5G network 350 in operation 504. Although not shown in FIG. 5, the 5G network 350 may transmit a paging signal to a receiving electronic device (e.g., an MT terminal). The receiving electronic device may be switched from the idle state to the active state according to the reception of the paging signal and may receive the SIP INVITE message sent from the transmitting electronic device 101. The receiving electronic device may receive the SIP INVITE message and may transmit a SIP 180 RINGING message to the IMS server 500. In operation 506, the IMS server 500 may transmit the SIP 180 RINGING message transmitted from the receiving electronic device to the electronic device 101, which is the transmitting terminal, through the 5G communication network. According to various embodiments, if the receiving electronic device (MT terminal) answers, a SIP 200 OK message may be transmitted to the IMS server 500. In operation 508, the IMS server 500 may transmit the SIP 200 OK message to the electronic device 101 through the 5G network 350.

According to various embodiments, the 5G network 350 may trigger EPS fallback in operation 510. When handover-based EPS fallback is configured in the 5G network 350 (e.g., gNB 351), the 5G network 350 may transmit an measConfig for LTE band measurement to the electronic device 101 through RRC reconfiguration in operation 512. According to the reception of the RRC reconfiguration in operation 512, the electronic device 101 may transmit a RRC reconfiguration complete to the 5G network 350 in operation 514. According to various embodiments, the electronic device 101 may report the LTE measurement information measured based on information included in the RRC reconfiguration (e.g., measurement object (MO)) to the 5G network 350 through the measurement report (MR) message in operation 516. Based on the received MR, the 5G network 350 may transmit information about the LTE band and cell to which the electronic device 101 is to be handed over to the electronic device 101 through a mobilityFromNRCommand in operation 518.

According to various embodiments, the electronic device 101 may perform a tracking area update (TAU) procedure with the LTE network 340 (e.g., the eNB 341/EPC 342) based on the corresponding LTE band and cell information. For example, the electronic device 101 may transmit a TAU request to the LTE network 340 in operation 520 and, in operation 522, may receive a TAU accept from the LTE network 340. The electronic device 101 may receive the TAU accept and, in operation 524, may complete the inter-RAT handover process for EPS fallback by transmitting a TAU complete to the LTE network 340. According to various embodiments, after the EPS fallback procedure is completed, the electronic device 101 and the LTE network 340 (e.g., the eNB 341/EPC 342) may set up a VoLTE call in operation 526.

FIG. 6 is a signal flowchart illustrating example redirection-based EPS fallback operations according to various embodiments. Referring to FIG. 6, according to the user's call request, the electronic device 101 (e.g., the transmitting terminal (MO terminal)) and the 5G network 350 (e.g., the gNBN 351/5GC 352) may be switched from the RRC idle state to the RRC connected state in operation 602. According to various embodiments, the electronic device 101 may transmit a SIP INVITE message to the IMS server 500 through the 5G network 350 in operation 604. Although not shown in FIG. 9, the 5G network 350 may transmit a paging signal to a receiving electronic device (e.g., an MT terminal). The receiving electronic device may be switched from the idle state to the active state according to the reception of the paging signal and may receive the SIP INVITE message sent from the transmitting electronic device 101. The receiving electronic device may receive the SIP INVITE message and may transmit a SIP 180 RINGING message to the IMS server 500. In operation 606, the IMS server 500 may transmit the SIP 180 RINGING message transmitted from the receiving electronic device to the electronic device 101, which is the transmitting terminal, through the 5G network 350. According to various embodiments, if the receiving electronic device (MT terminal) answers, a SIP 200 OK message may be transmitted to the IMS server 500. In operation 608, the IMS server 500 may transmit the SIP 200 OK message to the electronic device 101 through the 5G network 350.

According to various embodiments, the 5G network 350 may trigger EPS fallback in operation 610. The 5G network 350 may transmit a measConfig for LTE band measurement to the electronic device 101 through RRC reconfiguration in operation 612. According to the reception of the RRC reconfiguration in operation 612, the electronic device 101 may transmit a RRC reconfiguration complete to the 5G network 350 in operation 614. According to various embodiments, the electronic device 101 may report the LTE measurement information measured based on information included in the RRC reconfiguration (e.g., measurement object (MO)) to the 5G network 350 through the measurement report (MR) message in operation 616. According to various embodiments, if redirection-based EPS fallback is configured in the 5G network 350 (e.g., gNB 351), the 5G network 350 may include a specific LTE E-ARFCN (absolute radio frequency channel number) in an RRC release message and transmit it to the electronic device 101 in operation 618. The electronic device 101 may move to the LTE communication network, perform a cell scan on the corresponding E-ARFCN, and then proceed with a TAU procedure for camping on any one cell. For example, the electronic device 101 may perform a TAU procedure with the corresponding LTE communication network 340 (e.g., the eNB 341/EPC 342) according to the cell scan. For example, the electronic device 101 may transmit a TAU request to the LTE network 340 in operation 620 and, in operation 622, may receive a TAU accept from the LTE network 340. The electronic device 101 may receive the TAU accept and, in operation 624, may complete the inter-RAT handover process for EPS fallback by transmitting a TAU complete to the LTE network 340. According to various embodiments, after the EPS fallback procedure is completed, the electronic device 101 and the LTE network 340 may set up a VoLTE call in operation 626.

Hereinafter, methods for reducing current consumption in an electronic device according to various embodiments are described with reference to FIGS. 7 to 28. Methods described below may be performed through the electronic device 101 described above in connection with FIG. 1, 2A, 2B, 3A, 3B, or 3C.

Figure 7:
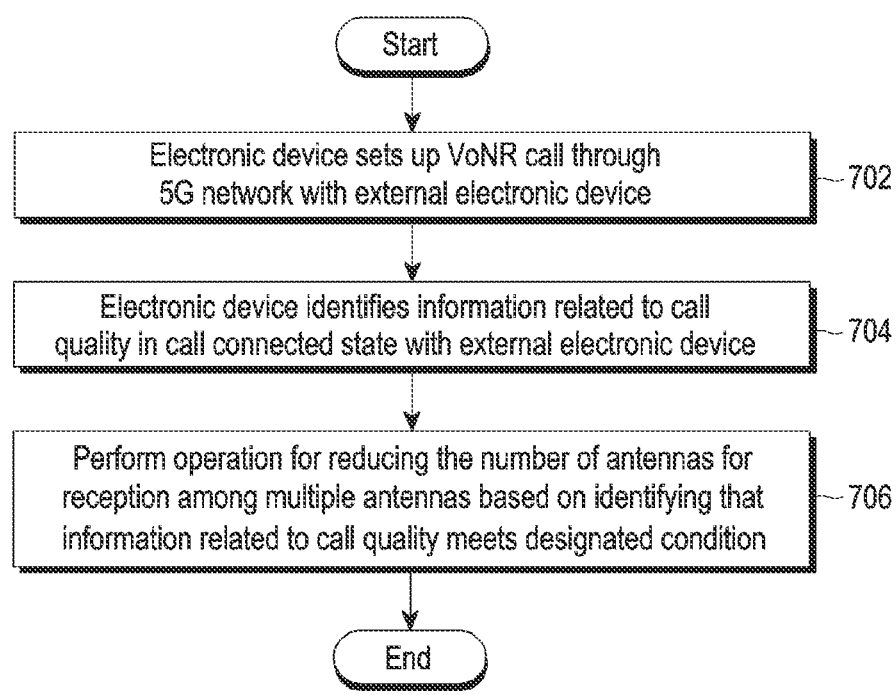
FIG. 7 is a flowchart illustrating example operations of an electronic device according to various embodiments.

FIG. 7 is a flowchart illustrating operations of an example electronic device according to various embodiments. Referring to FIG. 7, according to various embodiments, the electronic device 101 may make a call to or receive a call from an external electronic device. The electronic device 101 may perform a call setup procedure with the currently connected communication network. For example, the electronic device 101 (e.g., at least one of the processor 120, the first communication processor 212, the second communication processor 214, or the integrated communication processor 260) may set up a VoNR call with an external electronic device through the 5G network 350 in a state connected to the 5G network 350 in operation 702. According to various embodiments, when both the electronic device 101 and the 5G network support VoNR, the VoNR call may be set up, and if any one does not support VoNR, the call may be connected through VoLTE by the EPS fallback described above in connection with FIGS. 5 and 6.

According to various embodiments, the electronic device 101 may include whether VoNR is supported in the UE capability information exemplified in Table 1 below and notify the communication network.

TABLE 1

| UE-NR-Capability information element | |
|---|---|
| UE-NR-Capability-v1540 ::= | SEQUENCE { |
| sdap-Parameters    SDAP-Parameters | OPTIONAL, |
| overheatingInd    ENUMERATED {supported} | OPTIONAL, |
| ims-Parameters    IMS-Parameters | OPTIONAL, |
| fr1-Add-UE-NR-Capabilities-v1540 OPTIONAL, | UE-NR-CapabilityAddFRX-Mode-v1540 |
| fr2-Add-UE-NR-Capabilities-v1540 OPTIONAL, | UE-NR-CapabilityAddFRX-Mode-v1540 |
| fr1-fr2-Add-UE-NR-Capabilities OPTIONAL, | UE-NR-CapabilityAddFRX-Mode |
| nonCriticalExtension OPTIONAL | UE-NR-Capability-v1550 |
| } | |
| IMS-Parameters information element | |
| IMS-ParametersFRX-Diff ::= SEQUENCE { | |
| voiceOverNR    ENUMERATED {supported} | OPTIONAL, |
| ... | |
| } | |

Referring to Table 1 above, as "voiceOverNR" in the IE of "IMS-Parameters" in the UE capability information transmitted from the electronic device 101 to the communication network (e.g., the 5G network 350) is specified as "supported," the communication network may identify that the electronic device 101 is an electronic device supporting VoNR. According to various embodiments, when a call is received or transmitted by the electronic device 101 in a case in which both the electronic device 101 and the 5G network 350 support VoNR as described above, the call may be connected through VoNR.

According to various embodiments, the electronic device 101 may notify the communication network whether it supports VoNR by transmitting the UE capability information to the communication network when the electronic device 101 first registers its location in the communication network. Thereafter, if the UE capability information is updated, the electronic device 101 may transmit the updated information to the communication network (e.g., 5G network (e.g., gNB)). For example, in the 5G communication system, the electronic device 101 may update the UE capability information by setting the "NG-RAN Radio Capability Update" in the registration request message to 1 as exemplified in Table 2 below.

TABLE 2

NG-RAN Radio Capability Update (NG-RAN-RCU) (octet 3, bit 2)
Bit
UE radio capability update not needed
UE radio capability update needed Referring to Table 2, the electronic device 101 may set the "NG-RAN Radio Capability Update" in the registration request message to 1 and transmit it to the communication network, thereby notifying the communication network that the UE capability information needs to be updated. The communication network may identify that the electronic device 101 needs update of the UE capability through the registration request message transmitted from the electronic device 101. The communication network may transmit a UE capability enquiry message to the electronic device 101 to identify the UE capability update information. The electronic device 101 may receive the UE capability enquiry message from the communication network and transmit UE capability information including the updated information to the communication network. As described above, the UE capability information may include information regarding whether the electronic device 101 supports VoNR.

According to various embodiments, the electronic device 101 may connect the VoNR call by performing a VoNR call setup procedure as described above. After the VoNR call connection, the electronic device 101 may perform the call with the counterpart electronic device (e.g., an external electronic device). The throughput (T-put) required for VoNR may be relatively low since data for call is transmitted/received. For example, VoNR may be normally served even when the layers corresponding to multiple-input and multiple-output (MIMO) of the electronic device 101 are 2 layers, but the communication network may set 4 layers depending on the channel state. If four layers are configured in the electronic device 101, and signals are received through four antennas, i.e., 4Rx operation, unnecessary current consumption may occur. Table 3 below exemplifies the current consumption for each layer upon operating on VoNR and current consumption upon operating VoLTE.

TABLE 3

| | VoNR/VoLTE | | | |
|---|---|---|---|---|
| | VoNR | VoNR | VoNR | VoLTE |
| Frequency band | N78 TDD 100M | N78 TDD 20M | N3 TDD 20M | B20 100M |
| Bandwidth | 256 QAM | 256 QAM | 256 QAM | |
| Modulation scheme | 4 × 4 | 4 × 4 | 2 × 2 | |
| MIMO | | | | |
| voice codec | AMR WB 12.65 | AMR WB 12.65 | AMR WB 12.65 | AMR WB 12.65 |
| VBAT | 245 mA | 195 mA | 180 mA | 105 mA |
| RFIC | 85 mA | 55 mA | 38 mA | 16 mA |
| MODEM | 65 mA | 49 mA | 48 mA | 22 mA |

Referring to Table 3, it may be identified that the power consumption of VBAT, RFIC, and MODEM differs according to frequency band, bandwidth, modulation scheme, MIMO, or voice codec. The consumed current of the VBAT may include the current consumed in the overall electronic device 101. The consumed current of the RFIC may include the current consumed in at least one of the first RFIC 222, second RFIC 224, or third RFIC 226 of FIGS. 2A and 2B. The consumed current of the MODEM may include the current consumed in at least one of the first communication processor 212, the second communication processor 214, or the integrated communication processor 260 of FIG. 2A or 2B. For example, referring to Table 3, it may be identified that VoNR consumes relatively more current than VoLTE. It may be identified that even for the same VoNRs, current consumption is relatively larger when a bandwidth of 100 MHz is used than when a bandwidth of 20 MHz is used, and current consumption is relatively larger when the layers corresponding to MIMO are 4 layers (e.g., 4×4) are used than when the layers are 2 layers.

According to various embodiments, the electronic device 101 attaches to the 5G network 350, registers VoNR, and then, upon call connection, may set up a VoNR call. To reduce current consumption according to Table 3, the electronic device 101 may perform EPS fallback on VoNR as described above in connection with FIGS. 5 and 6, but the call connection may be delayed due to the EPS fallback. For example, even when the electronic device 101 is connected to the 5G network through the SA scheme, if switching to VoLTE by EPS fallback technology upon call connection for various reasons, call connection may take a relatively long time. According to various embodiments, if a service is provided after EPS fallback to VoLTE considering current consumption or heat generation although the electronic device 101 is capable of VoNR connection, a call connection may take a long time as described above in connection with FIGS. 5 and 6. The electronic device 101 may fail to receive the high-quality service provided by VoNR or specified functions of VoNR. According to various embodiments described below, the electronic device 101 may reduce current consumption by various methods if call quality is ensured even in the VoNR call-connected state.

According to various embodiments, the electronic device 101 may identify information related to call quality in a VoNR call connected state with the external electronic device in operation 704. For example, the information related to the call quality may include at least one of signal to interference and noise ratio (SINR), reference signal received power (RSRP), block error rate (BLER), modulation and coding scheme (MCS), residual error, or real time protocol (RTP) packet non-received information.

According to various embodiments, the electronic device 101 may perform at least one operation to reduce current consumption based on identifying that the call quality-related information meets a designated condition in operation 706. For example, the electronic device 101 may reduce current consumption by performing the operation of reducing the number of antennas for reception among the plurality of antennas (e.g., from 4Rx to 2Rx) based on identifying that the call quality-related information meets the designated condition. According to various embodiments, the operation of reducing current consumption may be implemented in other various manners than reducing the number of antennas. For example, the electronic device 101 may reduce current consumption by limiting the overall bandwidth of the serving cell and reduce current consumption by reducing the number of CAs. In various embodiments described below, the operation of reducing the number of reception antennas is described as an example of reducing current consumption, but embodiments are not limited thereto. According to various embodiments, although FIG. 7 illustrates performing the operation of reducing the number of antennas for reception in the call connected state, the operation may alternatively be performed before or during the call setup procedure. According to various embodiments, when the electronic device 101 performs the operation of reducing the number of reception antennas in the call connected state, call quality may temporarily be degraded but a call drop may not immediately occur.

Specific examples for determining whether call quality is ensured using each piece of information related to call quality are described below. According to various embodiments, the electronic device 101 may identify that call quality is ensured based on identifying that the SINR is a first setting value (e.g., 8 dB) or more. Upon identifying that the SINR is the first setting value (e.g., 8 dB) or more in the VoNR call connected state, the electronic device 101 may determine that call quality is ensured and control to reduce the number of reception antennas to reduce current consumption. Upon identifying that the SINR is a second setting value (e.g., 5 dB) or less over time in the VoNR call connected state, the electronic device 101 may determine that call quality is not ensured and control to increase the number of reception antennas.

According to various embodiments, the electronic device 101 may identify that call quality is ensured based on identifying that the BLER is a third setting value (e.g., 20%) or less. For example, upon identifying that the BLER is the third setting value (e.g., 20%) or less in the VoNR call connected state, the electronic device 101 may determine that call quality is ensured and control to reduce the number of reception antennas to reduce current consumption. Upon identifying that the BLER is more than the third setting value (e.g., 20%) over time in the VoNR call connected state, the electronic device 101 may determine that call quality is not ensured and control to increase the number of reception antennas.

According to various embodiments, when the downlink modulation coding scheme (MCS) is the maximum value or a set value or more, the electronic device 101 may identify that call quality is ensured. The downlink MCS is a value for determining the modulation scheme to be used for data to be transmitted from the communication network to the electronic device 101. The communication network may determine the modulation scheme according to the channel environment reported by the electronic device 101 and transfer it to the electronic device 101 through downlink control indicator (DCI). The electronic device 101 may identify the DCI transmitted from the communication network and demodulate the packets received based on the set modulation scheme. For example, as shown in Table 4 below, the modulation order corresponding to the MCS may be determined, and the modulation order may refer, for example, to the number of bits that may be transmitted from one resource element (RE).

TABLE 4

| modulation scheme | modulation order |
|---|---|
| BPSK | 1 |
| QPSK | 2 |
| 16 QAM | 4 |
| 64 QAM | 6 |
| 256 QAM | 8 |

For example, as the modulation order increases, more data may be transmitted in the same bandwidth and time, but it may be more vulnerable to noise and interference by other signals around. Thus, under a poor channel environment, the communication network may lower the modulation order through the MCS and transmit data. If the channel environment is good, the communication network may set a higher modulation order for relatively fast transmission. The electronic device 101 may determine whether call quality is ensured through the MCS set from the communication network. For example, if the electronic device 101 supports 256QAM, and the communication state is good, the communication network may set the modulation order to 8. The electronic device 101 may determine that call quality is ensured based on the modulation order and perform the operation of reducing the number of reception antennas. Thereafter, as the channel state is changed, if the modulation order is set to 6, the electronic device 101 may perform the operation of increasing the number of reception antennas. According to various embodiments, the modulation order or reference value of modulation scheme (MCS) for determining that call quality is ensured may be set to the maximum value as settable in the electronic device 101 or an average for a set time. For example, when the electronic device 101 supports 256QAM but the channel state is poor, the MCS may be set to 18 which corresponds to the modulation order of 6. In such a case, the average MCS during a previous predetermined time, e.g., previous 10 seconds, may be 18, and the reference value of MCS may be set to 18. If the MCS set by the communication network is not less than 18 set as the reference value, the electronic device 101 may determine that call quality is ensured and perform the operation of reducing the number of reception antennas.

According to various embodiments, the electronic device 101 may identify whether call quality is ensured based on the residual error. For example, upon identifying that the residual error is a fourth setting value (e.g., 10%) or less in the VoNR call connected state, the electronic device 101 may determine that call quality is ensured and control to reduce the number of reception antennas to reduce current consumption. Upon identifying that the residual error is more than the fourth setting value (e.g., 10%) over time in the VoNR call connected state, the electronic device 101 may determine that call quality is not ensured and control to increase the number of reception antennas. The residual error may refer, for example, to an error that occurs due to failure in transmission despite retransmission by the maximum number of times at the hybrid automatic repeat request (HARQ). The occurrence of the residual error may refer, for example, to occurrence of HARQ data loss and this corresponds to an environment in which performance degradation occurs. Thus, it may be used as a condition for determining whether call quality is ensured. For example, the occurrence of the residual error may be regarded as impossibility of normally receiving data packets because the data packets are broken, and this may be related to the BLER. For example, if a BLER of 10% or more occurs, communication may be determined as having a problem. If a residual error of the fourth setting value (e.g., 10%) or more occurs in the downlink packets generated during a predetermined time, the electronic device 101 may control to increase the number of reception antennas and, if less than the fourth setting value, control to reduce the number of reception antennas. According to various embodiments, if a predetermined number of, or more, consecutive residual errors occur, the electronic device 101 may control to increase the number of reception antennas. In contrast, if no residual error occurs for HARQ data a predetermined number of times or more in a state in which the number of reception antennas has been increased or if no residual error occurs during a predetermined time, the electronic device 101 may control to reduce the number of reception antennas.

According to various embodiments, the electronic device 101 may identify whether call quality is ensured based on the real time protocol (RTP) packet For example, the electronic device 101 may determine whether call quality is ensured based on the number of non-received RTP packets. The RTP packet may include, for example, voice data, and RTP packets should be continuously received for the receive side to seamlessly hear the voice. If there is a packet loss in the middle or no packets are downstreamed during a predetermined time, the electronic device 101 may experience voice drops or silence or such call quality degradation. As a common way to prevent such call quality degradation, the electronic device 101 may have a buffer to reproduce the other party's voice seamlessly through buffering when transmission of RTP packets is delayed. When packet loss occurs, the electronic device 101 may use an algorithm that restores the voice by referring to the previous or subsequent packets received. If packet transmission is delayed for a longer time than the time for which packets may be stored in the buffer or if packets are not transmitted, and voice restoration fails, the user may experience degradation of voice quality that he may perceive. According to various embodiments, if the RTP packet having a specific sequence number is not received or no RTP packet is received for a longer time than the length of the buffer in a state in which the number of reception antennas has been reduced, the electronic device 101 may control to increase the number of reception antennas. The size of the buffer may be varied by the own algorithm of the electronic device 101 depending on the channel environment and may have a size corresponding to 2 or 3 RTP packets or 5 or 6 RTP packets. If the buffer size increases, it is possible to respond to a longer packet data transmission delay, but the difference between the time when the other party speaks and the time when the user hears it increases as well, thus causing a voice reception delay. Thus, it may be avoided to use a large-capacity buffer despite a good channel circumstance. According to various embodiments, the electronic device 101 may set the size of the buffer being currently used as a criterion for determining whether call quality is ensured. For example, if the electronic device 101 is currently using a buffer having a size corresponding to three RTP packets, the electronic device 101 may control to increase the number of reception antennas when failing to receive three or more consecutive RTP packets while controlling to reduce the number of reception antennas. Further, if failure to receive RTP packets does not occur for a predetermined number of packets or for a predetermined time in a state in which the number of reception antennas has been controlled to be increased, the electronic device 101 may control to decrease the number of reception antennas. For example, if RTP packets are received for 10 seconds without missing after the number of reception antennas has been switched to four due to failure to receive RTP packets during a call, the electronic device 101 may switch the number of reception antennas back to two. The state in which the electronic device 101 uses four antennas as the reception antennas and/or receives signals and/or data using four reception antennas is referred to as a '4Rx mode,' and the state in which the electronic device 101 uses two antennas as the reception antennas and/or receives signals and/or data using two reception antennas is referred to as a '2Rx mode,' but embodiments are not limited by these terms.

Various embodiments in which the electronic device 101 receives the number of reception antennas are described below with reference to FIGS. 8, 9, 10, 11, 12, and 13. In the following embodiments, an example of switching from the 4Rx mode in which four reception antennas are operated to the 2Rx mode in which two reception antennas are operated is described, but the various embodiments are not limited in this respect.

According to various embodiments, the communication network may set layers corresponding to the multiple-input and multiple-output (MIMO) based on the information received from the electronic device 101 and notify the electronic device 101. The electronic device 101 may set the number of reception antennas based on the layers received from the communication network. For example, when the communication network sets four layers (e.g., 4×4), the electronic device 101 may operate in the 4Rx mode of receiving signals using four reception antennas. When the communication network sets two layers (e.g., 2×2), the electronic device 101 may operate in the 2Rx mode of receiving signals using two reception antennas or the 4Rx mode of receiving signals using four reception antennas. When the electronic device 101 operates in the 4Rx mode in the state of being configured with two layers, two of the four reception antennas may be operated as diversity antennas.

According to various embodiments, as described above, if call quality is ensured in the VoNR call connected state of the electronic device 101, the electronic device 101 may switch from the 4Rx mode to the 2Rx mode, reducing current consumption. If the channel state of the electronic device 101 is good and the communication network configures four layers, the electronic device 101 cannot operate in the 2Rx mode but may operate only in the 4Rx mode.

According to various embodiments, if call quality is ensured in the VoNR call connected state of the electronic device 101, the electronic device 101 may lead the communication network to configure two layers to be able to operate in the 2Rx mode according to various embodiments described below. For example, the electronic device 101 may lead the communication network to configure two layers by reporting the rank indicator (RI) as 2, not 4, although the channel state is good. When the electronic device 101 reports an RI set to be different from the actual one as described above, this may be referred to as reporting of a fake RI, but the disclosure is not limited by this terminology. For example, the electronic device 101 may report the RI of the electronic device 101 to the communication network through channel state information (CSI) reporting, and the communication network may determine layers to be used for actual communication by referring to it. According to various embodiments, even in a context in which the electronic device 101 may indeed use four layers with the communication network, the electronic device 101 may report the RI, as 2, to the communication network so that the communication network may configure two layers.

According to various embodiments, the electronic device 101 may lead the communication network to configure two layers by transmitting a fake SRS or refraining from transmitting an SRS. An example of SRS transmission is described below with reference to FIGS. 8, 9, 10, 11, and 12.

Figure 8:
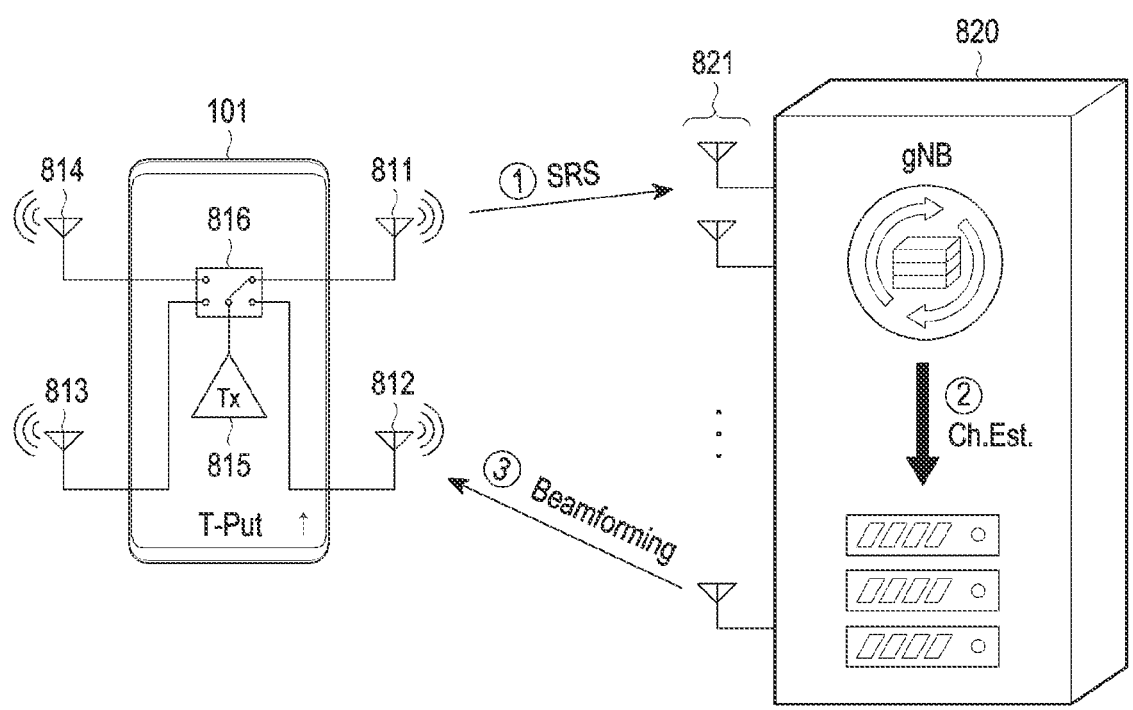
FIG. 8 is a view illustrating transmission of a reference signal by an example electronic device according to various embodiments.
Figure 9:
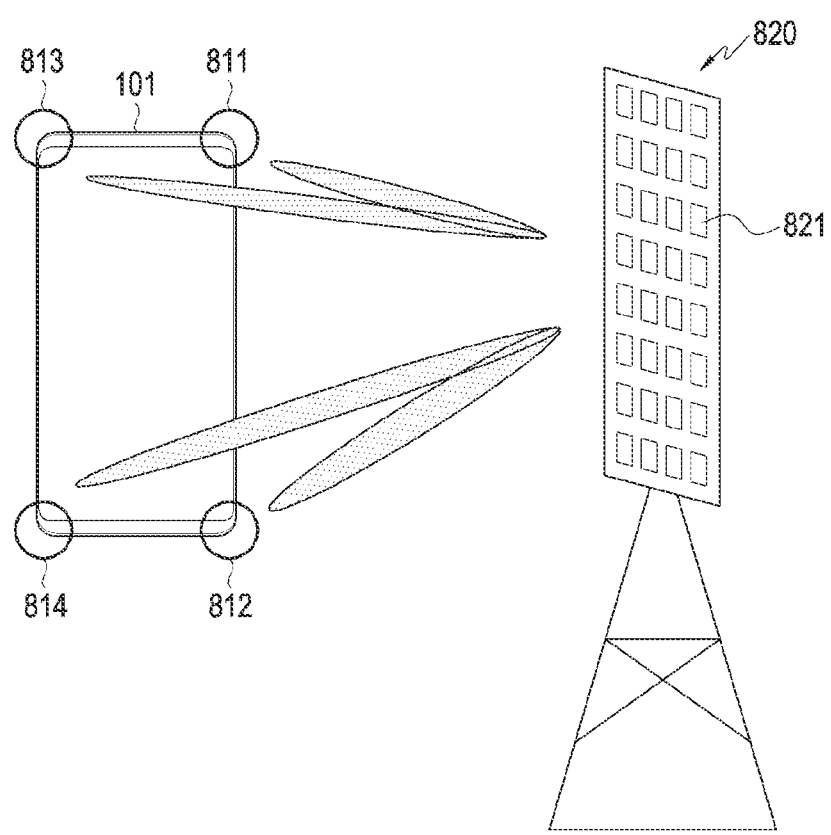
FIG. 9 is a view illustrating transmission of a reference signal by an example electronic device according to various embodiments.

FIGS. 8 and 9 are views illustrating transmission of a reference signal by an example electronic device according to various embodiments. Referring to FIG. 8, an electronic device 101 (e.g., the electronic device 101 of FIG. 1) may transmit a reference signal (e.g., an SRS) through four antennas (e.g., a first antenna 811, a second antenna 812, a third antenna 813, and a fourth antenna 814). For example, the electronic device 101 may amplify the reference signal through at least one power amplifier (PA) 815 and may transmit the amplified reference signal to the first antenna 811, the second antenna 812, the third antenna 813, and the fourth antenna 814 through at least one switch 816. The reference signal (e.g., an SRS) transmitted through each antenna (e.g., the first antenna 811, the second antenna 812, the third antenna 813, and the fourth antenna 814) of the electronic device 101 may be received through each antenna 821 of a base station 820 (e.g., a gNB). According to various embodiments, the electronic device 101 may transmit the reference signal through a plurality of power amplifiers (e.g., RFFE). For example, the electronic device 101 may configure the signal transmitted through the first antenna 811 or third antenna 813 to be processed through the first amplifier (e.g., first RFFE) and configure the signal transmitted through the second antenna 812 or fourth antenna 814 to be processed through the second amplifier (e.g., second RFFE).

According to various embodiments, the base station 820 may receive the reference signal transmitted from the electronic device 101 and may estimate the channel (ch.est.) for each antenna (e.g., the first antenna 811, the second antenna 812, the third antenna 813, and the fourth antenna 814) of the electronic device 101 from the received reference signal. The base station 820 may transmit a beamformed signal to each antenna of the electronic device 101 based on the channel estimation. According to various embodiments, the base station 820 may set an MCS level for the uplink signal of the electronic device 101 based on the channel estimation and include configuration information about the set MCS level, as SRS resource indicator (SRI) information, in the downlink control information (DCI) and transmit it to the electronic device 101. The electronic device 101 may determine the transmission power of a physical uplink shared channel (PUSCH) based on the parameter set for power control included in the SRI.

Although FIG. 8 illustrates one power amplifier 815 and one switch 816 connected with a plurality of antennas (a first antenna 811, a second antenna 812, a third antenna 813, and a fourth antenna 814) for ease of description, it will readily be appreciated by one of ordinary skill in the art that embodiments of the disclosure are not limited thereto. As an example, the electronic device 101 may further include components included in the electronic device 101 shown in FIG. 1.

FIG. 8 illustrates that the first antenna 811, the second antenna 812, the third antenna 813, and the fourth antenna 814 are disposed outside the electronic device 101, but this is for convenience of description. It will be appreciated by one of ordinary skill in the art that the first antenna 811, the second antenna 812, the third antenna 813, and the fourth antenna 814 may be positioned inside the housing forming the exterior of the electronic device 101 and/or in at least a portion of the housing, and this is also applicable to other figures.

Referring to FIG. 9, the base station 820 may transmit the beamformed signal through an array antenna 821 including a plurality of (e.g., 32) antennas. The signal transmitted from the base station 820 may be received through each antenna (e.g., the first antenna 811, the second antenna 812, the third antenna 813, and the fourth antenna 814) of the electronic device 101 and, as shown in FIG. 9, a signal in a beam shape directed by the beamforming of the base station 820 may be received by each antenna (e.g., the first antenna 811, the second antenna 812, the third antenna 813, and the fourth antenna 814) of the electronic device 101.

As illustrated in FIGS. 8 and 9, if the electronic device 101 transmits a reference signal (e.g., an SRS) through a plurality of transmission paths, the base station 820 may identify the channel environment with each antenna (e.g., the first antenna 811, the second antenna 812, the third antenna 813, and the fourth antenna 814)) of the electronic device 101 and perform beamforming, enhancing the reference signal received power (RSRP) and/or signal to noise ratio (SNR) of the downlink channel. If the RSRP and/or SNR of the downlink channel is enhanced, the rank index (RI) or channel quality indicator (CQI) for the electronic device may be increased. The base station 820 allocates a high rank or modulation and code schemes (MCS) to the electronic device 101 based on the enhanced performance of the electronic device 101 so that the downlink throughput of the electronic device 101 may be enhanced.

According to various embodiments, the base station 820 may use a downlink reference signal for downlink channel estimation. For example, if the base station 820 transmits the downlink reference signal to the electronic device 101, the electronic device 101 may receive the downlink reference signal transmitted from the base station 820 and perform channel estimation. The electronic device 101 may transmit the result of channel estimation to the base station 820, and the base station 820 may perform downlink beamforming with reference to the result of the channel estimation transmitted from the electronic device 101. According to various embodiments, when the base station 820 performs channel estimation by the reference signal (e.g., an SRS) transmitted from the electronic device 101, channel estimation may be performed faster than the channel estimation by the downlink reference signal, According to various embodiments, a first communication network (e.g., a base station (gNB)) or a second communication network (e.g., a base station (eNB)) may send a request for various configuration information for the electronic device 101 by transmitting a UE capability enquiry message to the electronic device 101. For example, a first communication network (e.g., a base station (gNB)) or a second communication network (e.g., a base station (eNB)) may send a request for information related to the reception antenna of the electronic device 101 through the UE capability enquiry message. The electronic device 101 may receive the UE capability enquiry message from the first communication network or the second communication network and, in response thereto, may transmit a UE capability information message to the first communication network or the second communication network. According to various embodiments, information related to the reception antenna of the electronic device 101, such as 'supportedSRS-Tx-PortSwitch t1r4' or 'supportedSRS-TxPortSwitch t2r4,' may be included in the UE capability information message, according to the content of the UE capability enquiry message.

As the antenna-related information is specified as 'supportedSRS-TxPortSwitch t1r4' or 'supportedSRS-TxPortSwitch t2r4,' the first communication network may determine that the electronic device 101 may transmit signals using four reception antennas and transmit an RRC reconfiguration message including information for the time of transmission of a reference signal (e.g., an SRS) for each of the four antennas.

Figure 10:
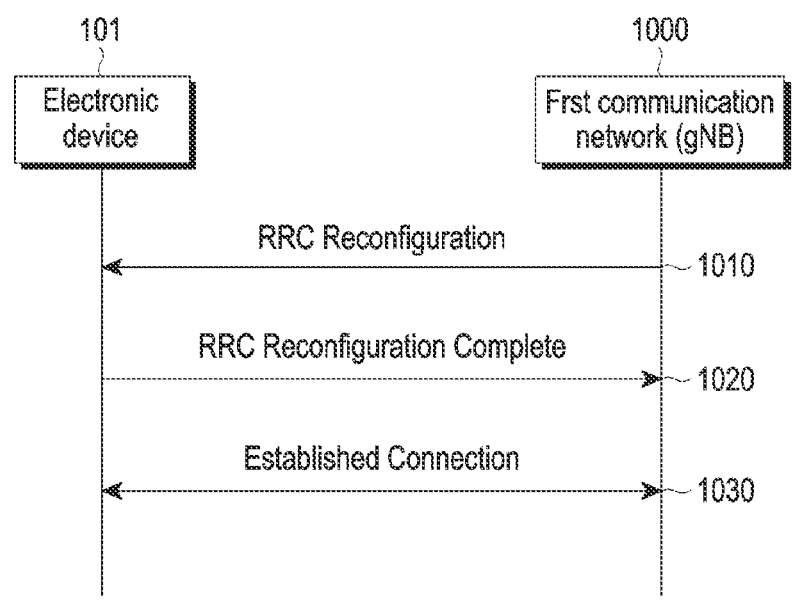
FIG. 10 is a flowchart illustrating an example signal transmission/reception procedure between an electronic device and a communication network according to various embodiments.

FIG. 10 is a flowchart illustrating a signal transmission/reception procedure between an example electronic device and a communication network according to various embodiments. Referring to FIG. 10, an electronic device 101 may establish an RRC connection with a first communication network (e.g., a base station (gNB)) 1000 through a random access channel (RACH) procedure.

According to various embodiments, in operation 1010, the first communication network 1000 may transmit an RRC reconfiguration message to the electronic device 101. For example, the first communication network 1000 may transmit an RRC reconfiguration message in response to the RRC request message transmitted by the electronic device 101. Referring to Table 5 below, information related to SRS antenna switching (e.g., SRS-ResourceSet) may be included in the RRC reconfiguration message.

TABLE 5

SRS-ResourceSet
  srs-ResourceSetId: 1
  srs-ResourceIdList: 4 items
    Item 0
      SRS-ResourceId: 1
    Item: 1
      SRS-ResourceId: 2
    Item 2
      SRS-ResourceId: 3
    Item 3
      SRS-ResourceId: 4
  resourceType: periodic (2)
    periodic
  usage: antennaSwitching (3)
  alpha: alpha1 (7)
  p0: −62dBm
  pathlossReferenceRS: ssb-Index (0)
    sub-Index: 1

Further, the RRC reconfiguration message may include information regarding a time point at which the electronic device 101 transmits a reference signal (e.g., an SRS) through each antenna as shown in Table 6 below.

TABLE 6 perodicityAndOffset-p s120 : 17
perodicityAndOffset-p s120 : 7
perodicityAndOffset-p s120 : 13
perodicityAndOffset-p s120 : 3
nrofSymbols n1

Referring to the RRC reconfiguration message, it may be seen that as specified as "nrofSymbols n1", the duration of SRS transmission may be determined as an allocated symbol. Further, referring to the RRC reconfiguration message, as specified as "periodicityAndOffset-p s120: 17", the first SRS may be set to be transmit in the 17th slot while being transmitted once every 20 slots. As specified as "periodicityAndOffset-p s120: 7", the second SRS may be set to be transmitted in the 7th slot while being transmitted once every 20 slots. As specified as "periodicityAndOffset-p s120: 13", the third SRS is transmitted in the 13th slot while being transmitted once every 20 slots. As specified as "periodicityAndOffset-p s120: 3", the fourth SRS is set to be transmitted in the 3rd slot while being transmitted once every 20 slots. According to various embodiments, the electronic device 101 may transmit four SRSs at different times through the respective antennas every 20 slots according to the configuration of RRC reconfiguration. The size of one slot may be determined by the subcarrier spacing (SCS). For example, when the SCS is 30 KHz, the time interval of one slot may be 0.5 ms, and the time interval of 20 slots may be 10 ms. Accordingly, the electronic device 101 may repeatedly transmit the SRS at different times through the respective antennas every 10 ms. According to various embodiments, one slot may include 14 symbols and, assuming that one symbol is allocated for one SRS transmission, it may have a symbol duration (or symbol enable time) of 0.5 ms*1/14=35 μs (0.035 ms). According to various embodiments, in operation 1020, the electronic device 101 may transmit an RRC reconfiguration complete message to the first communication network 1000. As the RRC reconfiguration procedure is normally completed, in operation 1030, the electronic device 101 and the first communication network 1000 may complete RRC connection establishment.

Figure 11:
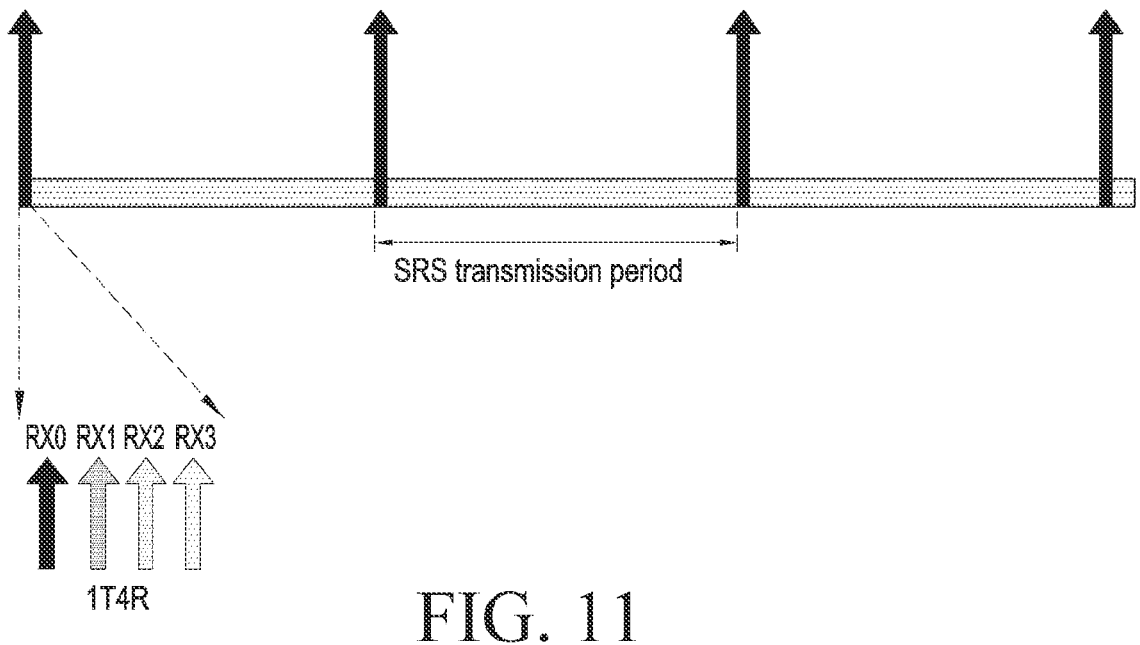
FIG. 11 is a view illustrating an example transmission period of a reference signal according to various embodiments.
Figure 12:
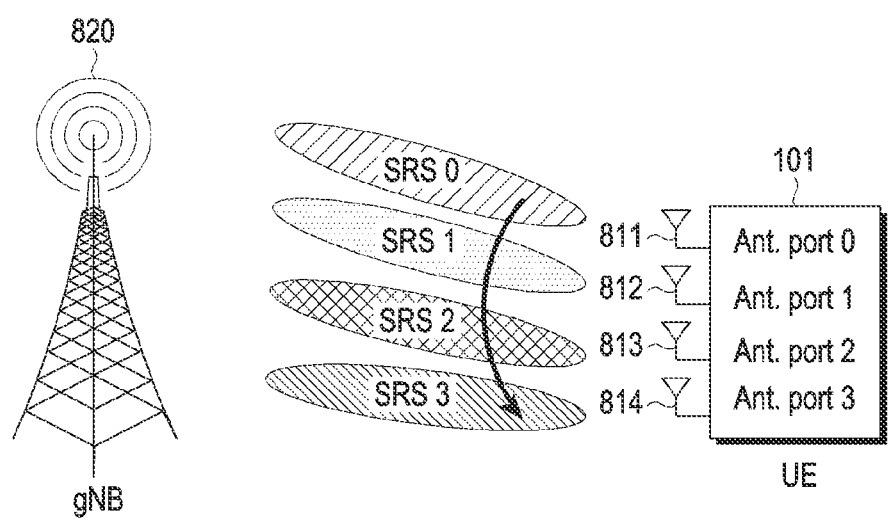
FIG. 12 is a view illustrating a concept of transmission of a reference signal by an example electronic device according to various embodiments.

FIG. 11 is a view illustrating an example transmission period of a reference signal according to various embodiments. FIG. 12 is a view illustrating a concept of transmission of a reference signal by an example electronic device according to various embodiments.

Referring to FIGS. 11 and 12, e.g., a set number (e.g., four) of SRSs may be transmitted every set SRS transmission period (e.g., 10 ms, 20 ms, 40 ms, or 80 ms). As described above in connection with FIG. 10, when the electronic device (e.g., the electronic device 101 of FIG. 1) is set to '1T4R', the electronic device may transmit four SRS at different times through the respective antennas in 20 slots (e.g., 10 ms) every SRS transmission period (e.g., 10 ms, 20 ms, 40 ms, or 80 ms) according to the setting of the RRC reconfiguration. For example, the electronic device may transmit the first SRS (SRS 0) through the first antenna 811 (RX0) (Ant.port0) in the 17th slot among the 20 slots, transmit the second SRS (SRS 1) through the second antenna 812 (RX1) (Ant.port1) in the 7th slot, transmit the third SRS (SRS 2) through the third antenna 813 (RX2) (Ant.port2) in the 13th slot, and transmit the fourth SRS (SRS 3) through the fourth antenna 814 (RX3) (Ant.port3) in the third slot.

According to various embodiments, when the electronic device 101 is set to '2T4R', the electronic device may transmit four SRS at different times through the respective antennas in 20 slots (e.g., 10 ms) every SRS transmission period (e.g., 10 ms, 20 ms, 40 ms, or 80 ms) according to the setting of the RRC reconfiguration. For example, at the first time, the electronic device 101 may transmit the first SRS (SRS 0) through the first antenna 811 (RX0) (Ant.port0) and transmit the second SRS (SRS 1) through the second antenna 812 (RX1) (Ant.port1). At the second time, the electronic device 101 may transmit the third SRS (SRS 2) through the third antenna 813 (RX2) (Ant.port2) and transmit the fourth SRS (SRS 3) through the fourth antenna 814 (RX3) (Ant.port3).

According to various embodiments, the reference signal may be a sounding reference signal (SRS) used for multi-antenna signal processing (e.g., multi input multi output (MIMO) or beamforming) through uplink channel state measurement, but embodiments of the disclosure are not limited thereto. For example, although SRS is used as an example of the reference signal in the above description or the following description, without being limited thereto, any type of uplink reference signal (e.g., uplink demodulation reference signal (DM-RS)) transmitted from the electronic device 101 to the base station signal may be included in the reference signal.

According to various embodiments, the electronic device 101 may transmit the SRS corresponding to each srs-Resource to the communication network through four different antennas, and the communication network may estimate the channel environment through the received SRS and determine layers. For example, when the channels estimated with the SRSs received from four antennas are all good, the communication network may configure four layers for the electronic device 101 and, if it is determined that the channel environments of some antennas are inappropriate, configure two layers or one layer. For example, when the communication network configures four layers and transmits data, the electronic device 101 may be required to operate with four layers or more layers to receive the data.

According to various embodiments, the electronic device 101 may lead the communication network to configure two layers so that the electronic device 101 operates in the 2Rx mode using the operation of the communication network. For example, the electronic device 101 may lead the communication network to determine that the channel state for the corresponding antenna is not good by transmitting a fake SRS, not a preset value, for two antennas which are not used as reception antennas or by transmitting no signal in the corresponding slot configured to transmit an SRS. In such a case, the communication network may configure two layers, not four layers, not to use the channel corresponding to the fake SRS but to transmit data through the channel determined to be good. As the communication network configures two layers, the electronic device 101 may switch from the 4Rx mode to 2Rx mode and operate.

According to various embodiments, if the electronic device 101 determines that call quality is not ensured, the electronic device 101 controls to transmit a normal RI or normal SRS, not the above-described fake RI or fake SRS, thereby leading the communication network to normally configure two layers or four layers.

Figure 13:
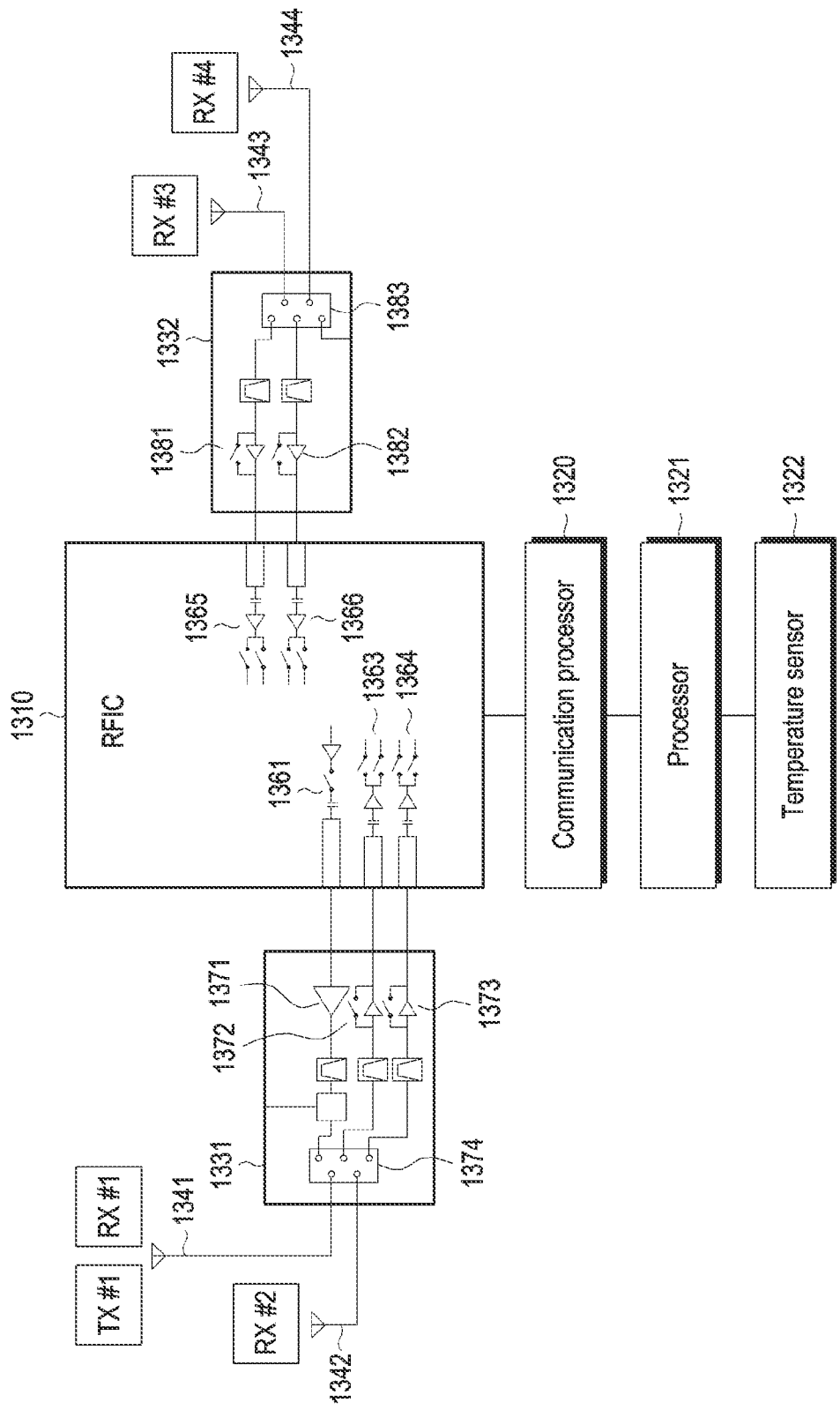
FIG. 13 is a block diagram illustrating an example electronic device according to various embodiments.

FIG. 13 is a block diagram illustrating an example electronic device according to various embodiments. Referring to FIG. 13, according to various embodiments, an electronic device (e.g., the electronic device 101 of FIG. 1) may include a communication processor 1320 (e.g., at least one of the first communication processor 212, the second communication processor 214, or the integrated communication processor 260), a processor 1321 (e.g., the processor 120), a temperature sensor 1322 (e.g., the sensor module 176), an RFIC 1310 (e.g., at least one of the first RFIC 222, the second RFIC 224, the third RFIC 226, or the fourth RFIC 228), a first RFFE 1331, a second RFFE 1332, a first antenna 1341, a second antenna 1342, a third antenna 1343, and a fourth antenna 1344. The communication processor 1320 may control at least some of the RFIC 1310 or RFFEs 1331 and 1332 to adjust the number of antennas for reception.

According to various embodiments, upon transmission, the RFIC 1310 may convert a baseband signal generated by the communication processor 1320 into a radio frequency (RF) signal. For example, the RFIC 1310 may transmit an RF signal to the first antenna 1341 through the first RFFE 1331. Alternatively, upon reception, the RFIC 1310 may convert an RF signal received from an RFFE (e.g., the first RFFE 1331 or the second RFFE 1332) into a baseband signal and provide it to the communication processor 1320. The RFIC 1310 may include a component 1361 for transmission and components 1363, 1364, 1365, and 1366 for reception. The first RFFE 1331 may include a component 1371 for transmission, components 1372 and 1373 for reception, and a switch 1374. The switch 1374 may control the connection between each of the components 1371, 1372, and 1373 and each of the antennas 1341 and 1342. The second RFFE 1332 may include components 1381 and 1382 for reception and a switch 1383. The switch 1383 may control the connection between each of the components 1381 and 1382 and each of the antennas 1343 and 1344. Here, the first antenna 1341 may be used for both transmission and reception, and it may be named a PRX antenna. The second antenna 1342, the third antenna 1343, and the fourth antenna 1344 may be used for reception, and it may be named a DRX antenna. Meanwhile, the electronic device 101 may use a DRX antenna for SRS transmission. Although not shown, the electronic device 101 may further include a switching structure for applying an RF signal for SRS to the DRX antennas 1342, 1343, and 1344. For example, when the UE capability of the electronic device 101 is set to 1t4r, the electronic device 101 may sequentially (e.g., according to the SRS transmission timing) apply an RF signal to each of a first antenna 1341 that is a PRX antenna, and a second antenna 1342, a third antenna 1343, and a fourth antenna 1344 that are DRX antennas. For example, when the UE capability of the electronic device 101 is set to 1t2r, the electronic device 101 may sequentially (e.g., according to the SRS transmission timing) apply an RF signal to the first antenna 1341 that is a PRX antenna and any one of the DRX antennas.

For example, when the number of antennas for reception is set to four (e.g., set to the 4Rx mode), the communication processor 1320 may control at least some of the RFIC 1310 and the RFFEs 1331 and 1332 to allow communication to be performed through all of the first antenna 1341, the second antenna 1342, the third antenna 1343, and the fourth antenna 1344. For example, when it is determined that call quality is ensured in the VoNR call connected state as described above, the communication processor 1320 may perform a first operation for adjusting the number of antennas for reception. For example, the communication processor 1320 may adjust the number of antennas for reception to 2. In this case, the communication processor 1320 may control the RFIC 1310 and the second RFFE 1332 to disable a reception operation through the third antenna 1343 and the fourth antenna 1344. In this case, at least some of the components 1365, 1366, 1381, and 1382 and the switch 1383 may be controlled so that signals are not received from the antennas 1343 and 1344. Or, the communication processor 1320 may adjust the number of antennas for reception to 1. In this case, the communication processor 1320 may control the RFIC 1310 and the RFFEs 1331 and 1332 to disable a reception operation through the second antenna 1342, the third antenna 1343, and the fourth antenna 1344. In this case, at least some of the components 1364, 1365, 1366, 1381, and 1382 and the switches 1374 and 1383 may be controlled so that signals are not received from the antennas 1342, 1343, and 1344. The electronic device 101 may decrease or increase the number of antennas for reception which are currently operating, and the number of antennas reduced or increased is not limited.

Figure 14A:
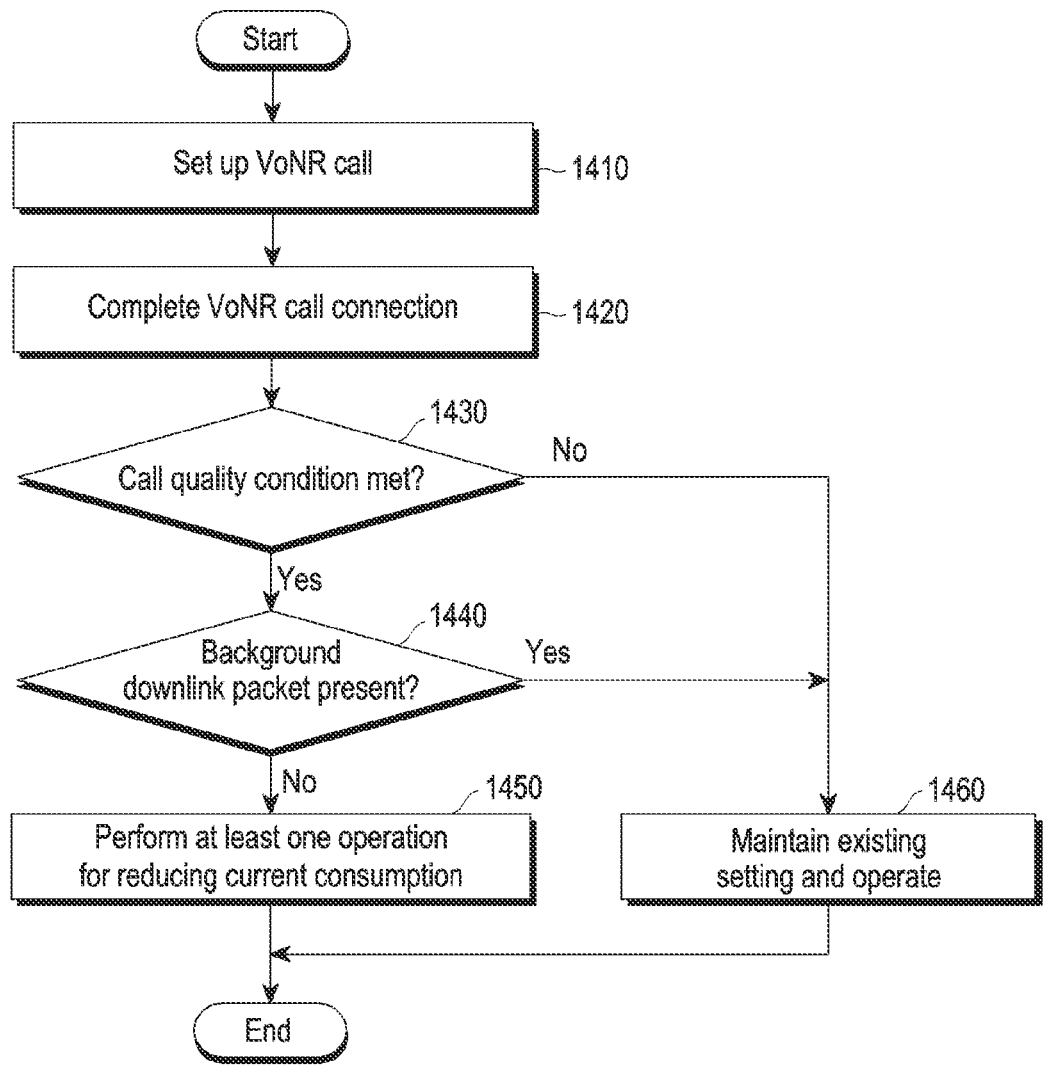
FIG. 14A is a flowchart illustrating example operations of an electronic device according to various embodiments.

FIG. 14A is a flowchart illustrating operations of an example electronic device according to various embodiments. Referring to FIG. 14A, according to various embodiments, the electronic device 101 may make a call to or receive a call from an external electronic device. The electronic device 101 may perform a call setup procedure with the currently connected communication network. For example, the electronic device 101 (e.g., at least one of the processor 120, the first communication processor 212, the second communication processor 214, or the integrated communication processor 260) may set up a VoNR call with an external electronic device through the 5G network 350 in a state connected to the 5G network 350 in operation 1410. According to various embodiments, when both the electronic device 101 and the 5G network support VoNR, the VoNR call may be set up, and if any one does not support VoNR, the call may be connected through VoLTE by the EPS fallback described above in connection with FIGS. 5 and 6. The VoNR call setup procedure of operation 1410 may be performed as illustrated in FIG. 14B.

Figure 14B:
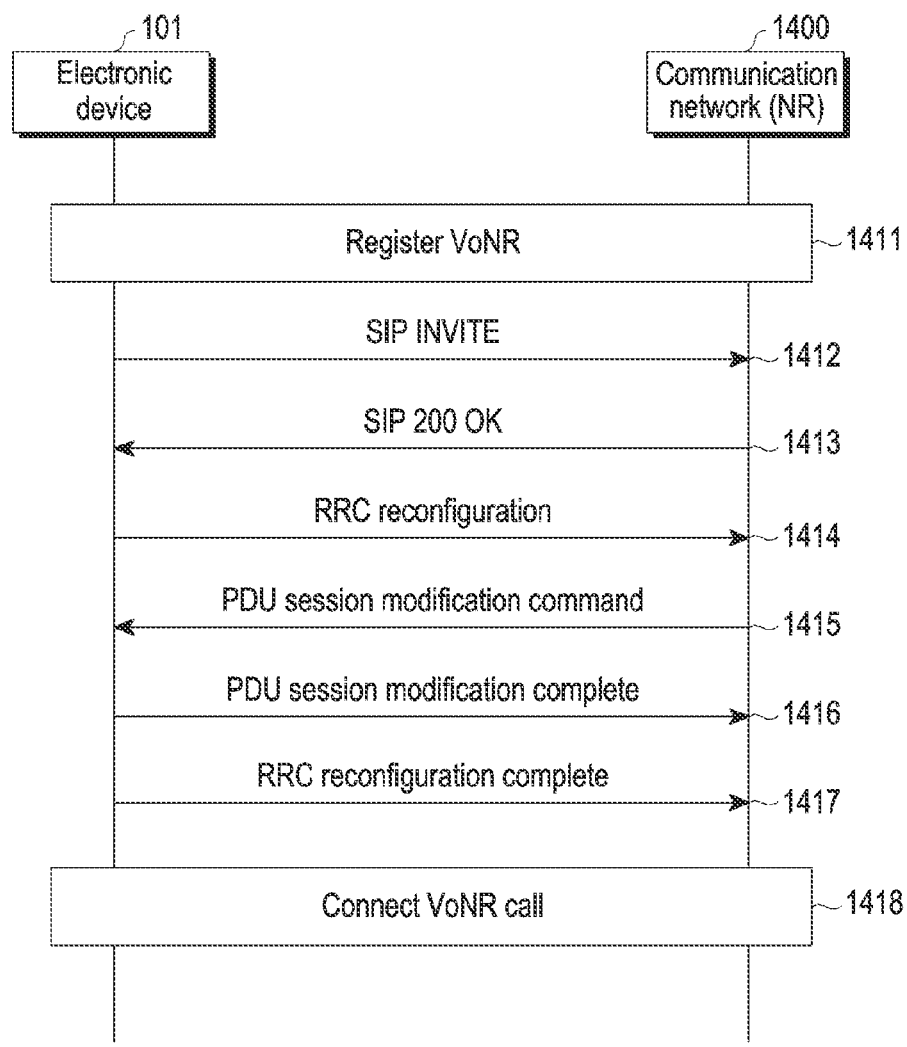
FIG. 14B is a flowchart illustrating example operations of an electronic device according to various embodiments.

FIG. 14B is a flowchart illustrating operations of an example electronic device according to various embodiments. Referring to FIG. 14B, the electronic device 101 may register with the communication network 1400 (e.g., the 5G network 350 or the NR network) and, in operation 1411, may register VoNR with the IMS server. For example, the VoNR registration may be performed through an IMS server. For example, the electronic device 101 may connect to the IMS server through the communication network 1400 to register VoNR for the electronic device 101. For example, the electronic device 101 may transmit a registration request (e.g., a session initiation protocol (SIP) register) to the IMS server using at least one allocated address (e.g., IP address). The IMS server may register the electronic device 101 with the IMS server and provide a VoNR call service in response to the registration request.

According to various embodiments, according to the user's call request, the electronic device 101 (e.g., the transmitting terminal (MO terminal)) and the communication network 1400 may be switched from the RRC idle state to the RRC connected state. According to various embodiments, the electronic device 101 may transmit a SIP INVITE message to the IMS server through the communication network 1400 in operation 1412. Although not shown in FIG. 14B, the communication network 1400 may transmit a paging signal to a receiving electronic device (e.g., an MT terminal). The receiving electronic device may be switched from the idle state to the active state according to the reception of the paging signal and may receive the SIP INVITE message sent from the transmitting electronic device 101. The receiving electronic device may receive the SIP INVITE message and may transmit a SIP 180 RINGING message to the IMS server. As described above in connection with FIG. 5, the IMS server may transmit the SIP 180 RINGING message transmitted from the receiving electronic device to the electronic device 101, which is the transmitting terminal, through the communication network 1400. According to various embodiments, if the receiving electronic device (MT terminal) answers, a SIP 200 OK message may be transmitted to the IMS server. The IMS server 500 may transmit the SIP 200 OK message to the communication network 1400, and the communication network 1400 may transmit the SIP 200 OK message to the electronic device 101 in operation 1413.

According to various embodiments, the electronic device 101 may transmit an RRC reconfiguration message to the communication network 1400 in operation 1414. The communication network 1400 may transmit a PDU session update command (PDU session modification command) to the electronic device 101 in operation 1415. In response to receiving the PDU session update command, the electronic device 101 may transmit a PDU session update complete (PDU session modification complete) in operation 1416. According to the completion of the RRC reconfiguration, the electronic device 101 may transmit an RRC reconfiguration complete message to the communication network 1400 in operation 1417. Through the above procedure, the electronic device 101 may connect a VoNR call with the receiving electronic device through the communication network 1400.

Referring back to FIG. 14A, in operation 1420, the electronic device 101 may complete the VoNR call connection as described above in FIG. 14B.

According to various embodiments, the electronic device 101 may identify whether the call quality condition is met in a VoNR call connected state with the external electronic device in operation 1430. For example, as described above in connection with FIG. 7, the electronic device 101 may identify whether the call quality condition is met by identifying information related to call quality. For example, the information related to the call quality may include at least one of signal to interference and noise ratio (SINR), reference signal received power (RSRP), block error rate (BLER), modulation and coding scheme (MCS), residual error, or real time protocol (RTP) packet non-received information. Embodiments of determining whether the call quality condition is met based on the information related to each call quality have been described in detail with reference to FIG. 7, and thus, a description thereof is not repeated here.

According to various embodiments, if it is determined that the call quality condition is not met based on the information related to the call quality (operation 1430—NO), the electronic device 101 may maintain the existing setting and operate in operation 1460.

According to various embodiments, if the electronic device 101 determines that the call quality condition is met based on the information related to the call quality (operation 1430—YES) (e.g., if it is determined that the call quality is ensured), the electronic device 101 may determine whether a background download packet exists in operation 1440. According to various embodiments, the existence of the background download packet may be determined based on a grant ratio.

Figure 15:
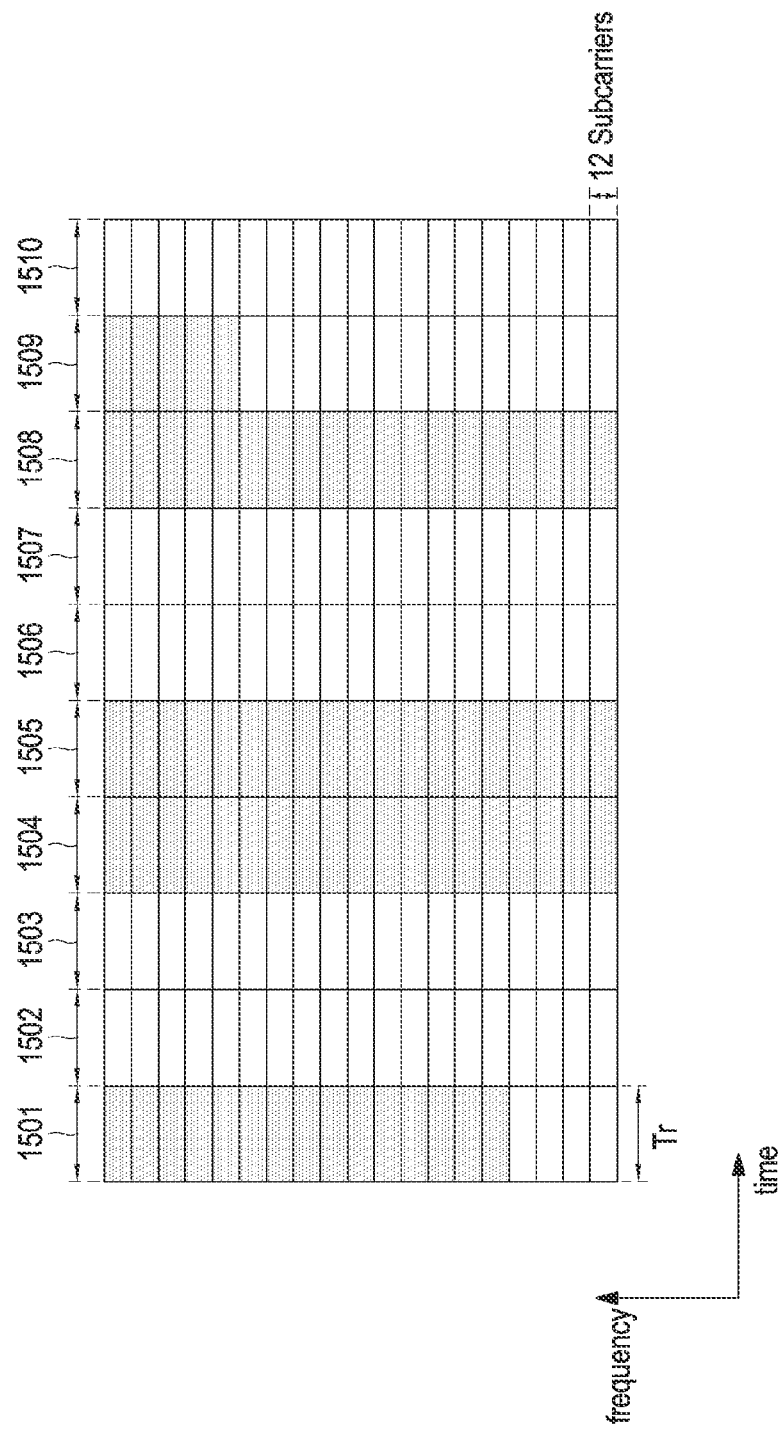
FIG. 15 illustrates a concept of a grant ratio allocated to an example electronic device according to various embodiments.

FIG. 15 illustrates a concept of a grant ratio allocated to an example electronic device according to various embodiments. According to various embodiments, the grant ratio may be determined as shown in FIG. 15. Referring to FIG. 15, the grant ratio may indicate a ratio at which resource blocks are allocated on the time axis. In FIG. 15, the horizontal axis may denote the time axis, and the vertical axis may denote the frequency axis. In FIG. 15, one cell may represent one resource block (RB), but the disclosure is not limited in this respect. For example, one column along the horizontal axis in FIG. 15 may represent one OFDM symbol, two or more OFDM symbols, or one slot including a plurality of OFDM symbols, but the disclosure is not limited in this respect. In the following description, for convenience of description, it may be assumed that one cell along the horizontal axis in FIG. 15 is one slot including 14 OFDM symbols, and one cell along the vertical axis contains 12 subcarriers. For example, in the first slot 1501 of FIG. 15, 15 RBs out of a total of 19 RBs may be allocated for data transmission in the electronic device 101. No single RB may be allocated to the second slot 1502, the third slot 1503, the sixth slot 1506, the seventh slot 1507, and the tenth slot 1510. All of the 19 RBs may be allocated to the fourth slot 1504, the fifth slot 1505, and the eighth slot 1508. Five RBs may be allocated to the ninth slot 1509. Referring to FIG. 15, since at least one RB is allocated to 5 slots out of a total of 10 slots, the grant ratio may be calculated as 50% (5/10).

According to various embodiments, when the electronic device 101 is in the VoNR call connected state, downlink packets having a relatively small size are generated, but when data packets are downloaded in the background, the grant ratio may increase. For example, when the grant ratio is equal to or larger than a setting value (e.g., 20%), the electronic device 101 may determine that a background download packet exists.

According to various embodiments, when the electronic device 101 determines that the background download packet exists in operation 1440 (operation 1440—YES), the electronic device 101 may maintain the existing setting and operate in operation 1460.

According to various embodiments, when the electronic device 101 determines that no background download packet exists in operation 1440 (operation 1440—NO), the electronic device 101 may perform at least one operation for reducing current consumption in operation 1450. For example, the electronic device 101 may reduce current consumption by performing the operation of reducing the number of antennas for reception among the plurality of antennas (e.g., from 4Rx to 2Rx) based on identifying that the call quality-related information meets the designated condition in operation 1430 and identifying that no downlink packet exists in operation 1440. According to various embodiments, the operation of reducing current consumption may be implemented in various manners other than reducing the number of antennas. For example, the electronic device 101 may reduce current consumption by limiting the overall bandwidth of the serving cell and reduce current consumption by reducing the number of CAs.

According to various embodiments, the electronic device 101 continues to meet the call quality condition in the VoNR call connected state, but when the grant ratio increases and exceeds a setting value (e.g., 20%), the electronic device 101 may determine that a background download packet exists and maintain the existing setting and operate in operation 1460. For example, the number of antennas for reception may be maintained or increased again according to the existing setting. For example, as described above, the electronic device 101 may lead the communication network to configure four layers by transmitting a normal RI or normal SRS, rather than transmitting a fake RI or fake SRS to reduce the number of antennas for reception. As the communication network configures four layers, the electronic device 101 may switch from the 2Rx mode to 4Rx mode and operate.

Figure 16:
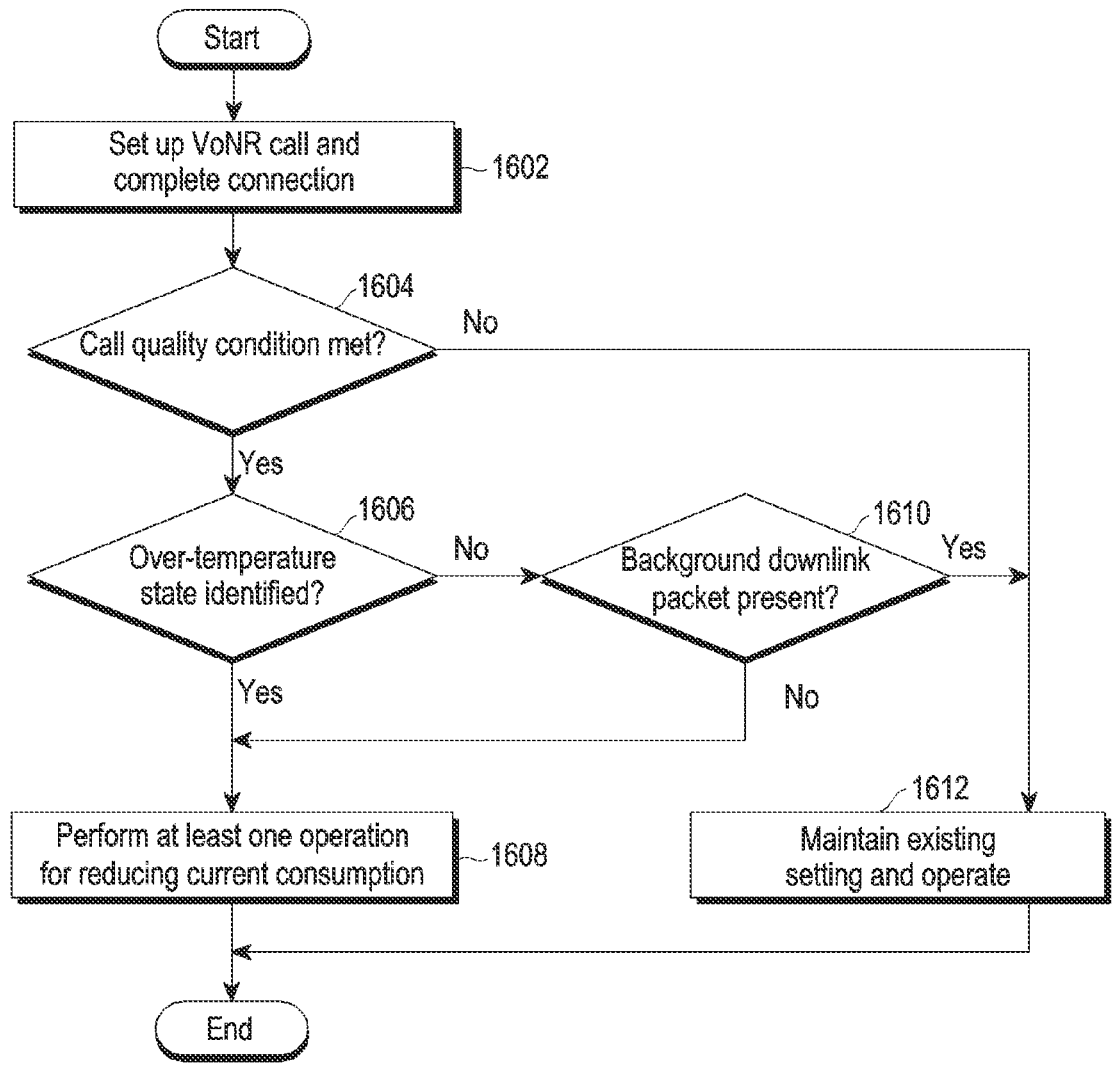
FIG. 16 is a flowchart illustrating operations of an example electronic device according to various embodiments.

FIG. 16 is a flowchart illustrating operations of an example electronic device according to various embodiments. Referring to FIG. 16, according to various embodiments, the electronic device 101 may make a call to or receive a call from an external electronic device. The electronic device 101 may perform a call setup procedure with the currently connected communication network. For example, the electronic device 101 (e.g., at least one of the processor 120, the first communication processor 212, the second communication processor 214, or the integrated communication processor 260) may set up a VoNR call with an external electronic device through the 5G network 350 in a state connected to the 5G network 350 and complete the call setup in operation 1602. The VoNR call setup procedure may be performed as described above in connection with FIGS. 14A and 14B.

According to various embodiments, the electronic device 101 may identify whether the call quality condition is met in a VoNR call connected state with the external electronic device in operation 1604. For example, as described above in connection with FIG. 7, the electronic device 101 may identify whether the call quality condition is met by identifying information related to call quality. For example, the information related to the call quality may include at least one of signal to interference and noise ratio (SINR), reference signal received power (RSRP), block error rate (BLER), modulation and coding scheme (MCS), residual error, or real time protocol (RTP) packet non-received information. Embodiments of determining whether the call quality condition is met based on the information related to each call quality have been described in detail with reference to FIG. 7, and thus, a description thereof is not repeated here.

According to various embodiments, if it is determined that the call quality condition is not met based on the information related to the call quality (operation 1604—NO), the electronic device 101 may maintain the existing setting and operate in operation 1612.

According to various embodiments, if the electronic device 101 determines that the call quality condition is met based on the information related to the call quality (operation 1604—YES) (e.g., if it is determined that the call quality is ensured), the electronic device 101 may determine whether it is in an overheat (over-temperature) state in operation 1606. For example, the electronic device 101 may include a temperature sensor (e.g., the sensor module 176 of FIG. 1 or the temperature sensor 1322 of FIG. 13) for measuring the temperature inside (or on the surface) the electronic device 101. The electronic device 101 may identify an indication indicating, as an over-temperature state, an over-temperature indicating that the measured temperature is equal to or larger than a threshold temperature. The temperature measured to identify the over-temperature state may include, for example, the temperature measured at at least one of the processor 120, the first communication processor 212, the second communication processor 214, the integrated communication processor 260, the first RFIC 222, the second RFIC 224, the third RFIC 226, the fourth RFIC 228, the first RFFE 232, the second RFFE 234, or the third RFFE 236.

According to various embodiments, the electronic device 101 (e.g., at least one of the processor 120, the first communication processor 212, the second communication processor 214, or the integrated communication processor 260) may identify the indication indicating the over-temperature and identify whether it is in the over-temperature state. For example, the processor 120 may obtain temperature information from the sensor module 176. For example, the processor 120 may determine whether the obtained temperature information is equal to or larger than a designated threshold temperature (e.g., 43° C.). When the obtained temperature information is the designated threshold temperature or more, the processor 120 may provide the indication indicating the over-temperature to the communication processor (e.g., at least one of the first communication processor 212, the second communication processor 214, or the integrated communication processor 260). In an embodiment, the communication processor (e.g., at least one of the first communication processor 212, the second communication processor 214, or the integrated communication processor 260) may directly obtain the temperature information from the temperature sensor (e.g., the sensor module 176 of FIG. 1 or the temperature sensor 1322 of FIG. 13). In this case, it may be identified whether it is in the over-temperature state by determining whether the temperature information obtained by the communication processor (e.g., at least one of the first communication processor 212, the second communication processor 214, or the integrated communication processor 260) is the designated threshold temperature or more.

According to various embodiments, if the electronic device 101 identifies that it is not in the over-temperature state in operation 1606 (e.g., when the indicator indicating the over-temperature is not received or when the obtained temperature information is less than the designated threshold temperature), the electronic device 101 may determine whether a background downlink packet exists in operation 1610. According to various embodiments, the existence of the background download packet may be determined based on a grant ratio as described above.

According to various embodiments, when the electronic device 101 is in the VoNR call connected state, downlink packets having a relatively small size are generated, but when data packets are downloaded in the background, the grant ratio may increase. For example, when the grant ratio is equal to or larger than a setting value (e.g., 20%), the electronic device 101 may determine that a background download packet exists.

According to various embodiments, when the electronic device 101 determines that the background download packet exists in operation 1610 (operation 1610—YES), the electronic device 101 may maintain the existing setting and operate in operation 1612.

According to various embodiments, when the electronic device 101 determines that no background download packet exists in operation 1610 (operation 1610—NO), the electronic device 101 may perform at least one operation for reducing current consumption in operation 1608. For example, the electronic device 101 may reduce current consumption by performing the operation of reducing the number of antennas for reception among the plurality of antennas (e.g., from 4Rx to 2Rx) based on identifying that the call quality-related information meets the designated condition in operation 1604, identifying that it is not in the over-temperature state in operation 1606, and identifying that no downlink packet exists in operation 1610. According to various embodiments, the operation of reducing current consumption may be implemented in various manners other than reducing the number of antennas. For example, the electronic device 101 may reduce current consumption by limiting the overall bandwidth of the serving cell and reduce current consumption by reducing the number of CAs.

According to various embodiments, when the electronic device 101 identifies that it is in the over-temperature state in the operation 1606 (e.g., when an indicator indicating the over-temperature is received or when the obtained temperature information is equal to or larger than the designated threshold temperature) (operation 1606—YES), the electronic device 101 may perform at least one operation for reducing current consumption in operation 1608 irrespective of the existence of the background download packet.

Figure 17:
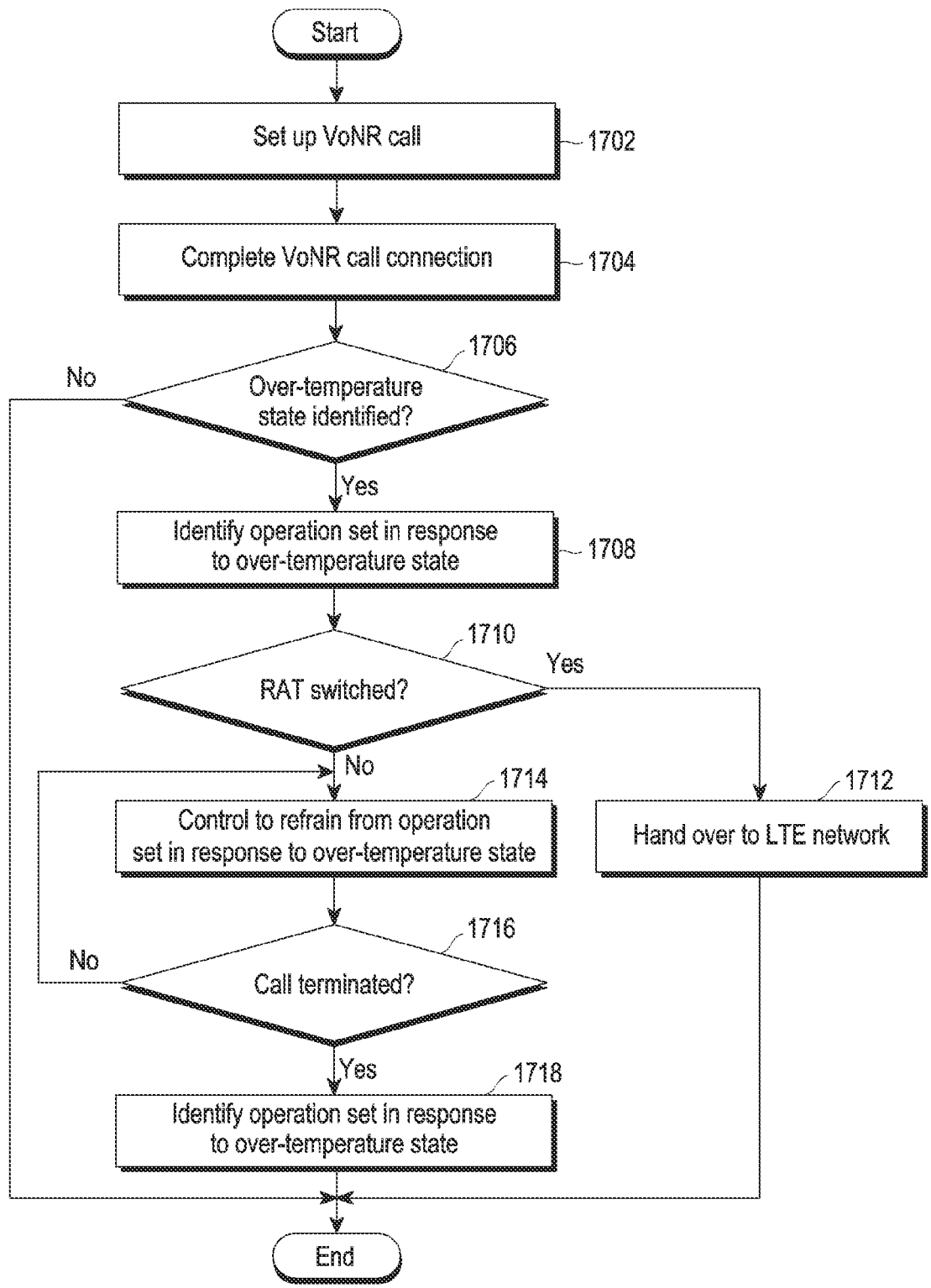
FIG. 17 is a flowchart illustrating operations of an example electronic device according to various embodiments.

FIG. 17 is a flowchart illustrating operations of an example electronic device according to various embodiments. Referring to FIG. 17, according to various embodiments, the electronic device 101 may make a call to or receive a call from an external electronic device. The electronic device 101 may perform a call setup procedure with the currently connected communication network. For example, the electronic device 101 (e.g., at least one of the processor 120, the first communication processor 212, the second communication processor 214, or the integrated communication processor 260) may set up a VoNR call with an external electronic device through the 5G network 350 in a state connected to the 5G network 350 in operation 1702. According to various embodiments, when both the electronic device 101 and the 5G network support VoNR, the VoNR call may be set up, and if any one does not support VoNR, the call may be connected through VoLTE by the EPS fallback described above in connection with FIGS. 5 and 6.

According to various embodiments, in operation 1704, the electronic device 101 may complete the VoNR call connection as described above in FIG. 14B.

According to various embodiments, the electronic device 101 may determine whether it is in the over-temperature state in operation 1706. For example, the processor 120 may obtain temperature information from the sensor module 176. The processor 120 may determine whether the obtained temperature information is equal to or larger than a designated threshold temperature (e.g., 43° C.). When the obtained temperature information is the designated threshold temperature or more, the processor 120 may provide the indication indicating the over-temperature to the communication processor (e.g., at least one of the first communication processor 212, the second communication processor 214, or the integrated communication processor 260). The communication processor may identify being in the over-temperature state based on receiving the indication indicating the over-temperature.

According to various embodiments, if the electronic device 101 identifies that it is not in the over-temperature state in operation 1706 (e.g., when the indicator indicating the over-temperature is not received or when the obtained temperature information is less than the designated threshold temperature) (operation 1706—NO), the electronic device 101 may perform a VoNR call according to the existing setting.

According to various embodiments, when the electronic device 101 identifies that it is in the over-temperature state in the operation 1706 (e.g., when an indicator indicating the over-temperature is received or when the obtained temperature information is equal to or larger than the designated threshold temperature) (operation 1706—YES), the electronic device 101 may identify the operation set in response to the over-temperature state in operation 1708. For example, the operation set in response to the over-temperature state may include at least one of updating UE capability, reducing the number of reception antennas, limiting the maximum transmission power, or switching RATs, but the various embodiments are not limited in this respect.

According to various embodiments, upon identifying that the operation set in response to the over-temperature state is RAT switching in operation 1710 (operation 1710—YES), the electronic device 101 may perform RAT switching by handing over to the LTE network in operation 1712. For example, the handover to the LTE network may be performed as the electronic device 101 transmits a fake measurement report (MR) to the communication network. For example, inter-RAT handover may require that the signal strength of the serving RAT be less than or equal to a first threshold (threshold1) and the signal strength of the target RAT be larger than or equal to a second threshold (threshold2). To induce handover to the LTE network (e.g., N2L handover), the electronic device 101 may transmit a fake MR indicating that the signal strength of the serving RAT is equal to or smaller than the first threshold, thus allowing the communication network to lead the electronic device 101 to hand over to the LTE network.

According to various embodiments, upon identifying that the operation set in response to the over-temperature state is not RAT switching in operation 1710 (operation 1710—NO)

(e.g., upon identifying at least one of updating UE capability, reducing the number of reception antennas, or limiting the maximum transmission power), the electronic device 101 may control to refrain from the operation set in response to the over-temperature state in operation 1714. For example, in a case in which the operation set in response to the over-temperature state is updating the UE capability, even when the over-temperature state is identified, the electronic device 101 may control to refrain from the operation of updating the UE capability in the VoNR call connected state. In a case in which the operation set in response to the over-temperature state is reducing the number of reception antennas, even when the over-temperature state is identified, the electronic device 101 may control to refrain from the operation for reducing the number of reception antenna in the VoNR call connected state. In a case in which the operation set in response to the over-temperature state is limiting the maximum transmission power, even when the over-temperature state is identified, the electronic device 101 may control to refrain from the operation for limiting the maximum transmission power in the VoNR call connected state. According to various embodiments, the electronic device 101 may control to refrain from only the operation for reducing the number of reception antennas among the operations set in response to the over-temperature state but to perform other operations (e.g., updating the UE capability or limiting the maximum transmission power).

According to various embodiments, when the VoNR call is not terminated in operation 1716 (operation 1716—NO), the electronic device 101 may continue to perform the control of operation 1714. When the VoNR call is terminated in operation 1716 (operation 1716—YES), the electronic device 101 may control to perform the operation set in response to the over-temperature state (e.g., when it is identified as at least one of updating the UE capability, reducing the number of reception antennas, or limiting the maximum transmission power) in operation 1718.

Figure 18:
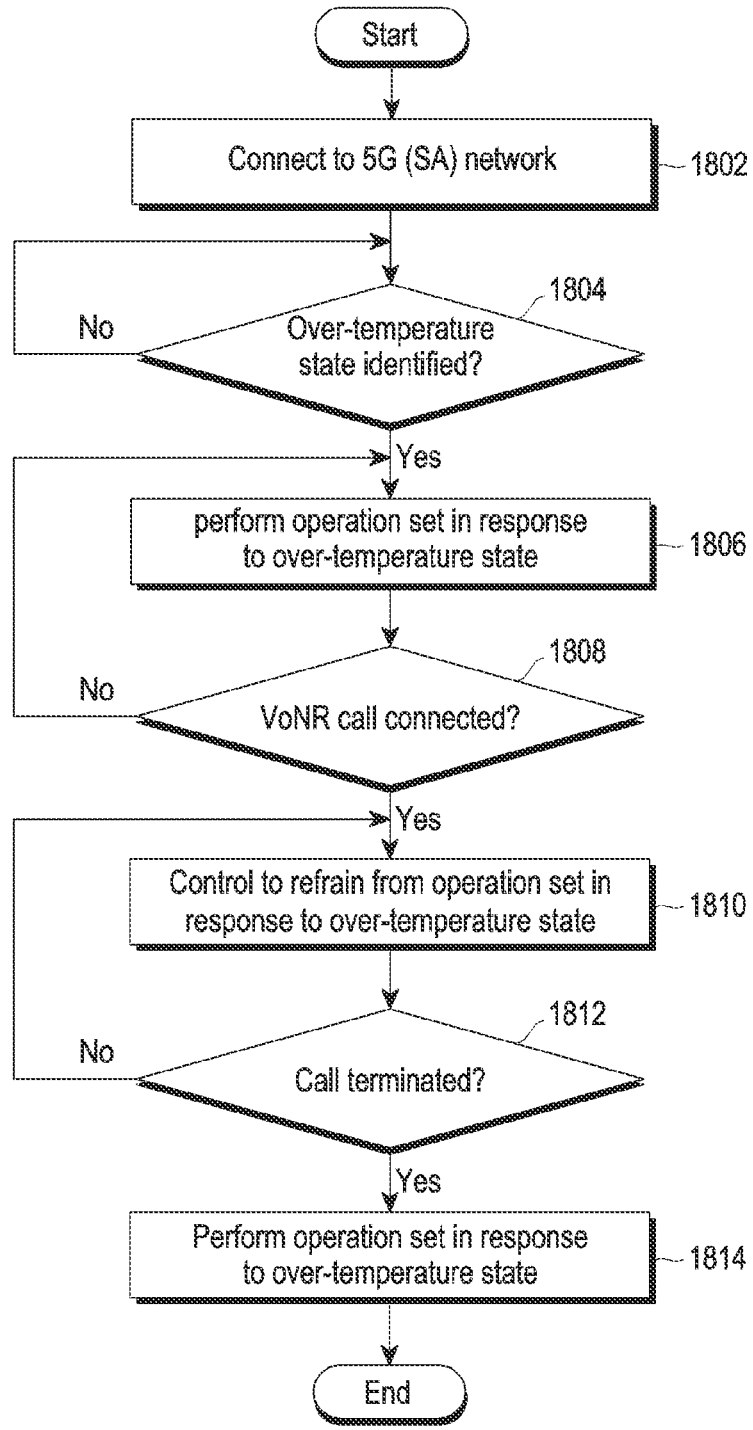
FIG. 18 is a flowchart illustrating operations of an example electronic device according to various embodiments.

FIG. 18 is a flowchart illustrating operations of an example electronic device according to various embodiments. Referring to FIG. 18, according to various embodiments, the electronic device 101 (e.g., at least one of the processor 120, the first communication processor 212, the second communication processor 214, or the integrated communication processor 260) may connect with the 5G network via SA in operation 1802.

According to various embodiments, the electronic device 101 may identify whether it is in the over-temperature state in operation 1804. For example, the processor 120 may obtain temperature information from the sensor module 176. The processor 120 may determine whether the obtained temperature information is equal to or larger than a designated threshold temperature (e.g., 43° C.). When the obtained temperature information is the designated threshold temperature or more, the processor 120 may provide the indication indicating the over-temperature to the communication processor (e.g., at least one of the first communication processor 212, the second communication processor 214, or the integrated communication processor 260). The communication processor may identify being in the over-temperature state based on receiving the indication indicating the over-temperature.

According to various embodiments, if the electronic device 101 identifies that it is not in the over-temperature state in operation 1804 (e.g., when the indicator indicating the over-temperature is not received or when the obtained temperature information is less than the designated threshold temperature) (operation 1804—NO), the electronic device 101 may maintain the connection with the 5G network according to the existing setting.

According to various embodiments, when the electronic device 101 identifies that it is in the over-temperature state in the operation 1804 (e.g., when an indicator indicating the over-temperature is received or when the obtained temperature information is equal to or larger than the designated threshold temperature) (operation 1804—YES), the electronic device 101 may control to perform the operation set in response to the over-temperature state (e.g., when it is identified as at least one of updating the UE capability, reducing the number of reception antennas, or limiting the maximum transmission power) in operation 1806.

According to various embodiments, upon identifying that the VoNR call is not connected in operation 1808 (operation 1808—NO), the electronic device 101 may control to continue to perform the operation set in response to the over-temperature state of operation 1806 until the over-temperature state is released. According to various embodiments, upon identifying that the VoNR call is connected in operation 1808 (operation 1808—YES), the electronic device 101 may control to refrain from the operation set in response to the over-temperature state in operation 1810. For example, in a case in which the operation set in response to the over-temperature state is updating the UE capability, even when the over-temperature state is identified, the electronic device 101 may control to refrain from the operation of updating the UE capability in the VoNR call connected state. In a case in which the operation set in response to the over-temperature state is reducing the number of reception antennas, even when the over-temperature state is identified, the electronic device 101 may control to refrain from the operation for reducing the number of reception antenna in the VoNR call connected state. In a case in which the operation set in response to the over-temperature state is limiting the maximum transmission power, even when the over-temperature state is identified, the electronic device 101 may control to refrain from the operation for limiting the maximum transmission power in the VoNR call connected state. According to various embodiments, the electronic device 101 may control to refrain from only the operation for reducing the number of reception antennas among the operations set in response to the over-temperature state but to perform other operations (e.g., updating the UE capability or limiting the maximum transmission power).

According to various embodiments, when the VoNR call is not terminated in operation 1812 (operation 1812—NO), the electronic device 101 may continue to perform the control of operation 1810. When the VoNR call is terminated in operation 1812 (operation 1812—YES), the electronic device 101 may control to perform the operation set in response to the over-temperature state (e.g., when it is identified as at least one of updating the UE capability, reducing the number of reception antennas, or limiting the maximum transmission power) in operation 1814.

Figure 19:
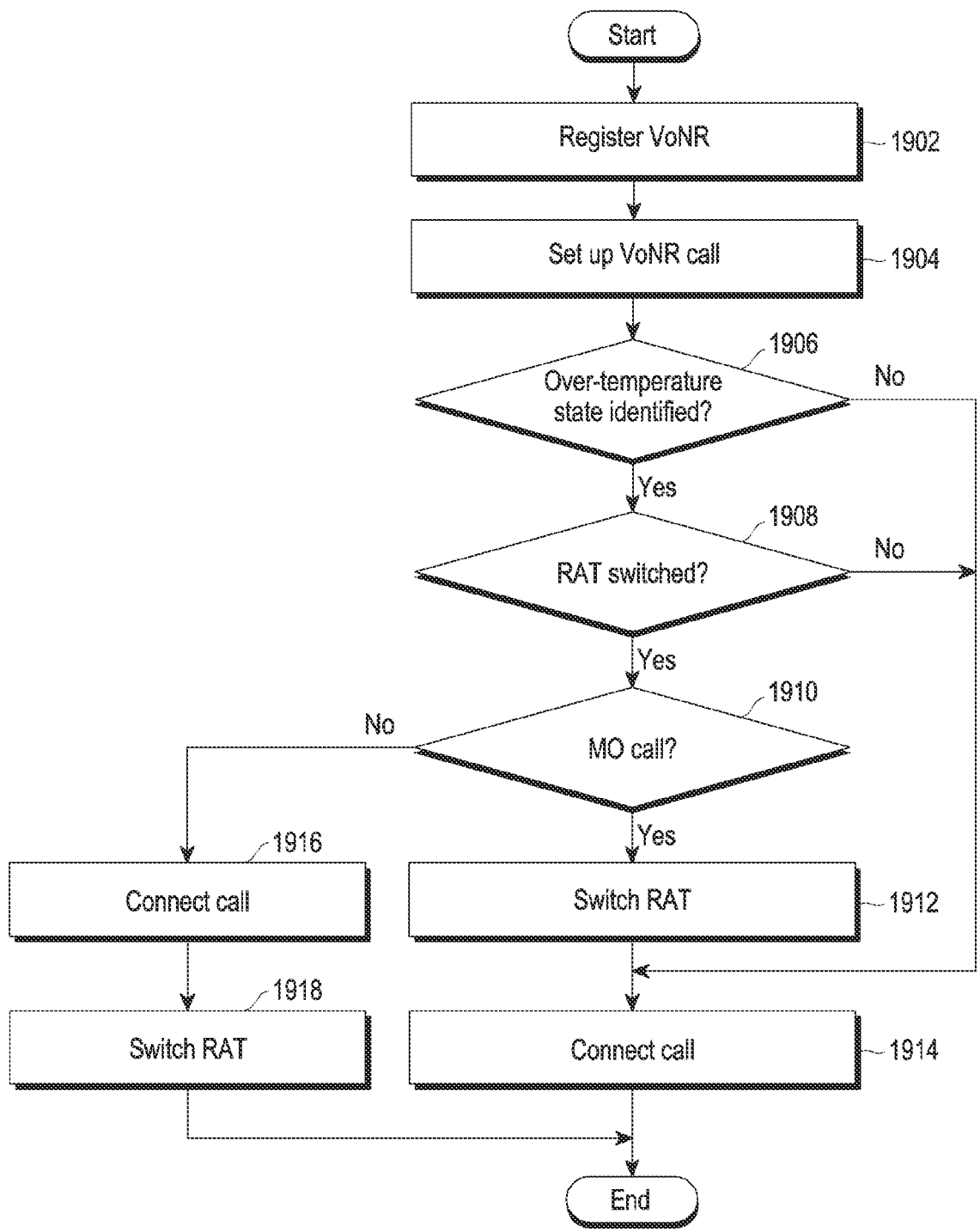
FIG. 19 is a flowchart illustrating operations of an example electronic device according to various embodiments.

FIG. 19 is a flowchart illustrating operations of an example electronic device according to various embodiments. Referring to FIG. 19, according to various embodiments, the electronic device 101 (e.g., at least one of the processor 120, the first communication processor 212, the second communication processor 214, or the integrated communication processor 260) may register with the communication network 1400 (e.g., the 5G network 350 or NR network) and, in operation 1902, register VoNR with the IMS server. The VoNR registration procedure may be performed as described above in connection with 1411 of FIG. 14B.

According to various embodiments, the electronic device 101 may make a call to or receive a call from an external electronic device. The electronic device 101 may perform a call setup procedure with the currently connected communication network. For example, the electronic device 101 (e.g., at least one of the processor 120, the first communication processor 212, the second communication processor 214, or the integrated communication processor 260) may set up a VoNR call with an external electronic device through the 5G network 350 in a state connected to the 5G network 350 in operation 1904. According to various embodiments, when both the electronic device 101 and the 5G network support VoNR, the VoNR call may be set up, and if any one does not support VoNR, the call may be connected through VoLTE by the EPS fallback described above in connection with FIGS. 5 and 6.

According to various embodiments, the electronic device 101 may identify whether it is in the over-temperature state in operation 1906. For example, the processor 120 may obtain temperature information from the sensor module 176. The processor 120 may determine whether the obtained temperature information is equal to or larger than a designated threshold temperature (e.g., 43° C.). When the obtained temperature information is the designated threshold temperature or more, the processor 120 may provide the indication indicating the over-temperature to the communication processor (e.g., at least one of the first communication processor 212, the second communication processor 214, or the integrated communication processor 260). The communication processor may identify being in the over-temperature state based on receiving the indication indicating the over-temperature.

According to various embodiments, if the electronic device 101 identifies that it is not in the over-temperature state in operation 1906 (e.g., when the indicator indicating the over-temperature is not received or when the obtained temperature information is less than the designated threshold temperature) (operation 1906—NO), the electronic device 101 may continuously perform the VoNR call connection according to the existing setting in operation 1914.

According to various embodiments, when the electronic device 101 identifies that it is in the over-temperature state in the operation 1906 (e.g., when an indicator indicating the over-temperature is received or when the obtained temperature information is equal to or larger than the designated threshold temperature) (operation 1906—YES), the electronic device 101 may identify whether RATs are switched (e.g., handover to the LTE network) in operation 1908.

According to various embodiments, if it is determined that the RAT switching is not performed in operation 1908 (operation 1908—NO), the electronic device 101 may continue to perform the VoNR call connection according to the existing setting in operation 1914. According to various embodiments, if the electronic device 101 determines that RAT switching is performed in operation 1908 (operation 1908—YES), the electronic device 101 may identify whether the VoNR call to be currently connected is a transmission call (e.g., mobile oriented (MO) call) or a reception call (e.g., mobile terminated (MT) call) in operation 1910.

According to various embodiments, when the VoNR call is the MT call, not the MO call (operation 1910—NO), the electronic device 101 may perform VoNR call connection in operation 1916 and then, in operation 1918, perform RAT switching to the LTE network. According to various embodiments, if the VoNR call is the MO call, not the MT call (operation 1910—YES), the electronic device 101 may perform RAT switching to the LTE network in operation 1912 and then, in operation 1914, perform VoNR call connection. A VoNR call connection procedure on the above-described MO call and MT call is described below with reference to FIGS. 20 and 21.

Figure 20:
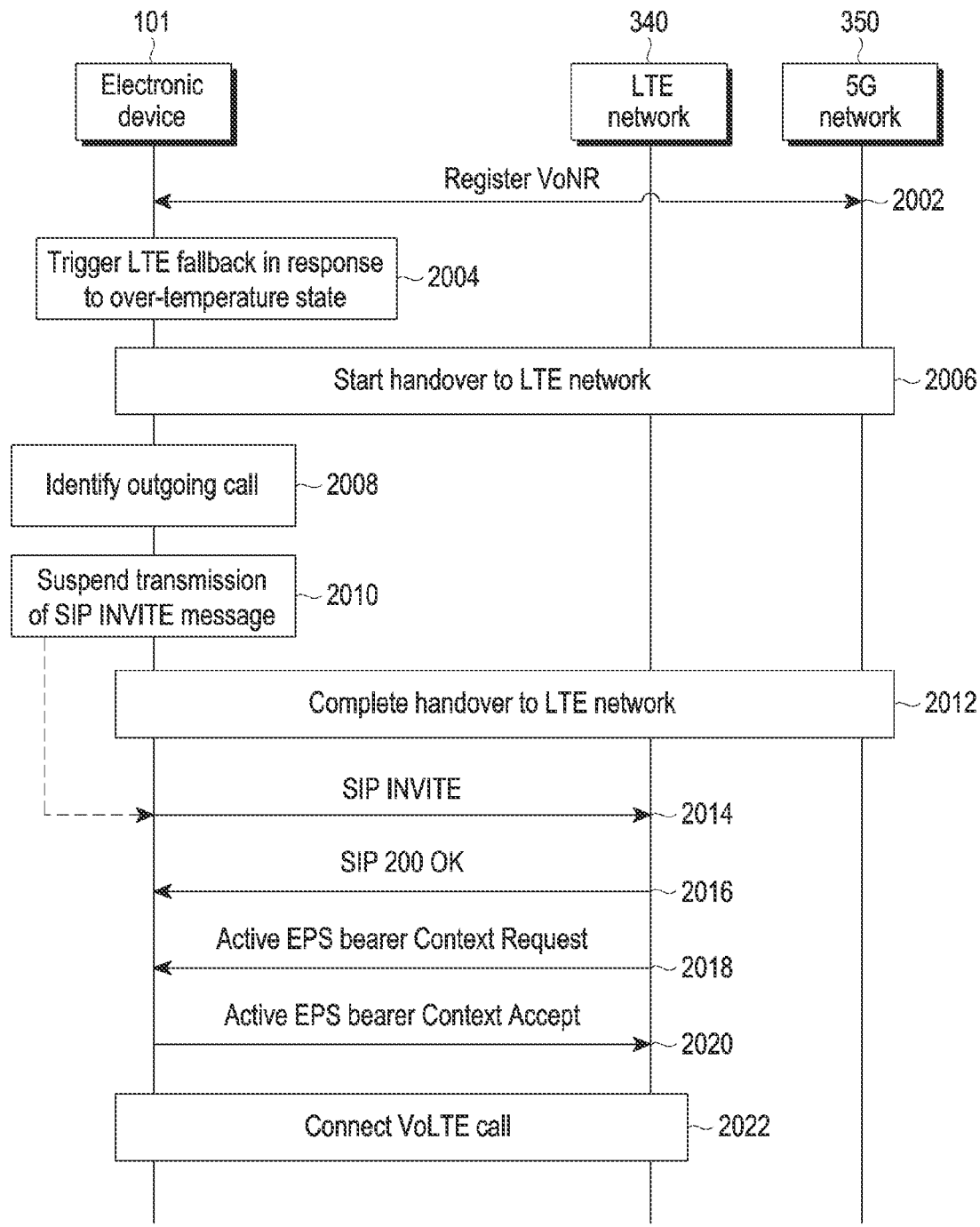
FIG. 20 is a flowchart illustrating operations of an example electronic device according to various embodiments.

FIG. 20 is a flowchart illustrating operations of an example electronic device according to various embodiments. Referring to FIG. 20, according to various embodiments, the electronic device 101 (e.g., at least one of the processor 120, the first communication processor 212, the second communication processor 214, or the integrated communication processor 260) may register with the 5G network 350 and register VoNR with the IMS server through the 5G network 350 in operation 2002. The VoNR registration procedure may be performed as described above in connection with 1411 of FIG. 14B.

According to various embodiments, the electronic device 101 may identify that it is in an over-temperature state and may trigger LTE fallback in response to an over-temperature state in operation 2004. A description of identifying whether it is in the over-temperature state has been described above in connection with FIGS. 17 and 18, and the description is not repeated here. According to the triggering of the LTE fallback, the electronic device 101 may start a handover procedure from the 5G network 350 to the LTE network 340 in operation 2006.

According to various embodiments, when starting the handover procedure, the electronic device 101 may identify an outgoing call for making a call to the external electronic device in operation 2008. Although the electronic device 101 should transmit the SIP INVITE message in response to the outgoing call, according to various embodiments, in operation 2010, the electronic device 101 may control to refrain from or suspend the transmission of the SIP INVITE message.

According to various embodiments, the electronic device 101 may complete the handover procedure from the 5G network 350 to the LTE network 340 in operation 2012. As the handover procedure is completed, the electronic device 101 may perform the suspended SIP INVITE message transmission in operation 2014. The receiving electronic device may receive the SIP INVITE message transmitted from the electronic device 101 and may transmit a SIP 180 RINGING message. According to various embodiments, if the receiving electronic device answers, a SIP 200 OK message may be transmitted to the IMS server. The IMS server may transmit the SIP 200 OK message to the electronic device 101 through the LTE network 340 in operation 2016.

According to various embodiments, the LTE network 340 may transmit an active EPS bearer context request message to the electronic device 101 in operation 2018. In response to receiving the active EPS bearer context request message, the electronic device 101 may transmit an active EPS bearer context accept message to the LTE network 340 in operation 2020. According to the above procedure, in operation 2022, the electronic device 101 may complete the VoLTE call connection through the LTE network 340.

Figure 21:
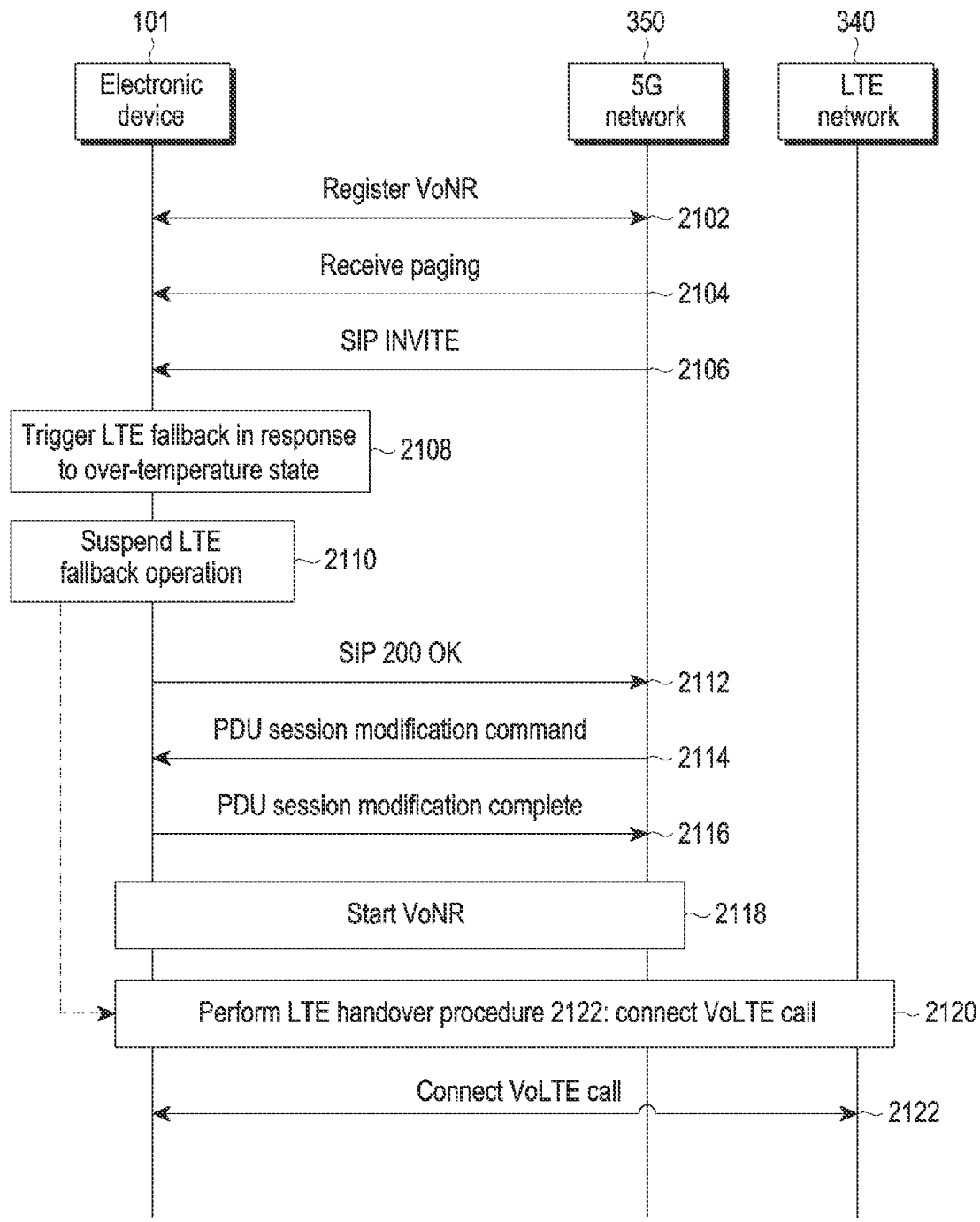
FIG. 21 is a flowchart illustrating operations of an example electronic device according to various embodiments.

FIG. 21 is a flowchart illustrating operations of an example electronic device according to various embodiments. Referring to FIG. 21, according to various embodiments, the electronic device 101 (e.g., at least one of the processor 120, the first communication processor 212, the second communication processor 214, or the integrated communication processor 260) may register with the 5G network 350 and register VoNR with the IMS server through the 5G network 350 in operation 2102. The VoNR registration procedure may be performed as described above in connection with 1411 of FIG. 14B.

According to various embodiments, the electronic device 101 may receive a paging in operation 2104 and may receive the SIP INVITE message transmitted from the counterpart electronic device in operation 2106.

According to various embodiments, when receiving the SIP INVITE message and before transmitting a SIP 200 OK message, the electronic device 101 may identify that it is in an over-temperature state and may trigger LTE fallback in response to an over-temperature state in operation 2108. A description of identifying whether it is in the over-temperature state has been described above in connection with FIGS. 17 and 18, and the description is not repeated here. Despite the triggering of the LTE fallback, the electronic device 101 may control to refrain from or suspend the LTE fallback operation.

According to various embodiments, after suspending the LTE fallback operation, the electronic device 101 may transmit a SIP 200 OK message to the receiving electronic device through the 5G network 350 in operation 2112. The 5G network 350 may transmit a PDU session update command (PDU session modification command) to the electronic device 101 in operation 2114. In response to receiving the PDU session update command, the electronic device 101 may transmit a PDU session update complete to the 5G network 350 in operation 2116. According to the above procedure, in operation 2118, the electronic device 101 may start VoNR through the 5G network 350.

According to various embodiments, after the VoNR call is started, the electronic device 101 may resume the suspended LTE handover procedure in operation 2120. According to the above procedure, in operation 2122, the electronic device 101 may complete the VoLTE call connection through the LTE network 340.

Figure 22:
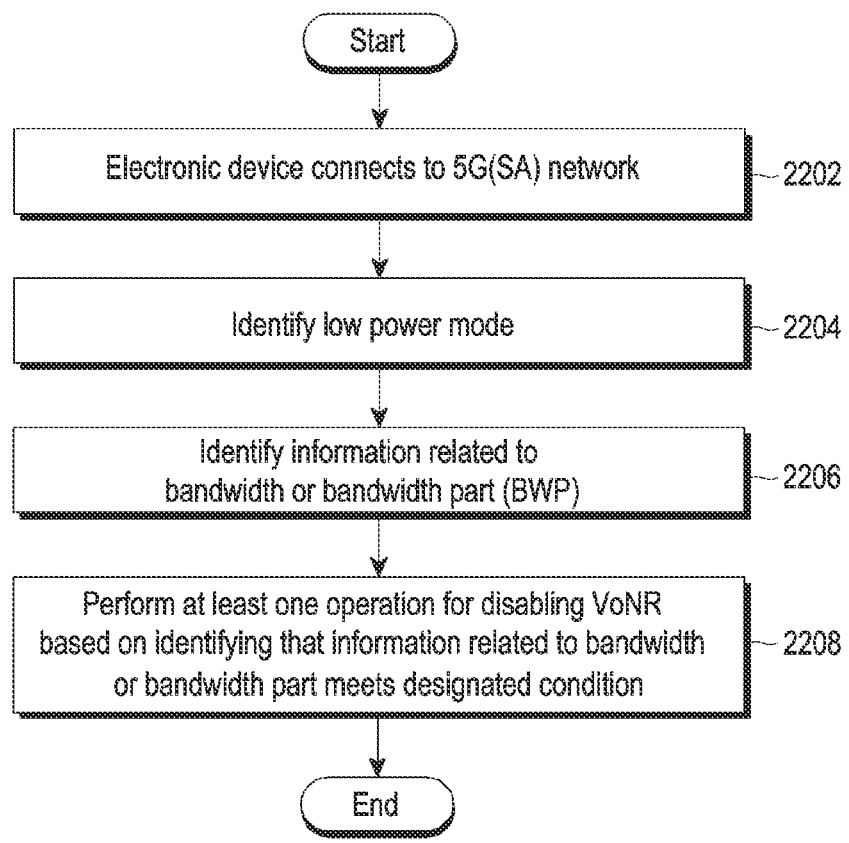
FIG. 22 is a flowchart illustrating operations of an example electronic device according to various embodiments.

FIG. 22 is a flowchart illustrating operations of an example electronic device according to various embodiments. Referring to FIG. 22, according to various embodiments, the electronic device 101 (e.g., at least one of the processor 120, the first communication processor 212, the second communication processor 214, or the integrated communication processor 260) may connect with the 5G network via SA in operation 2202.

According to various embodiments, the electronic device 101 may determine whether a low power mode (LPM) is met in operation 2204. For example, the low power mode refers, for example, to a context in which power consumption of the electronic device 101 is to be reduced and may include, but is not limited to, is at least one of a heat generation context (e.g., over-temperature state), a context in which the display is turned off, or a context in which the battery level is a set value or less. For example, the over-temperature state may be identified based on receiving an indication indicating over-temperature by the communication processor when the temperature information obtained by the processor 120 is the designated threshold temperature (e.g., 43° C.) or more.

According to various embodiments, the electronic device 101 may identify information related to the bandwidth (BW) or partial bandwidth (BWP) in operation 2206. For example, the bandwidth-related information may be identified through SIB 1 of Table 7 below.

TABLE 7 systemInformationBlockType1
  servingCellConfigCommon
    downlinkConfigCommon
      frequencyInfoDL
        frequencyBandList: 1 item
          Item 0
            NR-MultiBandInfo
              freqBandIndicatorNR: 78
              nr-NS-PmaxList: 1 item
                Item 0
                  NR-NS-PmaxValue
                    additionalSpectrumEmission: 0
      offsetToPointA: 2 PRBs
      scs-SpecificCarrierList: 1 item
        Item 0
          SCS-SpecificCarrier
            offsetToCarrier: 0
            subcarrierSpacing: kHz30 (1)
            carrierBandwidth: 273

Referring to Table 7, it may be identified that carrierBandwidth is set to 273, and it may be identified that the bandwidth corresponding to carrierBandwidth of 273 is 100 MHz and SCS is 30 kHz by Table 8 below.

TABLE 8

| SCS (kHz) | 5M $N_{RB}$ | 10M $N_{RB}$ | 15M $N_{RB}$ | 20M $N_{RB}$ | 25M $N_{RB}$ | 30M $N_{RB}$ | 40M $N_{RB}$ | 50M $N_{RB}$ | 60M $N_{RB}$ | 70M $N_{RB}$ | 80M $N_{RB}$ | 90M $N_{RB}$ | 100M $N_{RB}$ |
|---|---|---|---|---|---|---|---|---|---|---|---|---|---|
| 15 | 25 | 52 | 79 | 106 | 133 | 160 | 216 | 270 | N/A | N/A | N/A | N/A | N/A |
| 30 | 11 | 24 | 38 | 51 | 65 | 78 | 106 | 133 | 162 | 189 | 217 | 245 | 273 |

Information related to the partial bandwidth (BWP) may be identified through the RRC reconfiguration message of Table 9 below.

TABLE 9 rrcReconfiguration
  spCellConfig
    spCellConfigDedicated
      downlinkBWP-ToAddModList: 1 item
        Item 0
          BWP-Downlink
            bwp-Id: 1
            bwp-Common
              genericParameters
                locationAndBandwidth: 31624
                subcarrierSpacing: kHz30 (1)
  ...
  firstActiveDownlinkBWP-Id: 1

Referring to Table 9, it may be identified that locationAndBandwidth is set to 31624, and it may identify that the partial bandwidth corresponding to locationAndBandwidth of 31624 is 60 MHz by Table 10 below.

TABLE 10

| CBW | max RB | Equation | RIV Calculation | locationAndBandwidth |
|---|---|---|---|---|
| 5 | 11 | (1) | 275*(11 − 1) + 0 | 2750 |
| 10 | 24 | (1) | 275*(24 − 1) + 0 | 6325 |
| 15 | 38 | (1) | 275*(38 − 1) + 0 | 10175 |
| 20 | 51 | (1) | 275*(51 − 1) + 0 | 13750 |
| 25 | 65 | (1) | 275*(65 − 1) + 0 | 17600 |
| 30 | 78 | (1) | 275*(78 − 1) + 0 | 21175 |
| 40 | 106 | (1) | 275*(106 − 1) + 0 | 28875 |
| 50 | 133 | (1) | 275*(133 − 1) + 0 | 36300 |
| 60 | 162 | (2) | 275*(275 − 162 + 1) + (275 − 1 − 0) | 31624 |
| 70 | 189 | (2) | 275*(275 − 189 + 1) + (275 − 1 − 0) | 24199 |
| 80 | 217 | (2) | 275*(275 − 217 + 1) + (275 − 1 − 0) | 16499 |
| 90 | 245 | (2) | 275*(275 − 245 + 1) + (275 − 1 − 0) | 8799 |
| 100 | 273 | (2) | 275*(275 − 273 + 1) + (275 − 1 − 0) | 1099 |

When "downlinkBWP-ToAddModList" is not included in the RRC reconfiguration message of Table 9, the corresponding electronic device 101 may determine that the BWP is not supported during a VoNR call.

According to various embodiments, the electronic device 101 may perform at least one operation to disable VoNR based on identifying that the bandwidth- or bandwidth part-related information meets a designated condition in operation 2208. For example, based on identifying that the NR bandwidth of the serving cell exceeds a first threshold based on the bandwidth-related information, the electronic device 101 may perform at least one operation for disabling VoNR. As exemplified in the above-described Table 3, the current consumed during a VoNR call may vary depending on the bandwidth. For example, in the case of LTE, since the maximum bandwidth of 1 carrier component (CC) is 20 MHz, a larger NR bandwidth value than a current simulation value consumed at VoLTE 20 MHz may be set as the first threshold. When the NR bandwidth of the current serving cell is equal to or larger than the first threshold, the electronic device 101 may perform EPS fallback because it consumes less current to perform a VoLTE call through EPS fallback.

According to various embodiments, the communication network may allocate only a partial bandwidth to the electronic device 101 using a partial bandwidth (BWP) during a VoNR call to reduce power consumption. For example, since VoNR is not a function that requires a wide bandwidth, when the bandwidth of 1 CC is relatively large, the communication network may reduce the current consumption of the electronic device 101 by allocating only a bandwidth smaller than the bandwidth of the 1 CC. According to various embodiments, to identify whether the communication network supports VoNR, it may be identified whether a separate BWP is allocated when a VoNR call is connected. For example, it consumes less current to connect a VoNR call through EPS fallback when the communication network does not support BWP, so that the VoNR capability setting may be disabled. According to various embodiments, even when the communication network allocates the BWP to the electronic device 101, if the set bandwidth identified through the BWP setting is larger than a second threshold, the VoNR capability setting may be disabled.

According to various embodiments, as described above in connection with Table 2, the electronic device 101 may set the "NG-RAN Radio Capability Update" in the registration request message to 1 and transmit it to the communication network, thereby notifying the communication network that the UE capability information needs to be updated. The communication network may identify that the electronic device 101 needs to update the UE capability through the registration request message transmitted from the electronic device 101. The communication network may transmit a UE capability enquiry message to the electronic device 101 to identify the UE capability update information. The electronic device 101 may receive the UE capability enquiry message from the communication network and transmit UE capability information including the updated information to the communication network. As described above, the UE capability information may include information regarding whether the electronic device 101 supports VoNR. According to various embodiments, the electronic device 101 may update "voiceOverNR" in the above-described Table 1 to "not supported" or "0", and transmit it to the communication network so that a call connection in the communication network is made via VoLTE through EPS fallback, not via VoNR.

According to various embodiments, if the electronic device 101 determines that it is inefficient to update UE capability information to VoNR not supported, the electronic device 101 does not update the UE capability information, but switches to LTE only during call origination and then attempts to make a VoNR call. For example, even when the "NG-RAN Radio Capability Update" value is set to 1, if the communication network does not inquire about UE capability information or if it is determined that transmission of a registration request for UE capability update may fail due to poor NR signal strength, the electronic device 101 may switch to LTE only upon call origination and then attempt to make a VoLTE call.

Figure 23:
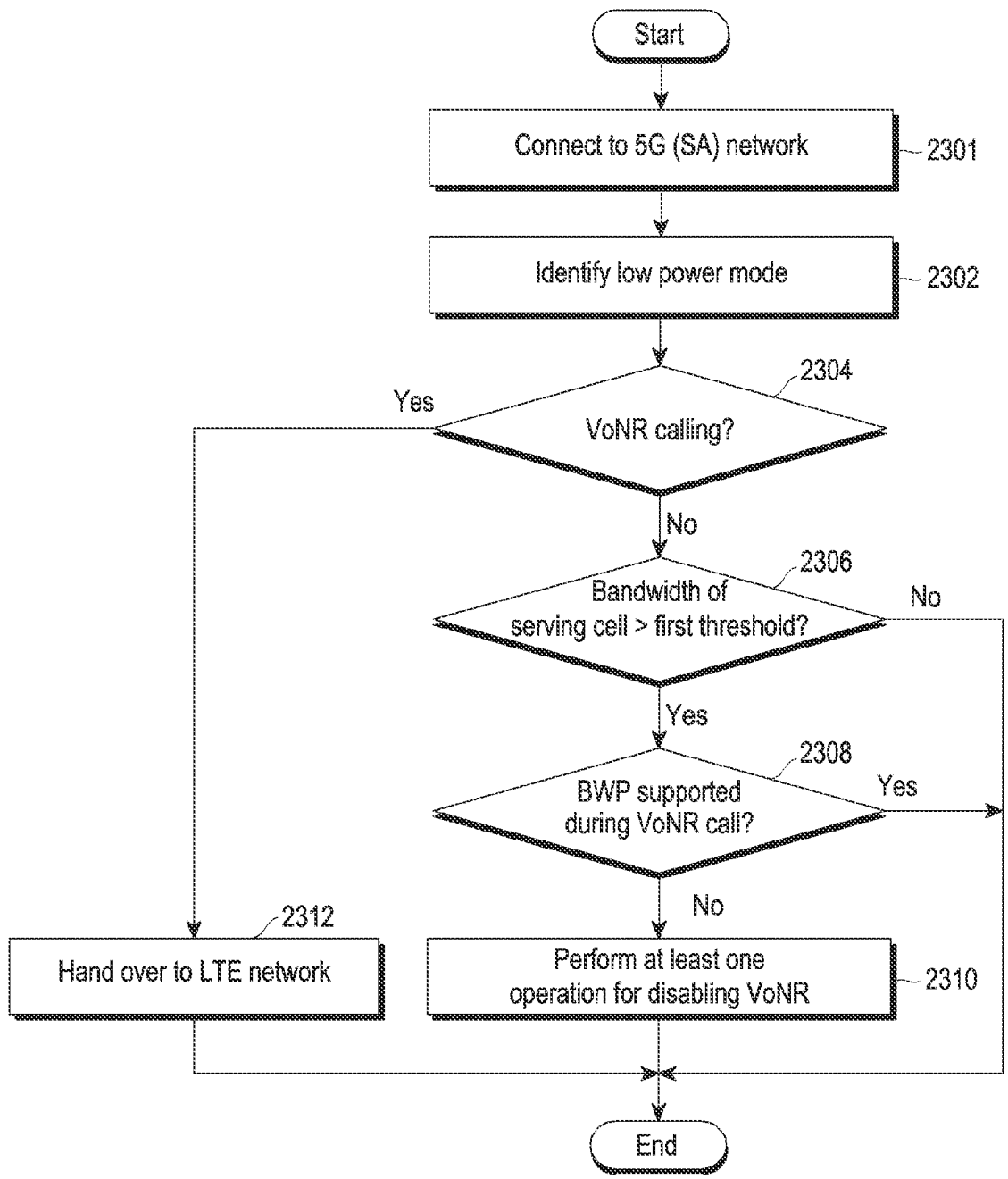
FIG. 23 is a flowchart illustrating operations of an example electronic device according to various embodiments.

FIG. 23 is a flowchart illustrating operations of an example electronic device according to various embodiments. Referring to FIG. 23, according to various embodiments, the electronic device 101 (e.g., at least one of the processor 120, the first communication processor 212, the second communication processor 214, or the integrated communication processor 260) may connect with the 5G network via SA in operation 2301.

According to various embodiments, the electronic device 101 may determine whether a low power mode (LPM) is met (identified) in operation 2302. For example, the low power mode refers, for example, to a context in which power consumption of the electronic device 101 is to be reduced and may include, but is not limited to, is at least one of a heat generation context (e.g., over-temperature state), a context in which the display is turned off, or a context in which the battery level is a set value or less. For example, the over-temperature state may be identified based on receiving an indication indicating over-temperature by the communication processor when the temperature information obtained by the processor 120 is the designated threshold temperature (e.g., 43° C.) or more.

According to various embodiments, the electronic device 101 may identify whether it is making a VoNR call in operation 2304. If it is identified that it is making a VoNR call (operation 2304—YES), the electronic device 101 may perform handover to the LTE network in operation 2312. For example, the handover to the LTE network may be performed as the electronic device 101 transmits a fake measurement report (MR) to the communication network. For example, inter-RAT handover may require that the signal strength of the serving RAT be less than or equal to a first threshold (threshold1) and the signal strength of the target RAT be larger than or equal to a second threshold (threshold2). To induce handover to the LTE network (e.g., N2L handover), the electronic device 101 may transmit a fake MR indicating that the signal strength of the serving RAT is equal to or smaller than the first threshold, thus allowing the communication network to lead the electronic device 101 to hand over to the LTE network.

If it is identified that it is not making a VoNR call in operation 2304 (operation 2304—NO), the electronic device 101 may identify whether the bandwidth of the serving cell exceeds the first threshold in operation 2306. For example, the bandwidth-related information may be identified through the above-described Tables 7 and 8. As a result of the identification in operation 2306, if the bandwidth of the serving cell does not exceed the first threshold (operation 2306—NO), the VoNR enabled state may be maintained.

According to various embodiments, as a result of the identification in operation 2306, if the bandwidth of the serving cell exceeds the first threshold (operation 2306—YES), the electronic device 101 may identify whether the BWP is supported during a VoNR call in operation 2308. Whether the electronic device 101 supports the BWP during a VoNR call may be identified through information about whether BWP is supported (e.g., downlinkBWP-ToAddModList) in the RRC reconfiguration message of Table 9 as described above. For example, as described above, when "downlinkBWP-ToAddModList" is not included in the RRC reconfiguration message of Table 9, the corresponding electronic device 101 may determine that the BWP is not supported during a VoNR call.

According to various embodiments, as a result of the identification in operation 2308, if it is identified that the electronic device 101 supports BWP during a VoNR call (operation 2308—YES), the VoNR enabled state may be maintained. As a result of the identification in operation 2308, if it is identified that the electronic device 101 does not support BWP during a VoNR call (operation 2308—NO), the electronic device 101 may perform at least one operation for disabling VoNR in operation 2310. For example, as described above in connection with Table 2, the electronic device 101 may set the "NG-RAN Radio Capability Update" in the registration request message to 1 and transmit it to the communication network, thereby notifying the communication network that the UE capability information needs to be updated. The communication network may identify that the electronic device 101 needs to update the UE capability through the registration request message transmitted from the electronic device 101. The communication network may transmit a UE capability enquiry message to the electronic device 101 to identify the UE capability update information. The electronic device 101 may receive the UE capability enquiry message from the communication network and transmit UE capability information including the updated information to the communication network. As described above, the UE capability information may include information regarding whether the electronic device 101 supports VoNR. According to various embodiments, the electronic device 101 may update "voiceOverNR" in the above-described Table 1 to "not supported" or "0", and transmit it to the communication network, thereby disabling VoNR. As the VoNR is disabled during a call connection for the electronic device 101, the communication network may connect to VoLTE through EPS fallback, not through VoNR.

Figure 24:
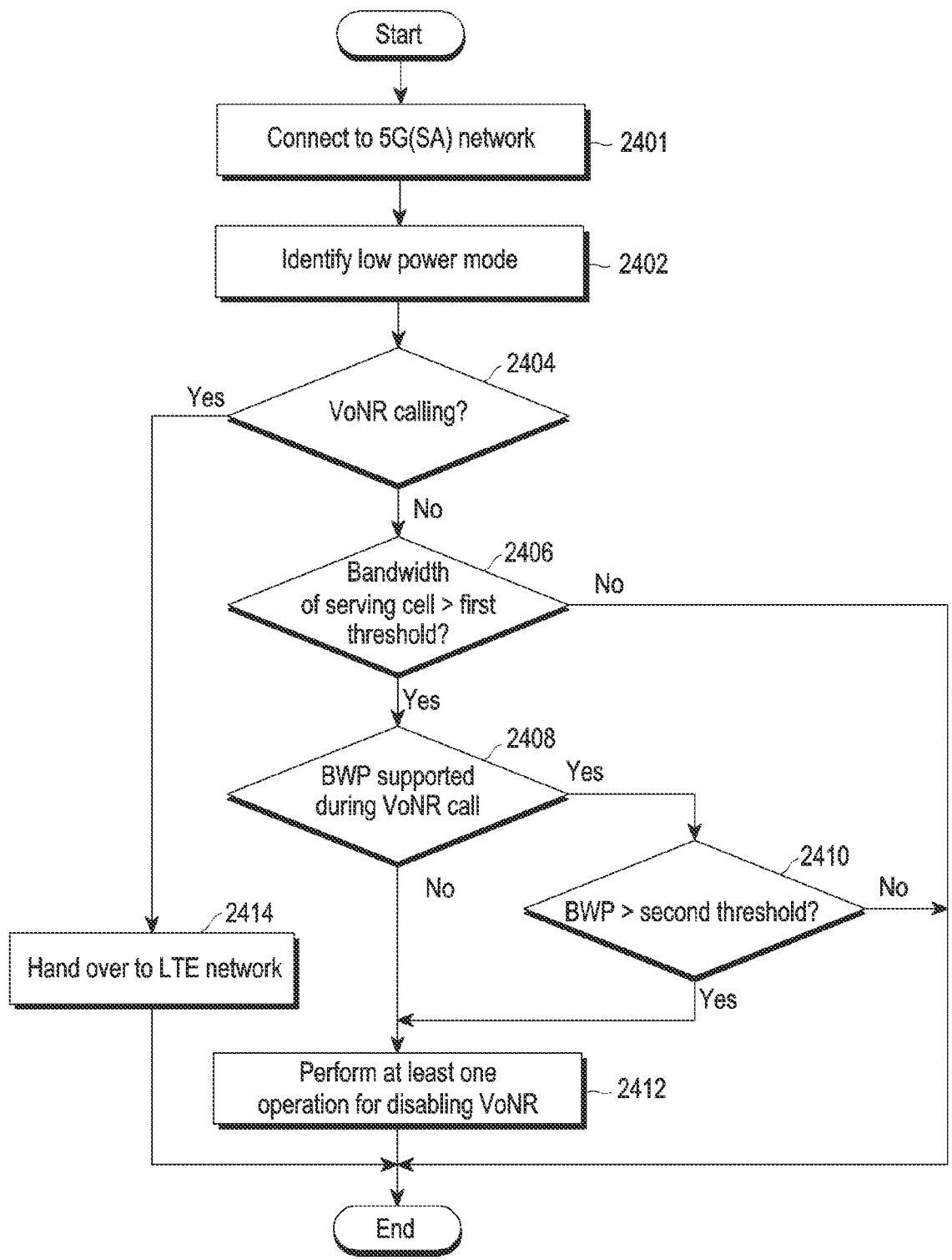
FIG. 24 is a flowchart illustrating operations of an example electronic device according to various embodiments.

FIG. 24 is a flowchart illustrating operations of an example electronic device according to various embodiments. Referring to FIG. 24, according to various embodiments, the electronic device 101 (e.g., at least one of the processor 120, the first communication processor 212, the second communication processor 214, or the integrated communication processor 260) may connect with the 5G network via SA in operation 2401.

According to various embodiments, the electronic device 101 may determine whether a low power mode (LPM) is met (identified) in operation 2402. For example, the low power mode refers, for example, to a context in which power consumption of the electronic device 101 is to be reduced and may include, but is not limited to, is at least one of a heat generation context (e.g., over-temperature state), a context in which the display is turned off, or a context in which the battery level is a set value or less. For example, the over-temperature state may be identified based on receiving an indication indicating over-temperature by the communication processor when the temperature information obtained by the processor 120 is the designated threshold temperature (e.g., 43° C.) or more.

According to various embodiments, the electronic device 101 may identify whether it is making a VoNR call in operation 2404. If it is identified that it is making a VoNR call (operation 2404—YES), the electronic device 101 may perform handover to the LTE network in operation 2414. For example, the handover to the LTE network may be performed as the electronic device 101 transmits a fake measurement report (MR) to the communication network. For example, inter-RAT handover requires that the signal strength of the serving RAT be less than or equal to a first threshold (threshold1) and the signal strength of the target RAT be larger than or equal to a second threshold (threshold2). To induce handover to the LTE network (e.g., N2L handover), the electronic device 101 may transmit a fake MR indicating that the signal strength of the serving RAT is equal to or smaller than the first threshold, thus allowing the communication network to lead the electronic device 101 to hand over to the LTE network.

If it is identified that it is not making a VoNR call in operation 2404 (operation 2404—NO), the electronic device 101 may identify whether the bandwidth of the serving cell exceeds the first threshold in operation 2406. For example, the bandwidth-related information may be identified through the above-described Tables 7 and 8. As a result of the identification in operation 2406, if the bandwidth of the serving cell does not exceed the first threshold (operation 2406—NO), the VoNR enabled state may be maintained.

According to various embodiments, as a result of the identification in operation 2406, if the bandwidth of the serving cell exceeds the first threshold (operation 2406—YES), the electronic device 101 may identify whether the BWP is supported during a VoNR call in operation 2408. Whether the electronic device 101 supports the BWP during a VoNR call may be identified through information about whether BWP is supported (e.g., downlinkBWP-ToAdd- ModList) in the RRC reconfiguration message of Table 9 as described above. For example, as described above, when "downlinkBWP-ToAddModList" is not included in the RRC reconfiguration message of Table 9, the corresponding electronic device 101 may determine that the BWP is not supported during a VoNR call.

According to various embodiments, if it is identified that the electronic device 101 supports BWP during a VoNR call as a result of the identification in operation 2408 (operation 2408—YES), the electronic device 101 may identify whether the BWP set in the electronic device 101 exceeds a second threshold in operation 2410. As a result of the identification in operation 2410, if it is identified that the BWP set in the electronic device 101 does not exceed the second threshold (operation 2410—NO), the VoNR enabled state may be maintained.

According to various embodiments, as a result of the identification in operation 2410, if it is identified that the BWP set in the electronic device 101 exceeds the second threshold (operation 2410—YES), the electronic device 101 may perform at least one operation for disabling VoNR in operation 2412. As a result of the identification in operation 2408, if it is identified that the electronic device 101 does not support BWP during a VoNR call (operation 2408—NO), the electronic device 101 may perform at least one operation for disabling VoNR in operation 2412.

For example, as described above in connection with Table 2, the electronic device 101 may set the "NG-RAN Radio Capability Update" in the registration request message to 1 and transmit it to the communication network, thereby notifying the communication network that the UE capability information needs to be updated. The communication network may identify that the electronic device 101 needs to update the UE capability through the registration request message transmitted from the electronic device 101. The communication network may transmit a UE capability enquiry message to the electronic device 101 to identify the UE capability update information. The electronic device 101 may receive the UE capability enquiry message from the communication network and transmit UE capability information including the updated information to the communication network. As described above, the UE capability information may include information regarding whether the electronic device 101 supports VoNR. According to various embodiments, the electronic device 101 may update "voiceOverNR" in the above-described Table 1 to "not supported" or "0", and transmit it to the communication network, thereby disabling VoNR. As the VoNR is disabled during a call connection for the electronic device 101, the communication network may connect to VoLTE through EPS fallback, not through VoNR.

Embodiments of a VoLTE setup process when the electronic device 101 does not support BWP are described below with reference to FIGS. 25 and 26.

Figure 25:
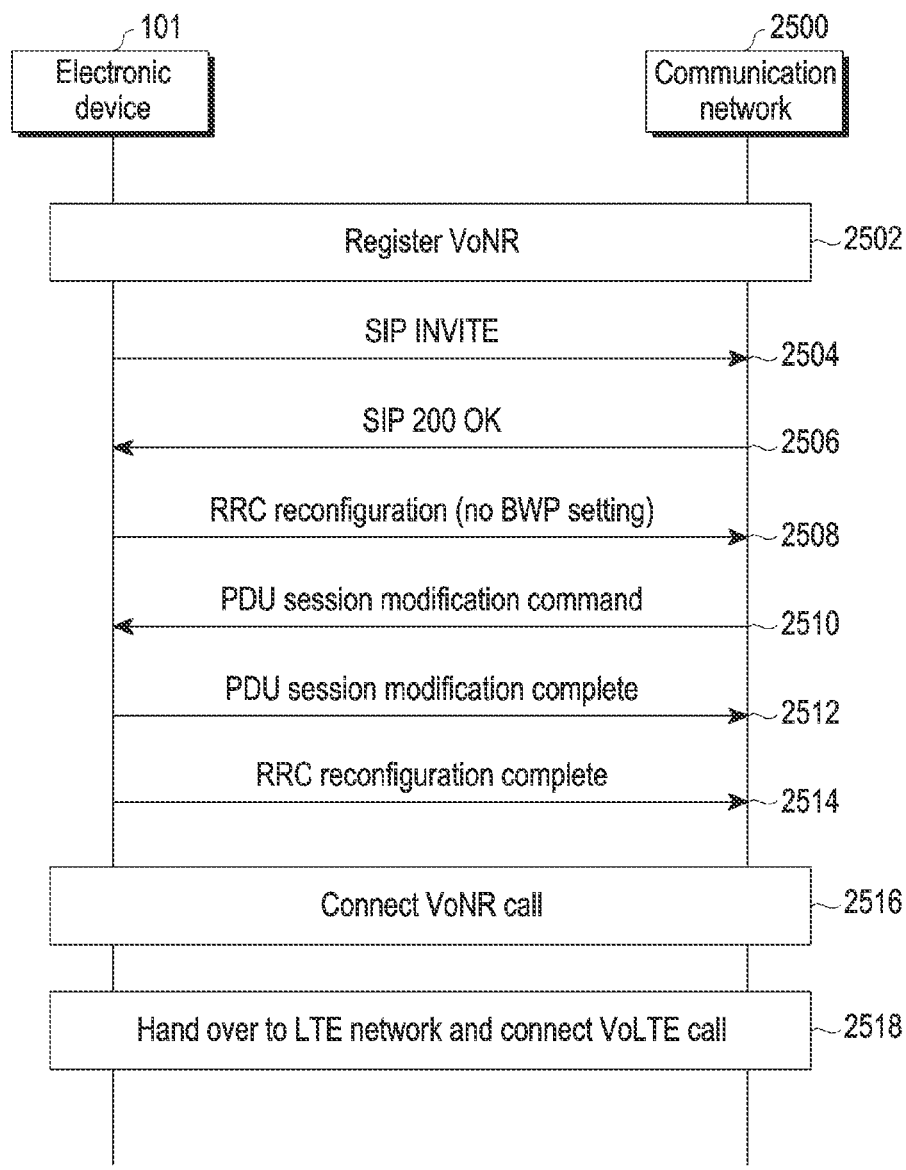
FIG. 25 is a flowchart illustrating operations of an example electronic device according to various embodiments.

FIG. 25 is a flowchart illustrating operations of an example electronic device according to various embodiments. Referring to FIG. 25, according to various embodiments, the electronic device 101 may register with the communication network 2500 (e.g., the 5G network 350) and register VoNR with the IMS server through the communication network 2500 in operation 2502. The VoNR registration procedure may be performed as described above in connection with 1411 of FIG. 14B.

According to various embodiments, according to receiving a call origination request from the user, the electronic device 101 may transmit a SIP INVITE message to the counterpart electronic device 101 through the communication network 2500 in operation 2504. According to various embodiments, the electronic device 101 may receive the SIP 200 OK message transmitted from the counterpart electronic device through the communication network 2500 in operation 2506.

According to various embodiments, the electronic device 101 may transmit an RRC reconfiguration message to the communication network 2500 which lacks a BWP setting in operation 2508. The communication network 2500 may transmit a PDU session update command (PDU session modification command) to the electronic device 101 in operation 2510. In response to receiving the PDU session update command, the electronic device 101 may transmit a PDU session update complete (PDU session modification complete) in operation 2512. According to the completion of the RRC reconfiguration, the electronic device 101 may transmit an RRC reconfiguration complete message to the communication network 1400 in operation 2514. Through the above procedure, the electronic device 101 may connect a VoNR call with the receiving electronic device through the communication network 1400 in operation 2516. According to various embodiments, the electronic device 101 may hand over to the LTE network and connect a VoLTE call as described above in operation 2518.

Figure 26:
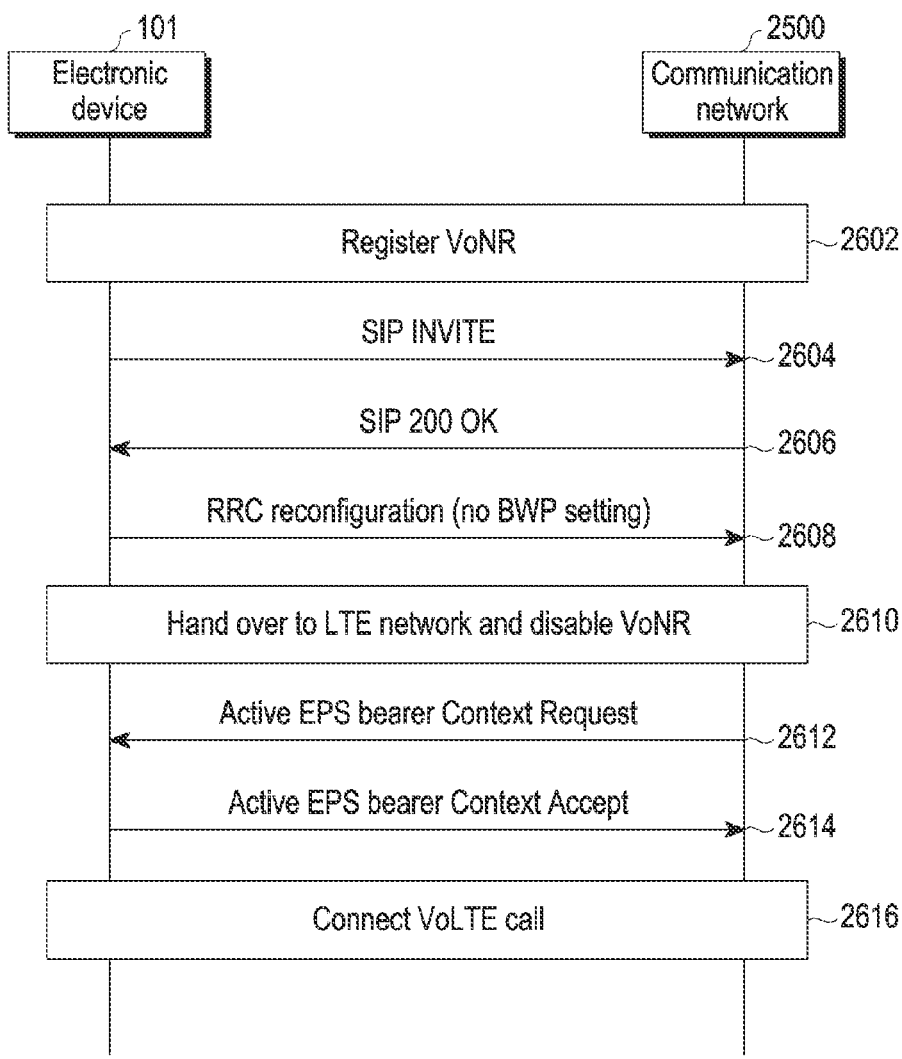
FIG. 26 is a flowchart illustrating operations of an example electronic device according to various embodiments.

FIG. 26 is a flowchart illustrating operations of an example electronic device according to various embodiments. Referring to FIG. 26, according to various embodiments, the electronic device 101 may register with the communication network 2500 (e.g., the 5G network 350) and register VoNR with the IMS server through the communication network 2500 in operation 2602. The VoNR registration procedure may be performed as described above in connection with 1411 of FIG. 14B.

According to various embodiments, according to receiving a call origination request from the user, the electronic device 101 may transmit a SIP INVITE message to the counterpart electronic device 101 through the communication network 2500 in operation 2604. According to various embodiments, the electronic device 101 may receive the SIP 200 OK message transmitted from the counterpart electronic device through the communication network 2500 in operation 2606.

According to various embodiments, the electronic device 101 may transmit an RRC reconfiguration message to the communication network 2500 which lacks a BWP setting in operation 2608. According to various embodiments, the electronic device 101 may hand over to the LTE network and disable VoNR in operation 2610.

According to various embodiments, the communication network 2500 (e.g., the LTE network 340) may transmit an active EPS bearer context request message to the electronic device 101 in operation 2612. In response to receiving the active EPS bearer context request message, the electronic device 101 may transmit an active EPS bearer context accept message to the communication network 2500 (e.g., the LTE network 340) in operation 2614. According to the above procedure, in operation 2616, the electronic device 101 may complete the VoLTE call connection through the communication network 2500 (e.g., the LTE network 340).

According to various embodiments, it may be assumed that the battery capacity of the electronic device 101 is 3000 mA, the current consumption is 240 mA in a state of operating at NR 100 MHz, 256 QAM, and 4×4, the current consumption is 180 mA in a state of operating at NR 20 MHz, 256QAM, and 4×4, and the consumption current is 110 mA in a state of operating at LTE 10 MHz, 256QAM, and 2×2. In this case, it may be assumed that the above-described first threshold is 20 MHz, and the bandwidth of the serving cell is NR 100 MHz. If the remaining battery level of the electronic device 101 is 5% (150 mA) or less, an event related to the low power mode may be transferred from the processor to the communication processor.

According to various embodiments, the electronic device 101 may receive the event related to the low power mode and may compare the bandwidth of the serving cell with the first threshold. For example, since the bandwidth of the serving cell is 100 MHz and the first threshold is 20 MHz or more, it is possible to identify whether BWP is supported. According to various embodiments, the communication network may connect a VoNR call to the electronic device 101 at least once to identify whether BWP is supported. As a result of the identification, if BWP is not supported or, although supported, a BWP not less than 20 MHz which is the first threshold is allocated, the electronic device 101 may perform at least one operation for disabling VoNR as described above. If it is assumed that the current consumption is 240 mA upon VoNR call connection and is 110 mA upon VoLTE call connection when the electronic device 101 is so operated, it is possible to reduce current consumption by 130 mA, thus securing one hour of call time even with a remaining battery level of 5%.

According to various embodiments, it may be assumed that the electronic device 101 is a wearable device, the battery capacity is 3000 mA, the current consumption is 180 mA in a state of operating at NR 20 MHz, 256QAM, and 4×4, and the consumption current is 110 mA in a state of operating at LTE 10 MHz, 256QAM, and 2×2. In this case, it may be assumed that the above-described first threshold is 20 MHz, and the bandwidth of the serving cell is NR 20 MHz. If the temperature measured for the electronic device 101 is 41 degrees or more and is thus identified as the over-temperature state, an indicator indicating the over-temperature state or a low power mode-related event may be transferred from the processor to the communication processor.

According to various embodiments, the electronic device 101 may receive the event related to the low power mode and may compare the bandwidth of the serving cell with the first threshold. For example, since the bandwidth of the serving cell is 20 MHz and the first threshold is 20 MHz or more, it is possible to identify whether BWP is supported. According to various embodiments, the communication network may connect a VoNR call to the electronic device 101 at least once to identify whether BWP is supported. As a result of the identification, if BWP is not supported or, although supported, a BWP not less than 20 MHz which is the first threshold is allocated, the electronic device 101 may perform at least one operation for disabling VoNR as described above. If it is assumed that the current consumption is 180 mA upon VoNR call connection and is 110 mA upon VoLTE call connection when the electronic device 101 is so operated, it is possible to reduce current consumption by 70 mA and, if the current consumption is reduced by 70 mA, the temperature may be dropped by 1.16 degrees, thereby relieving the over-temperature state.

Figure 27:
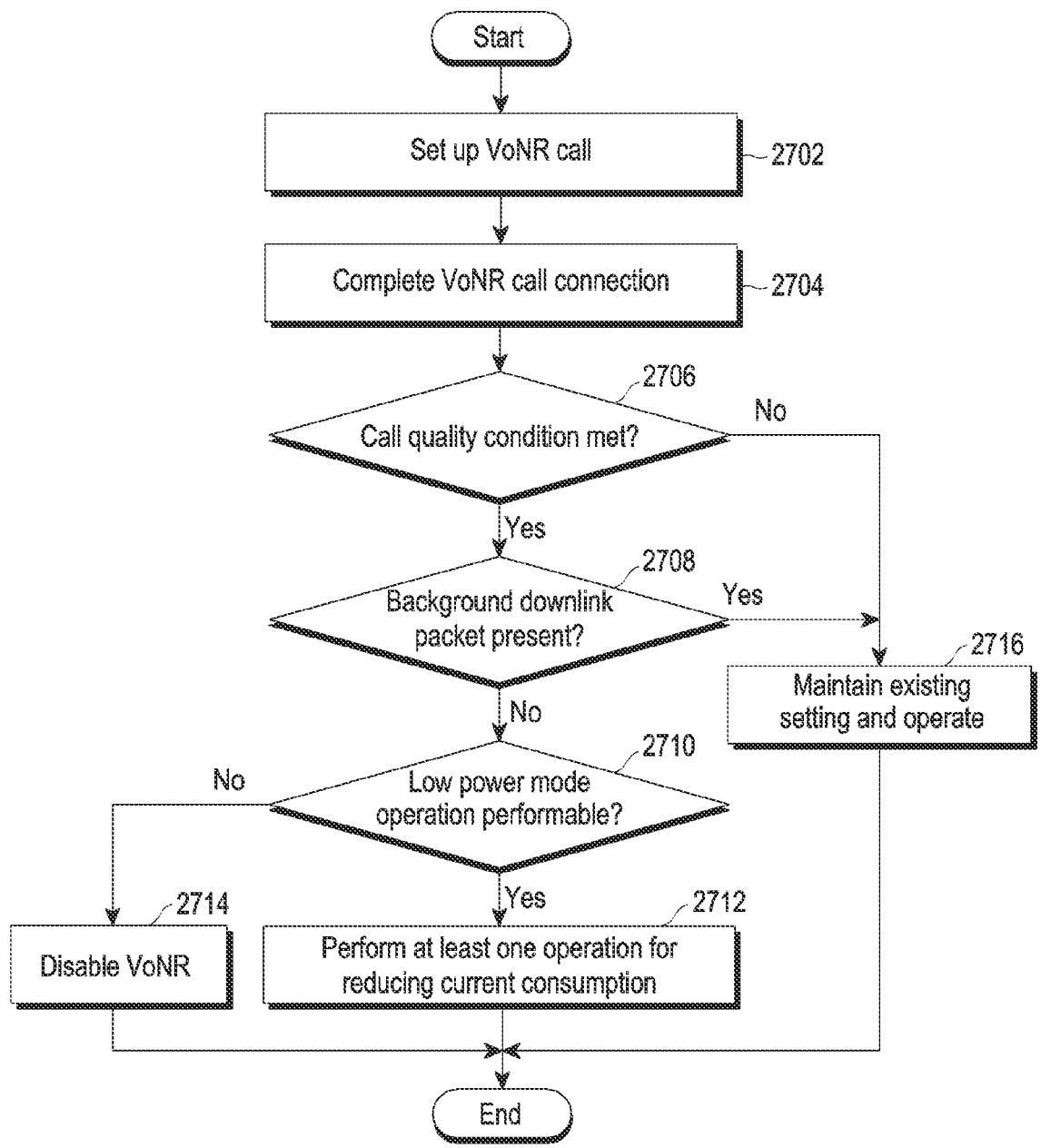
FIG. 27 is a flowchart illustrating operations of an example electronic device according to various embodiments.

FIG. 27 is a flowchart illustrating operations of an example electronic device according to various embodiments. Referring to FIG. 27, according to various embodiments, the electronic device 101 may make a call to or receive a call from an external electronic device. The electronic device 101 may perform a call setup procedure with the currently connected communication network in operation 2702. For example, the electronic device 101 (e.g., at least one of the processor 120, the first communication processor 212, the second communication processor 214, or the integrated communication processor 260) may set up a VoNR call with an external electronic device through the 5G network 350 in a state connected to the 5G network 350 and complete the call setup in operation 2704. The VoNR call setup procedure may be performed as described above in connection with FIGS. 14A and 14B.

According to various embodiments, the electronic device 101 may identify whether the call quality condition is met in a VoNR call connected state with the external electronic device in operation 2706. For example, as described above in connection with FIG. 7, the electronic device 101 may identify whether the call quality condition is met by identifying information related to call quality. For example, the information related to the call quality may include at least one of signal to interference and noise ratio (SINR), reference signal received power (RSRP), block error rate (BLER), modulation and coding scheme (MCS), residual error, or real time protocol (RTP) packet non-received information. Embodiments of determining whether the call quality condition is met based on the information related to each call quality have been described in detail with reference to FIG. 7, and thus, a description thereof is not repeated here.

According to various embodiments, if it is determined that the call quality condition is not met based on the information related to the call quality (operation 2706—NO), the electronic device 101 may maintain the existing setting and operate in operation 2716.

According to various embodiments, if the electronic device 101 determines that the call quality condition is met based on the information related to the call quality (operation 2706—YES) (e.g., if it is determined that the call quality is ensured), the electronic device 101 may determine whether a background download packet exists in operation 2708. According to various embodiments, the existence of the background download packet may be determined based on a grant ratio as described above.

According to various embodiments, when the electronic device 101 is in the VoNR call connected state, downlink packets having a relatively small size are generated, but when data packets are downloaded in the background, the grant ratio may increase. For example, when the grant ratio is equal to or larger than a setting value (e.g., 20%), the electronic device 101 may determine that a background download packet exists.

According to various embodiments, when the electronic device 101 determines that the background download packet exists in operation 2708 (operation 2708—YES), the electronic device 101 may maintain the existing setting and operate in operation 2716.

According to various embodiments, when the electronic device 101 determines that the background download packet does not exist in operation 2708 (operation 2708—NO), the electronic device 101 may identify whether it is possible to perform a low-power mode operation (e.g., the operation of reducing the number of reception antennas or the operation of reducing the overall bandwidth in the SA CA environment) in operation 2710. For example, when the serving cell is an NR refarming band and has a bandwidth of 10 MHz, the low power mode cannot operate. As described above, in such an environment, since the current consumption on VoNR is higher than current consumption on VoLTE during a call connection, it may be advantageous in terms of current consumption and heat generation control to receive/send a call via EPS fallback after disabling VoNR. According to various embodiments, when it is identified that the low power mode operation (e.g., the operation of reducing the number of reception antennas or the operation of reducing the overall bandwidth in the SA CA environment) cannot be performed in operation 2710 (operation 2710—NO), the electronic device 101 may disable VoNR in operation 2714.

According to various embodiments, when it is identified that the low power mode operation (e.g., the operation of reducing the number of reception antennas or the operation of reducing the overall bandwidth in the SA CA environment) can be performed in operation 2710 (operation 2710—YES), the electronic device 101 may perform at least one operation for reducing current consumption in operation 2712. For example, the electronic device 101 may control to reduce the number of reception antennas or to reduce the overall bandwidth in the SA CA environment. For example, in an environment in which the electronic device 101 cannot perform the operation set in response to the low power mode, current consumption may be reduced by disabling VoNR. According to various embodiments, since the electronic device 101 may have a current consumption effect by disabling VoNR even in an environment in which the operation set in response to the low power mode may be performed, the electronic device 101 may control to simultaneously perform the low power mode and VoNR disabling.

Figure 28:
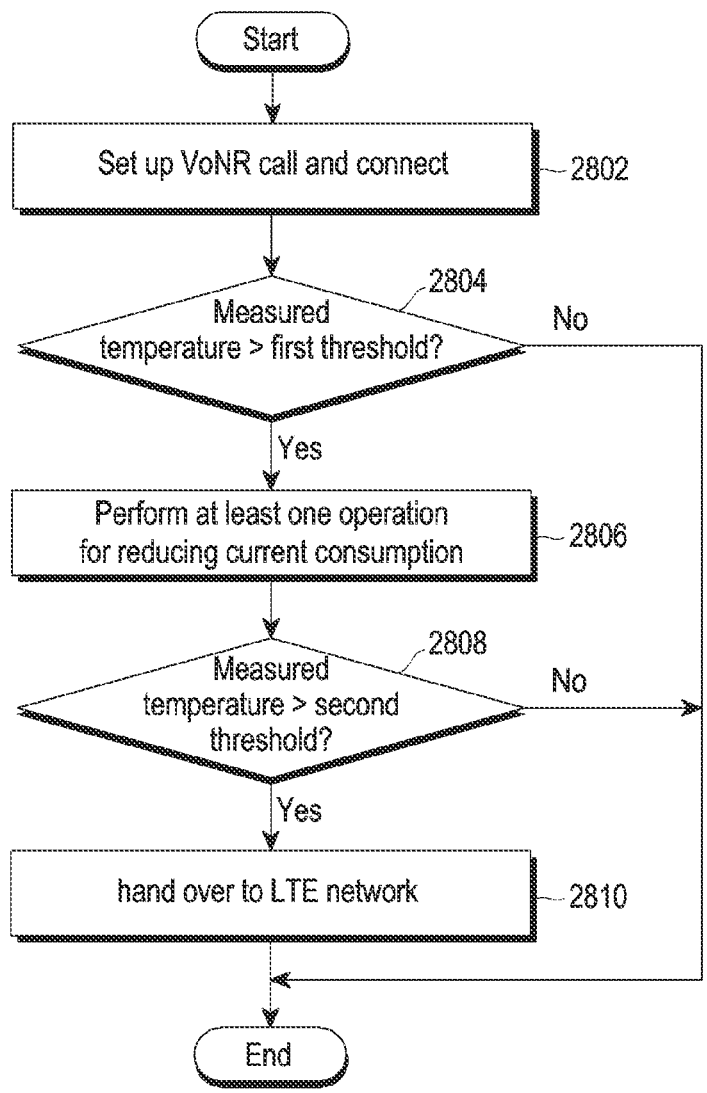
FIG. 28 is a flowchart illustrating operations of an example electronic device according to various embodiments.

FIG. 28 is a flowchart illustrating operations of an example electronic device according to various embodiments. Referring to FIG. 28, according to various embodiments, the electronic device 101 (e.g., at least one of the processor 120, the first communication processor 212, the second communication processor 214, or the integrated communication processor 260) may send or receive a call to/from an external electronic device. The electronic device 101 may perform a call setup procedure with the currently connected communication network. For example, in operation 2802, the electronic device 101 may set up a VoNR call and complete the call setup with an external electronic device through the 5G network 350 while connected to the 5G network 350. The VoNR call setup procedure may be performed as described above in connection with FIGS. 14A and 14B.

According to various embodiments, the electronic device 101 may identify whether the measured temperature exceeds the first threshold (e.g., 43° C.) in operation 2804. As a result of the identification, if the measured temperature does not exceed the first threshold (operation 2804—NO), the existing operation may be performed. As a result of the identification, when the measured temperature exceeds the first threshold (operation 2804—YES), the electronic device 101 may perform at least one operation for reducing current consumption in operation 2806. For example, the electronic device 101 may reduce current consumption by performing the operation of reducing the number of antennas for reception among the plurality of antennas (e.g., from 4Rx to 2Rx) in operation 2806. According to various embodiments, the operation of reducing current consumption may be implemented in other various manners than reducing the number of antennas. For example, the electronic device 101 may reduce current consumption by limiting the overall bandwidth of the serving cell and reduce current consumption by reducing the number of CAs.

According to various embodiments, after performing at least one operation for reducing current consumption, the electronic device 101 may identify whether the measured temperature exceeds the second threshold (e.g., 45° C.) in operation 2808. As a result of the identification, when the measured temperature does not exceed the second threshold (operation 2808—NO), the existing operation may be performed. As a result of the identification, when the measured temperature exceeds the second threshold (operation 2808—YES), the electronic device 101 is in a state in which the over-temperature state is not addressed despite performing the operation for reducing current consumption and may thus perform handover to the LTE network in operation 2810. For example, the handover to the LTE network may be performed as the electronic device 101 transmits a fake measurement report (MR) to the communication network. For example, inter-RAT handover requires that the signal strength of the serving RAT be less than or equal to a first threshold (threshold1) and the signal strength of the target RAT be larger than or equal to a second threshold (threshold2). To induce handover to the LTE network (e.g., N2L handover), the electronic device 101 may transmit a fake MR indicating that the signal strength of the serving RAT is equal to or smaller than the first threshold, thus allowing the communication network to lead the electronic device 101 to hand over to the LTE network.

According to any one of various embodiments, an electronic device may comprise a plurality of antennas; and at least one communication processor may be configured to communicate with a first communication network or a second communication network through the plurality of antennas. The at least one communication processor may be configured to set up a call with an external electronic device through the first communication network, identify information related to call quality in a call connected state with the external electronic device, and perform an operation for reducing a number of antennas for reception among the plurality of antennas based on identifying that the information related to the call quality meets a designated condition.

According to various embodiments, the first communication network may include a 5G network, and the second communication network may include an LTE network.

According to various embodiments, the call set up through the first communication network may include a voice over new radio (VoNR) call.

According to various embodiments, the information related to the call quality may include at least one of signal to interference and noise ratio (SINR), reference signal received power (RSRP), block error rate (BLER), modulation and coding scheme (MCS), residual error, or real time protocol (RTP) packet non-received information.

According to various embodiments, the at least one communication processor may control to refrain from reducing the number of antennas for reception, based on identifying that a grant ratio (GR) is a set value or more.

According to various embodiments, the at least one communication processor may be configured to reduce the number of antennas for reception even when the GR is the set value or more, based on identifying an over-temperature state.

According to various embodiments, the at least one communication processor may be configured to transmit a fake rank indicator (RI) to the first communication network to reduce the number of antennas for reception among the plurality of antennas.

According to various embodiments, the at least one communication processor may receive information in which layers corresponding to multiple-input and multiple-output for the electronic device are configured to be reduced, from the first communication network, in response to transmission of the fake RI.

According to various embodiments, the at least one communication processor may be configured to transmit a fake sounding reference signal (SRS) to the first communication network to reduce the number of antennas for reception among the plurality of antennas.

According to various embodiments, the at least one communication processor may identify an over-temperature state, and control to refrain from performing at least one operation configured in response to the identified over-temperature state, based on the electronic device being in the call connected state with the external electronic device.

According to any one of various embodiments, a method for reducing current consumption in an electronic device communicating with a first communication network or a second communication network through a plurality of antennas may comprise allowing the electronic device to set up a call with an external electronic device through the first communication network, allowing the electronic device to identify information related to call quality in a call connected state with the external electronic device, and reducing a number of antennas for reception among the plurality of antennas based on identifying that the information related to the call quality meets a designated condition.

According to various embodiments, the first communication network may include a 5G network, and the second communication network may include an LTE network.

According to various embodiments, the call set up through the first communication network may include a voice over new radio (VoNR) call.

According to various embodiments, the information related to the call quality may include at least one of signal to interference and noise ratio (SINR), reference signal received power (RSRP), block error rate (BLER), modulation and coding scheme (MCS), residual error, or real time protocol (RTP) packet non-received information.

According to various embodiments, the method may further comprise controlling to refrain from reducing the number of antennas for reception, based on identifying that a grant ratio (GR) is a set value or more.

According to any one of various embodiments, an electronic device may comprise a plurality of antennas and at least one communication processor may be configured to communicate with a first communication network or a second communication network through the plurality of antennas. The at least one communication processor may be configured to register voice over new radio (VoNR) through the first communication network, identify information related to a set bandwidth or bandwidth part (BWP) from the first communication network, and perform at least one operation for disabling the VoNR based on identifying that the information related to the bandwidth or the bandwidth part meets a designated condition.

According to various embodiments, the first communication network may include a 5G network, and the second communication network may include an LTE network.

According to various embodiments, the at least one communication processor may be configured to identify a bandwidth of a serving cell and perform at least one operation for disabling the VoNR based on identifying that the bandwidth of the serving cell exceeds a first threshold.

According to various embodiments, the at least one communication processor may be configured to identify whether the BWP is supported when the VoNR call is connected, and perform at least one operation for disabling the VoNR based on identifying that the BWP is not supported when the VoNR call is connected.

According to various embodiments, the at least one communication processor may be configured to identify whether the BWP is supported when the VoNR call is connected, identify whether the BWP exceeds a second threshold based on identifying that the BWP is supported when the VoNR call is connected, and perform at least one operation for disabling the VoNR based on identifying that the BWP exceeds the second threshold.

The electronic device according to various embodiments of the disclosure may be one of various types of electronic devices. The electronic devices may include, for example, a portable communication device (e.g., a smart phone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). If an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program) including one or more instructions that are stored in a storage medium (e.g., internal memory or external memory) that is readable by a machine (e.g., a master device or a device performing tasks). For example, a processor of the machine (e.g., a master device or a device performing tasks) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. The term "non-transitory" storage medium refer, for example, to a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising,
a plurality of antennas; and
at least one communication processor configured to communicate with a first communication network or a second communication network through the plurality of antennas,
wherein the at least one communication processor is configured to:
set up a call with an external electronic device through the first communication network,
identify information related to call quality in a call connected state with the external electronic device, and
perform an operation for reducing a number of antennas for reception among the plurality of antennas based on identifying that the information related to the call quality meets a designated condition.

2. The electronic device of claim 1, wherein the first communication network includes a 5G network, and the second communication network includes an LTE network.

3. The electronic device of claim 1, wherein the call set up through the first communication network includes a voice over new radio (VoNR) call.

4. The electronic device of claim 1, wherein the information related to the call quality includes at least one of signal to interference and noise ratio (SINR), reference signal received power (RSRP), block error rate (BLER), modulation and coding scheme (MCS), residual error, or real time protocol (RTP) packet non-received information.

5. The electronic device of claim 1, wherein the at least one communication processor is configured to control to refrain from reducing the number of antennas for reception, based on identifying that a grant ratio (GR) is a set value or more.

6. The electronic device of claim 5, wherein the at least one communication processor is configured to reduce the number of antennas for reception even when the GR is the set value or more, based on identifying an over-temperature state.

7. The electronic device of claim 1, wherein the at least one communication processor is configured to transmit a fake rank indicator (RI) to the first communication network to reduce the number of antennas for reception among the plurality of antennas.

8. The electronic device of claim 7, wherein the at least one communication processor is configured to receive information in which layers corresponding to multiple-input and multiple-output (MIMO) for the electronic device are configured to be reduced, from the first communication network, in response to transmission of the fake RI.

9. The electronic device of claim 1, wherein the at least one communication processor is configured to transmit a fake sounding reference signal (SRS) to the first communication network to reduce the number of antennas for reception among the plurality of antennas.

10. The electronic device of claim 1, wherein the at least one communication processor is configured to:
identify an over-temperature state, and
control to refrain from performing at least one operation configured in response to the identified over-temperature state, based on the electronic device being in the call connected state with the external electronic device.

11. A method for reducing current consumption in an electronic device communicating with a first communication network or a second communication network through a plurality of antennas, the method comprising:
setting up a call with an external electronic device through the first communication network;
identifying information related to call quality in a call connected state with the external electronic device; and
reducing a number of antennas for reception among the plurality of antennas based on identifying that the information related to the call quality meets a designated condition.

12. The method of claim 11, wherein the first communication network includes a 5G network, and the second communication network includes an LTE network.

13. The method of claim 11, wherein the call set up through the first communication network includes a voice over new radio (VoNR) call.

14. The method of claim 11, wherein the information related to the call quality includes at least one of signal to interference and noise ratio (SINR), reference signal received power (RSRP), block error rate (BLER), modulation and coding scheme (MCS), residual error, or real time protocol (RTP) packet non-received information.

15. The method of claim 11, further comprising:
controlling to refrain from reducing the number of antennas for reception, based on identifying that a grant ratio (GR) is a set value or more.

16. An electronic device comprising,
a plurality of antennas; and
at least one communication processor configured to communicate with a first communication network or a second communication network through the plurality of antennas,
wherein the at least one communication processor is configured to:
register voice over new radio (VoNR) through the first communication network,
identify information related to a set bandwidth or bandwidth part (BWP) from the first communication network, and
perform at least one operation for disabling the VoNR based on identifying that the information related to the bandwidth or the bandwidth part meets a designated condition.

17. The electronic device of claim 16, wherein the first communication network includes a 5G network, and the second communication network includes an LTE network.

18. The electronic device of claim 16, wherein the at least one communication processor is configured to:
identify a bandwidth of a serving cell, and
perform at least one operation for disabling the VoNR based on identifying that the bandwidth of the serving cell exceeds a first threshold.

19. The electronic device of claim 16, wherein the at least one communication processor is configured to:
identify whether the BWP is supported when the VoNR call is connected, and
perform at least one operation for disabling the VoNR based on identifying that the BWP is not supported when the VoNR call is connected.

20. The electronic device of claim 19, wherein the at least one communication processor is configured to:
identify whether the BWP is supported when the VoNR call is connected,
identify whether the BWP exceeds a second threshold based on identifying that the BWP is supported when the VoNR call is connected, and
perform at least one operation for disabling the VoNR based on identifying that the BWP exceeds the second threshold.

* * * * *